US012464051B2

(12) United States Patent
Feng et al.

(10) Patent No.: US 12,464,051 B2
(45) Date of Patent: Nov. 4, 2025

(54) QUEUING CONTROL FOR DISTRIBUTED COMPUTE NETWORK ORCHESTRATION

(71) Applicant: Intel Corporation, Santa Clara, CA (US)

(72) Inventors: Hao Feng, Hillsboro, OR (US); Yi Zhang, San Jose, CA (US); Srikathyayani Srikanteswara, Portland, OR (US); Marcin Spoczynski, Lexilip (IE); Nageen Himayat, Fremont, CA (US); Alexander Bachmutsky, Sunnyvale, CA (US); Maruti Gupta Hyde, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/712,119

(22) Filed: Apr. 2, 2022

(65) Prior Publication Data
US 2022/0224762 A1    Jul. 14, 2022

(51) Int. Cl.
*H04L 67/51* (2022.01)
*H04L 67/63* (2022.01)

(52) U.S. Cl.
CPC .............. *H04L 67/51* (2022.05); *H04L 67/63* (2022.05)

(58) Field of Classification Search
CPC ..... H04L 67/51; H04L 67/63; H04L 67/1008; H04L 67/10
See application file for complete search history.

(56) References Cited

U.S. PATENT DOCUMENTS

| 10,623,321 | B2 * | 4/2020 | Mehra | H04L 47/125 |
| 11,853,303 | B1 * | 12/2023 | Oliner | G06F 16/2228 |
| 2021/0409335 | A1 * | 12/2021 | Zhu | H04L 47/24 |

OTHER PUBLICATIONS

Distributed Lyapunov Drift-plus-penalty Routing for WiFi Mesh Networks with Adaptive Penalty Weight by Jose Nunez-Martinez and Josep Mangues-Bafalluy (Year: 2012).*
Afanasyev, Alexander, et. al., "NDF Developer's Guide," NDN, Technical Report NDN-0021; Aug. 2021; https://named-data.net/publications/techreports/; 76 pages.
Alawi, Mahmoud A., et al., "Simplified gateway selection scheme for multihop relay in vehicular ad hoc network," International Journal of Communication Systems, vol. 27, No. 12, 2014; pp. 3855-3873, 20 pages.

(Continued)

*Primary Examiner* — Sm A Rahman
(74) *Attorney, Agent, or Firm* — Alliance IP, LLC

(57) ABSTRACT

In one embodiment, a node of a data centric network (DCN) may receive a first service request interest packet from another node of the DCN, the first service request interest packet indicating a set of functions to be performed on source data to implement a service. The node may determine that it can perform a particular function of the set of functions, and determine, based on a backlog information corresponding to the particular function, whether to commit to performing the particular function or to forward the service request interest packet to another node. The node may make the determination further based on service delivery information indicating, for each face of the node, a service delivery distance for implementing the set of functions.

23 Claims, 30 Drawing Sheets

(56) References Cited

OTHER PUBLICATIONS

Barcelo, Marc, et al., "IoT-cloud service optimization in next generation smart environments", IEEE Journal on Selected Areas in Communications, vol. 34, No. 12, 2016; pp. 4077-4090; 14 pages.

Bari, Md Faizul, et al., "On orchestrating virtual network functions," in Proc. IEEE CNSM, 2015, pp. 50-56, 7 pages.

Kamran, Khashayar, et al., "Deco: Joint computation, caching and forwarding in data-centric computing networks", in Proc. ACM Mobihoc, 2019, pp. 111-120, 10 pages.

Krol, Michael, et al., "Compute First Networking: Distributed Computing Meets ICN," in Proc. ACM ICN, 2019, pp. 67-77, 11 pages.

Król, Michal, et al., "NFaaS: Named Function as a Service", in Proc. ACM Conference on Information-Centric Networking, 2017, pp. 134-144, 11 pages.

Krol, Michal, et al., "RICE: Remote Method Invocation in ICN", in ACM ICN, 2018, pp. 1-11, 11 pages.

Setiawan, Fudhiyanto Pranata, et al., "An optimum multiple metrics gateway selection mechanism in MANET and infrastructure networks integration," in Proc. IEEE WCNC, 2008, pp. 2229-2234, 7 pages.

Topcuoglu, Haluk, et al., "Performance-effective and low complexity task scheduling for heterogeneous computing", IEEE Transactions on Parallel and Distributed Systems, vol. 13, No. 3, pp. 260-274, 2002, 15 pages.

Tschudin, Christian, et al., "Named functions and cached computations," in Proc. IEEE CCNC, 2014, pp. 851-857, 6 pages.

* cited by examiner

FIB Table 609:

| FIB Entry | Next-hop Record | Channel State Record | Neighbors' Interest Queue Backlogs | Minimum Abstract Service Delivery Distance |
|---|---|---|---|---|
| d | Face 1: Node 5 | Maximum Rate through Face 1 | Observed Backlog at Node 5 | Minimum Abstract Distance going through d via Face 1 |
| | Face 2: Node 12 | Maximum Rate through Face 2 | Observed Backlog at Node 12 | Minimum Abstract Distance going through d via Face 2 |

FIB Table 611:

| FIB Entry | Next-hop Record | Channel State Record | Neighbors' Interest Queue Backlogs | Minimum Abstract Service Delivery Distance |
|---|---|---|---|---|
| d | Face 2: Node 10 | Maximum Rate through Face 2 | Observed Backlog at Node 10 | Minimum Abstract Distance going through d via Face 2 |
| | Face 3: Node 13 | Maximum Rate through Face 3 | Observed Backlog at Node 13 | Minimum Abstract Distance going through d via Face 3 |

*FIG. 6B*

QUEUING CONTROL FOR DISTRIBUTED COMPUTE NETWORK ORCHESTRATION

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in a high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications, coordinated service instances and machine learning, such as federated machine learning, among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 6A-6B illustrate example Forwarding Information Base (FIB) entries for nodes of the DCN of FIG. 3A.

DETAILED DESCRIPTION

Figure 1:
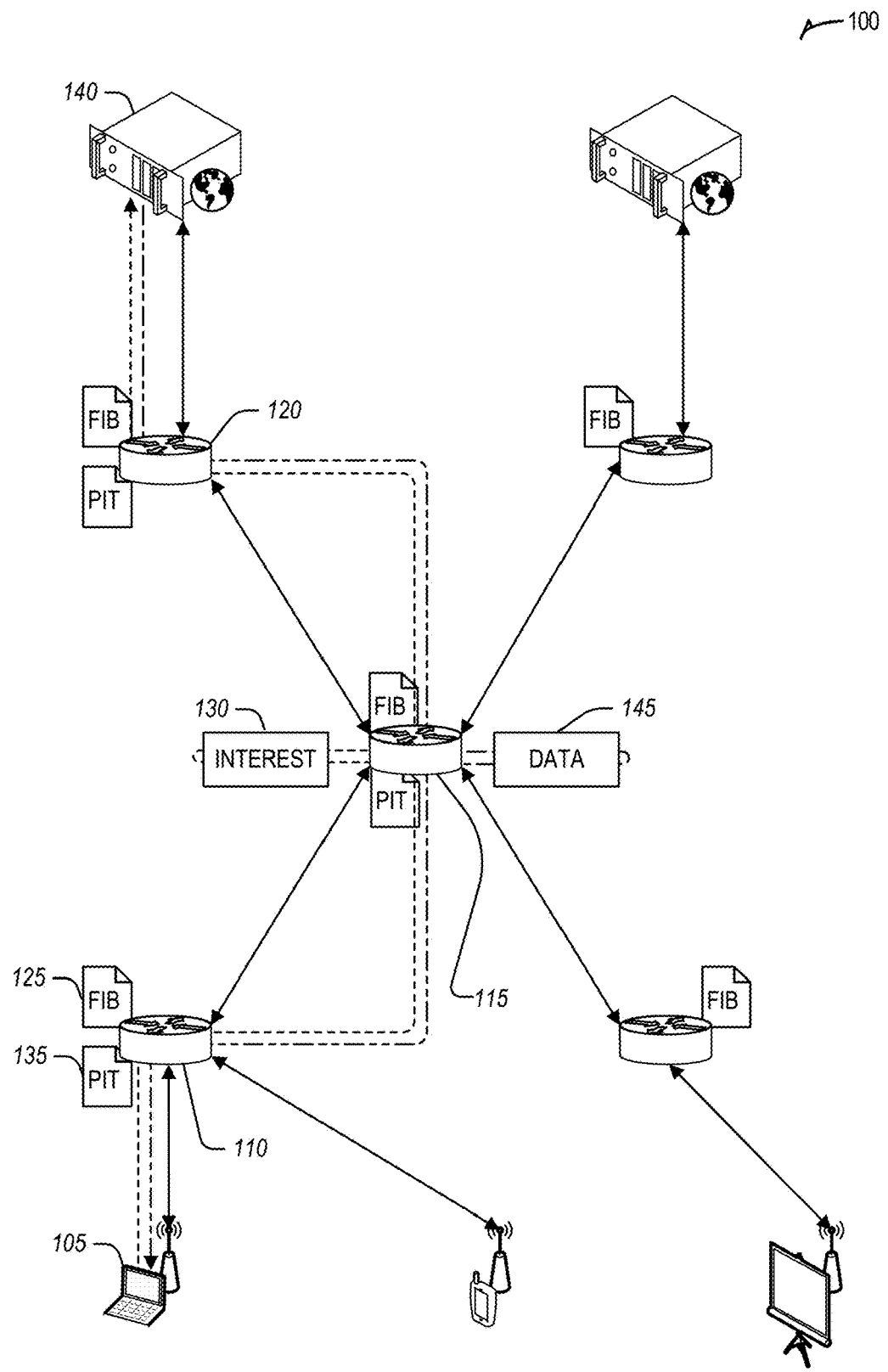
FIG. 1 illustrates an example data centric network (DCN) in accordance with at least one embodiment.

The following embodiments generally relate to data processing, service management, resource allocation, compute management, network communication, application partitioning, and communication system implementations, and in particular, to techniques and configurations for adapting various edge computing devices and entities to dynamically support multiple entities (e.g., multiple tenants, users, stakeholders, service instances, applications, etc.) in a distributed edge computing environment.

In the following description, methods, configurations, and related apparatuses are disclosed for various improvements to the configuration and functional capabilities of an edge computing architecture and an implementing edge computing system. These improvements may benefit a variety of use cases, especially those involving multiple stakeholders of the edge computing system—whether in the form of multiple users of a system, multiple tenants on a system, multiple devices or user equipment interacting with a system, multiple services being offered from a system, multiple resources being available or managed within a system, multiple forms of network access being exposed for a system, multiple locations of operation for a system, and the like.

Network service applications (e.g., online gaming, smart factory, smart city, etc.) continue to require higher throughput, lower delay, and less-expensive data processing and transmission. To satisfy these requirements, compute resources have increasingly moved closer to users, e.g., in "edge" or "fog" computing systems. In some cases, data centric networks (DCNs) can be used to facilitate the deployment of the network services in the form of network functions with elastic operations at multiple geo-locations. However, several challenges arise on how the network can efficiently deliver network services without a centralized controller. For example, it may be difficult to determine where to execute particular network functions and generate the service data respectively among possibly multiple compute devices in the network, especially with databases at different locations. As another example, it may be difficult to coordinate the execution of certain functions and data production with routing decisions to steer the data flowing toward appropriate function executers and data producers. As yet another example, it may be difficult to update the decisions adaptive to application services requested by a various number of service consumers with time-varying demand rates.

Aspects of the present disclosure thus provide a distributed queuing control framework for dynamic orchestration over edge computing networks implementing the data centric networking (DCN) paradigm, which can be a natural fit for edge compute networks. In addition, this disclosure provides a distributed queuing control framework assisted by service discovery procedures for dynamic orchestration over edge computing networks implementing the DCN paradigm.

Orchestration of function placement and data delivery over a computing network has been studied and implemented extensively in academia and industry. A centralized and static orchestration scheme called HEFT on task scheduling over processors has been proposed for network service with directed acyclic graph (DAG) structure. In addition, a dynamic programming heuristic has been developed to orchestrate the computing network to reduce network cost, and developed linear programming formulations and heuristic procedures have been developed for joint function placement and routing for IoT network system given fixed service application demand rates. However, the centralized and static properties of these solutions result in the disadvantages of lacking adaptability and scalability. The corresponding network orchestration algorithms assume global traffic and network state information are available as fixed input parameters. When the input parameters change over time, those static decisions lose their optimality or efficiency, unless the central controller repetitively updates the decisions by re-running the centralized algorithms, which is expensive in complexity. Even for a single running of the algorithm, the complexity can increase dramatically as the network size increases, and gathering/distributing all the network state information/orchestration decisions can be challenging and time consuming.

Distributed orchestration become practically promising given the architectural support from DCN-oriented remote function invocation technologies developed. For instance, recent work has developed a distributed orchestration framework to delivery single-function services, where the dynamic controlling operations are executed over the requests instead of over the data. However, this work does not provide a performance-guaranteed orchestration algorithm and other DCN orchestrations developed can only handle single-function services, which has limited use cases.

In comparison to these previous techniques, the orchestration techniques provided in this disclosure can handle the delivery of multiple services with a function-chaining structure, which may be much more generally applicable and practical. Embodiments herein may thus deliver next-generation services having function-chaining structures in a DCN with arbitrary multi-hop topology, by enabling network nodes to dynamically schedule the function execution and data producing/forwarding. With no global traffic congestion or network state information available, each network node (which may include a client, edge, or cloud compute node) can make these decisions locally based on request backlog (e.g., queue length) observations within a one-hop range. The proposed orchestration operations may thus be adaptive to the time-varying network traffic congestion and may be scalable with the network size, with the resulting time average network throughput utility being maximized.

Moreover, embodiments herein may achieve low end-to-end service delivery latency and high throughput utility. For instance, certain embodiments may enable each network node to make distributed function execution and data forwarding decisions by locally controlling the requests' processing commitment and forwarding based on one-hop range packet backlog observation in addition to information gleaned from a service discovery procedure as described herein. The proposed service discovery procedure may enable the nodes involved in the service delivery to discover the "faces" (which, as used herein, may refer to a specific interface or connection one node has with another adjacent node in the network topology) efficiently leading to the required resources and to estimate the corresponding abstract distances of the leading paths. The resulting networking operations may thus be adaptive to the network traffic congestion and scalable with network size while achieving low end-to-end latency.

Accordingly, embodiments herein may be adaptive to network traffic and states with no centralized controller, and therefore can adaptively satisfy time-varying network service requests with lower operation costs. Further, with the proposed service discovery mechanism described herein, the involved compute nodes can find not only where to access the next-stage target on a function chain but also where to access other peer nodes to offload a current-stage task (e.g., where a current node can handle the function/task but may have a large backlog). Additionally, the techniques herein are distributed and adaptive to network traffic and states, and therefore can satisfy various network service requests with lower operating costs.

FIG. 1 illustrates an example data centric network (DCN) in accordance with at least one embodiment. DCNs may also be referred to, in some instances, as information centric network (ICNs). DCNs may operate differently than traditional host-based (e.g., address-based) communication networks. DCN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, DCN does not include a request for a particular machine and does not use addresses. Instead, to get content, a device 105 (e.g., subscriber) requests named content from the network itself. The content request may be called an interest and transmitted via an interest packet 130. As the interest packet traverses network devices (e.g., network elements, routers, switches, hubs, etc.)—such as network elements 110, 115, and 120—a record of the interest is kept, for example, in a pending interest table (PIT) at each network element. Thus, network element 110 maintains an entry in its PIT 135 for the interest packet 130, network element 115 maintains the entry in its PIT, and network element 120 maintains the entry in its PIT.

When a device, such as publisher 140, that has content matching the name in the interest packet 130 is encountered, that device 140 may send a data packet 145 in response to the interest packet 130. Typically, the data packet 145 is tracked back through the network to the source (e.g., device 105) by following the traces of the interest packet 130 left in the network element PITs. Thus, the PIT 135 at each network element establishes a trail back to the subscriber 105 for the data packet 145 to follow.

Matching the named data in an DCN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 130 traverses the DCN, DCN network elements will generally attempt to match the name to a greatest degree. Thus, if a DCN element has a cached item or route for both "www.somedomain.com or videos" and "www.somedomain.com or videos or v8675309," the DCN element will match the later for an interest packet 130 specifying "www.somedomain.com or videos or v8675309." In an example, an expression may be used in matching by the DCN device. For example, the interest packet may specify "www.somedomain.com or videos or v8675*" where '*' is a wildcard. Thus, any cached item or route that includes the data other than the wildcard will be matched.

Item matching involves matching the interest 130 to data cached in the DCN element. Thus, for example, if the data 145 named in the interest 130 is cached in network element 115, then the network element 115 will return the data 145 to the subscriber 105 via the network element 110. However, if the data 145 is not cached at network element 115, the network element 115 routes the interest 130 on (e.g., to network element 120). To facilitate routing, the network elements may use a forwarding information base 125 (FIB) to match named data to an interface (e.g., physical port) for the route. Thus, the FIB 125 operates much like a routing table on a traditional network device.

In an example, additional meta-data may be attached to the interest packet 130, the cached data, or the route (e.g., in the FIB 125), to provide an additional level of matching. For example, the data name may be specified as "www.somedomain.com or videos or v8675309," but also include a version number—or timestamp, time range, endorsement, etc. In this example, the interest packet 130 may specify the desired name, the version number, or the version range. The matching may then locate routes or cached data matching the name and perform the additional comparison of meta-data or the like to arrive at an ultimate decision as to whether data or a route matches the interest packet 130 for respectively responding to the interest packet 130 with the data packet 145 or forwarding the interest packet 130.

DCN may provide certain advantages over host-based networking because the data segments are individually named. This enables aggressive caching throughout the network as a network element may provide a data packet 130 in response to an interest 130 as easily as an original author 140. Accordingly, it is less likely that the same segment of the network will transmit duplicates of the same data requested by different devices.

Fine grained encryption is another feature of many DCN networks. A typical data packet 145 includes a name for the data that matches the name in the interest packet 130. Further, the data packet 145 includes the requested data and may include additional information to filter similarly named data (e.g., by creation time, expiration time, version, etc.). To address malicious entities providing false information under the same name, the data packet 145 may also encrypt its contents with a publisher key or provide a cryptographic hash of the data and the name. Thus, knowing the key (e.g., from a certificate of an expected publisher 140) enables the recipient to ascertain whether the data is from that publisher 140. This technique also facilitates the aggressive caching of the data packets 145 throughout the network because each data packet 145 is self-contained and secure. In contrast, many host-based networks rely on encrypting a connection between two hosts to secure communications. This may increase latencies while connections are being established and prevents data caching by hiding the data from the network elements.

Example DCN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 2:
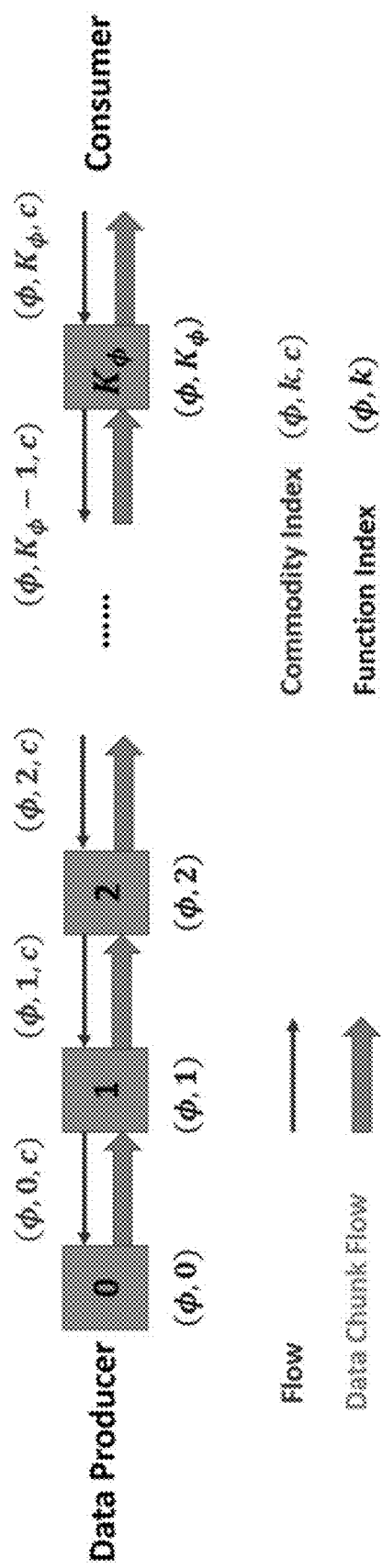
FIG. 2 illustrates an example function chain for a service to be delivered by a DCN in accordance with at least one embodiment.

FIG. 2 illustrates an example function chain 200 for a service to be delivered by a DCN in accordance with at least one embodiment. In the example shown, delivery of a network service application is indexed by $\phi$, and each network function of the service is indexed by $1, \ldots, K_\phi$. The consumer requesting the service may be indexed by c, and thus, $(\phi,k,c)$ may be used to denote the kth function of service application $\phi$ requested by consumer c.

Each node i in a compute network represents a distributed network unit, such as user device, router, access point, edge server, and data center, etc., with communication capabilities, and (i,j) may represent the link from node i to node j. In the following, $\mathcal{O}(i)$ is the set of neighbor nodes having direct links incident to node i, and $\mathcal{P}^{(\phi,k)}$ is the set of nodes that are equipped with compute resources and software to execute function $(\phi,k)$, where $1 \le k \le K_\phi$; $\mathcal{C}^\phi$ then represents the set of consumers (nodes) of service $\phi$ that initiate service requests, and $\mathcal{D}^\phi$, represents the set of data producer nodes that can generate the required source data for service $\phi$.

Figure 3A:
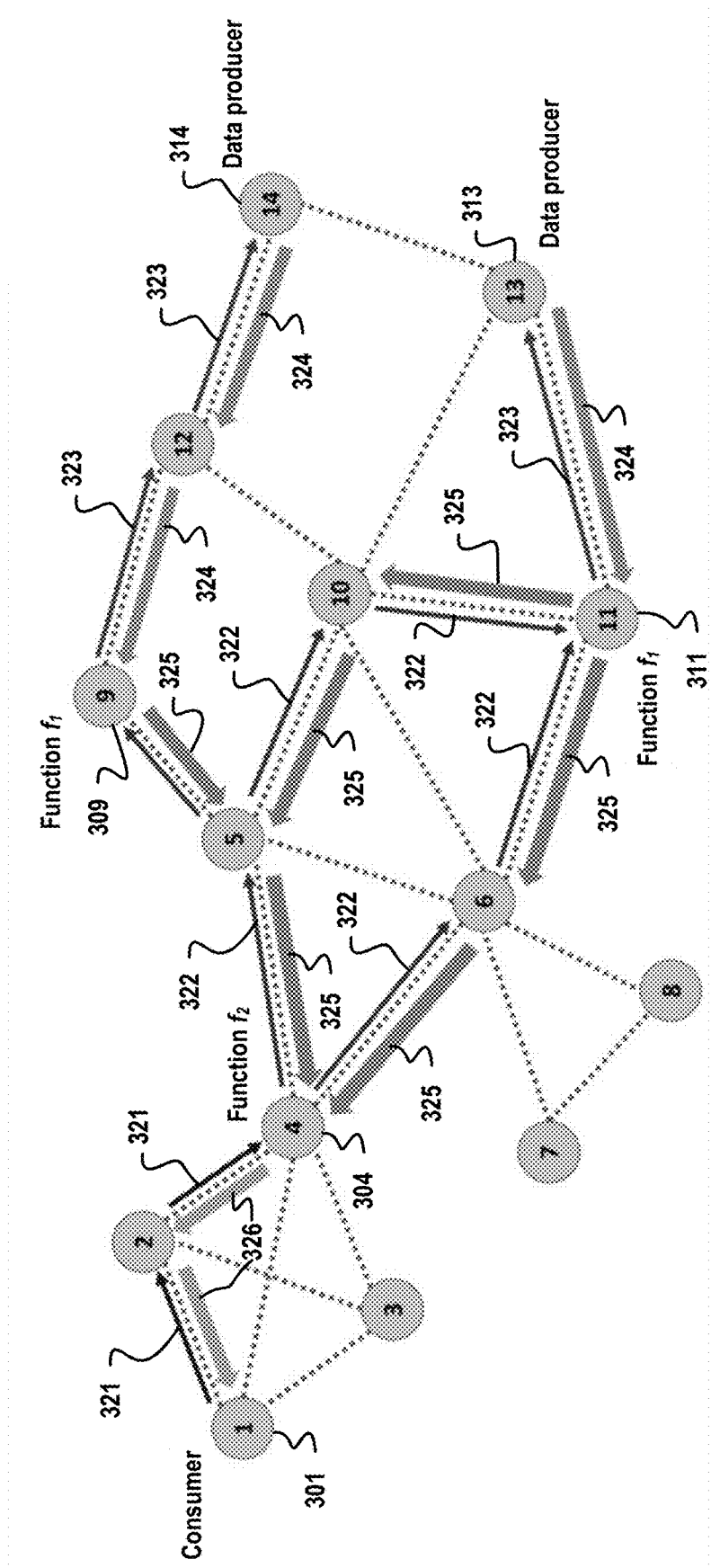
FIG. 3A illustrates an example DCN delivering a network service with a function chain in accordance with at least one embodiment.

In the context of DCN, such as that shown in FIG. 1 or 3A, a stream of requests (e.g., interest packets) for service $\phi$ flow from a service consumer to possibly multiple data producers through multiple compute nodes committing function executions. As used herein, a commodity may refer to a stream of requests jointly specified by the consumer and service stage, and thus, a commodity may be indexed by $(\phi,k,c)$, where $1 \le k \le K_\phi$ and $c \in \mathcal{C}^\phi$ (c is the consumer node ID), as the stream of compute requests for function $(\phi,k)$ serving consumer c. The stream of requests for producing workflow input data of service $\phi$ at a data producer may be referred to as commodity $(\phi,k,c)$. For the data streams, $z^{(\phi,k)}$, $1 \le k \le K^\phi$, represents the size of each data packet output by executing function $(\phi,k)$; $z^{(\phi,0)}$ represents the size of each source data packet generated by a data producer for service $\phi$. As used herein, a "processing complexity" of implementing function $(\phi,k)$, $1 \le k \le K_\phi$ may be defined as the expected number of processing cycles required to process a data packet by implementing function $(\phi,k)$, where the processing complexity is denoted by $r^{(\phi,k)}$.

FIG. 3A illustrates an example DCN 300 delivering a network service with a function chain in accordance with at least one embodiment. In DCNs, services may be delivered by performing a series of functions on certain data. As used herein, a function chain may refer to the sequence of functions ordered according to their execution sequence to perform a requested service. As an example, a service of "face recognition" may be performed by a DCN, where the service includes the functions of face detection on source data packets provided by a data producing node (which may be a different node from the service consumer node), data preprocessing (e.g., normalization) on a detected face, feature extraction on the pre-processed image, and classification (e.g., determining whether the face is male/female, adult/child, etc.). In some cases, the data producer may be the service consumer. In general, the functions can be implemented at different locations in the network, e.g., for face recognition application, functions such as data preprocessing and feature extractions can be implemented at edge/cloud servers that can tackle intensive computation tasks, while the classification should be implemented at some network node having machine learning capability and training data.

Consumers of the service may generate initial requests in the form of interest packets that are delivered to the compute nodes for processing. After receiving the requests, each compute node decides whether to process the computation task locally by implementing a required function indicated in the interest packet, or offloading the request to other compute nodes. If a compute node commits to executing a function, according to the execution sequence, a new compute request for executing the prior function on the function chain (or data production) may be generated (with the interest packet's name and nonce number being updated). Once the interest packet arrives at the data producer, a stream of data packets is generated according to the data request. The data packets may be produced with a one-to-one correspondence and may flow backward along the reverse path of the requests.

Figure 3B:
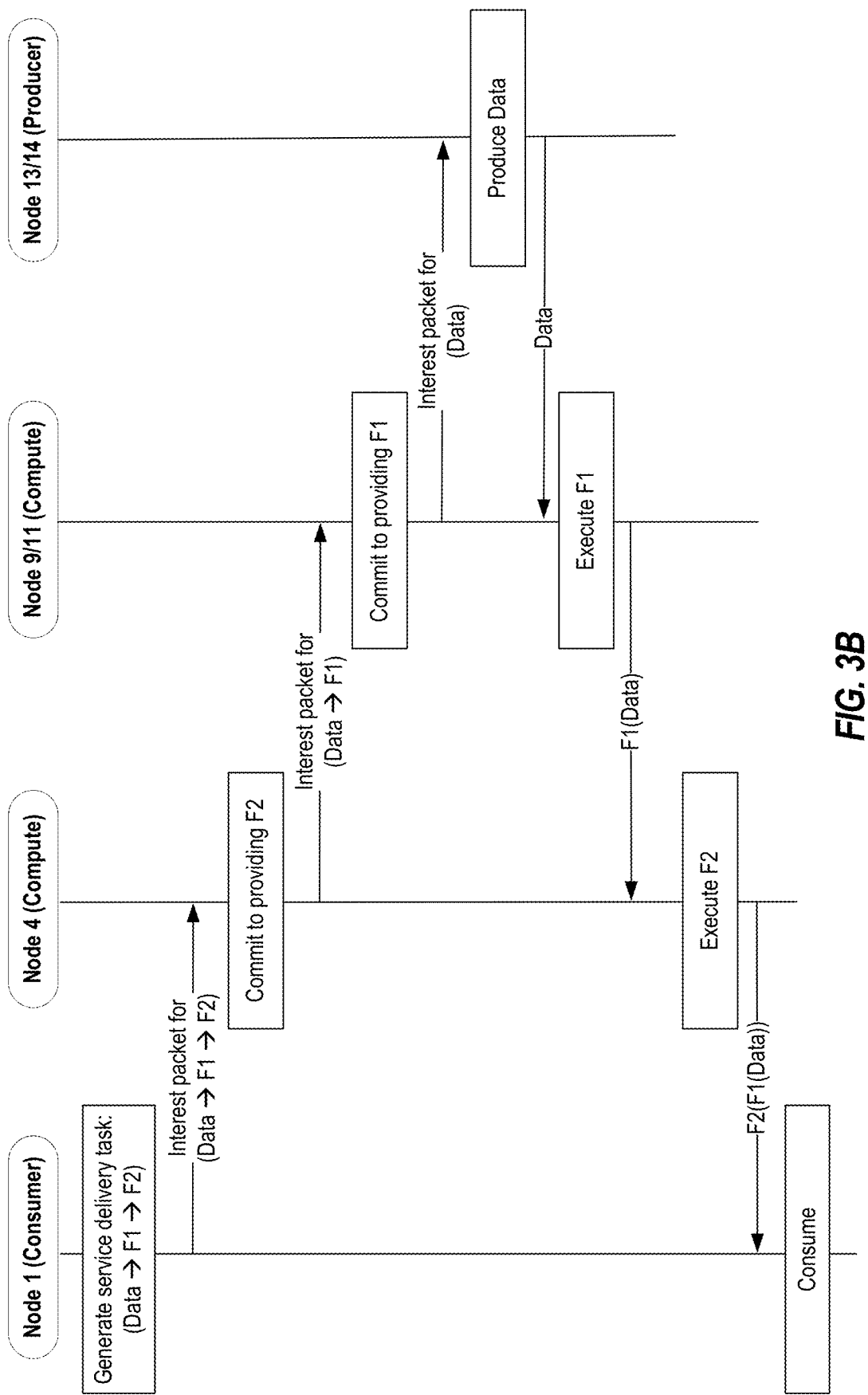
FIG. 3B illustrates an example diagram of certain operations performed with respect to delivering the network service as shown in FIG. 3A.

FIG. 3B illustrates an example diagram of certain operations performed with respect to delivering the network service as shown in FIG. 3A. As shown in FIGS. 3A-3B, node 301 generates interest packets 321, which indicate a request for delivery of a service that includes functions $f_1$ and $f_2$ performed on source data d. In particular, the service requested by the consumer 301 is to be performed by two functions, $f_1$ and $f_2$, where function $f_1$ is to be performed on data produced by a data producing node (e.g., 313, 314) and function $f_2$ is to be performed on the data output by the function $f_1$. In the example shown in FIG. 3A, node 304 may perform function $f_2$, either of nodes 309, 311 may perform function $f_1$, and either of nodes 313, 314 may generate the source data on which the functions $f_1$ and $f_2$ are to be performed.

The interest packets 321 flow through the network to the compute node 304. The compute node 304 commits to executing function $f_2$ and then transmits interest packets 322, which propagate through the network to compute nodes 309 and 311, either of which may provide commitment to executing function $f_1$. Nodes 309 and 311 may then transmit interest packets 323, which propagate through the network to the data producer nodes 313, 314 for commitment to producing the source data for the service. Then, a stream of source data packets 324 is generated at the data producer, which flows backward through the network to one or both of nodes 309, 311, which perform the function $f_1$ on the source data and then transmit data output by the function $f_1$ 325 back through the network to node 304. Node 304 then performs the function $f_2$ on the data 325 and then transmits data output by the function $f_2$ 326 back through the network to the consumer node 301.

The proposed orchestration techniques herein may maximize a total throughput utility with proportional fairness among consumers and services, subject to capacity constraints of data transmission/processing, traffic injection, data producing, and network stability. The orchestration may be substantiated by distributed control operations on allocating the exogenous request injection rates at the consumers, processing commitment rates at the compute nodes, request forwarding rates over network links, and data producing rates at data producers.

Queuing-Based Control of DCN Orchestration

Figure 4:
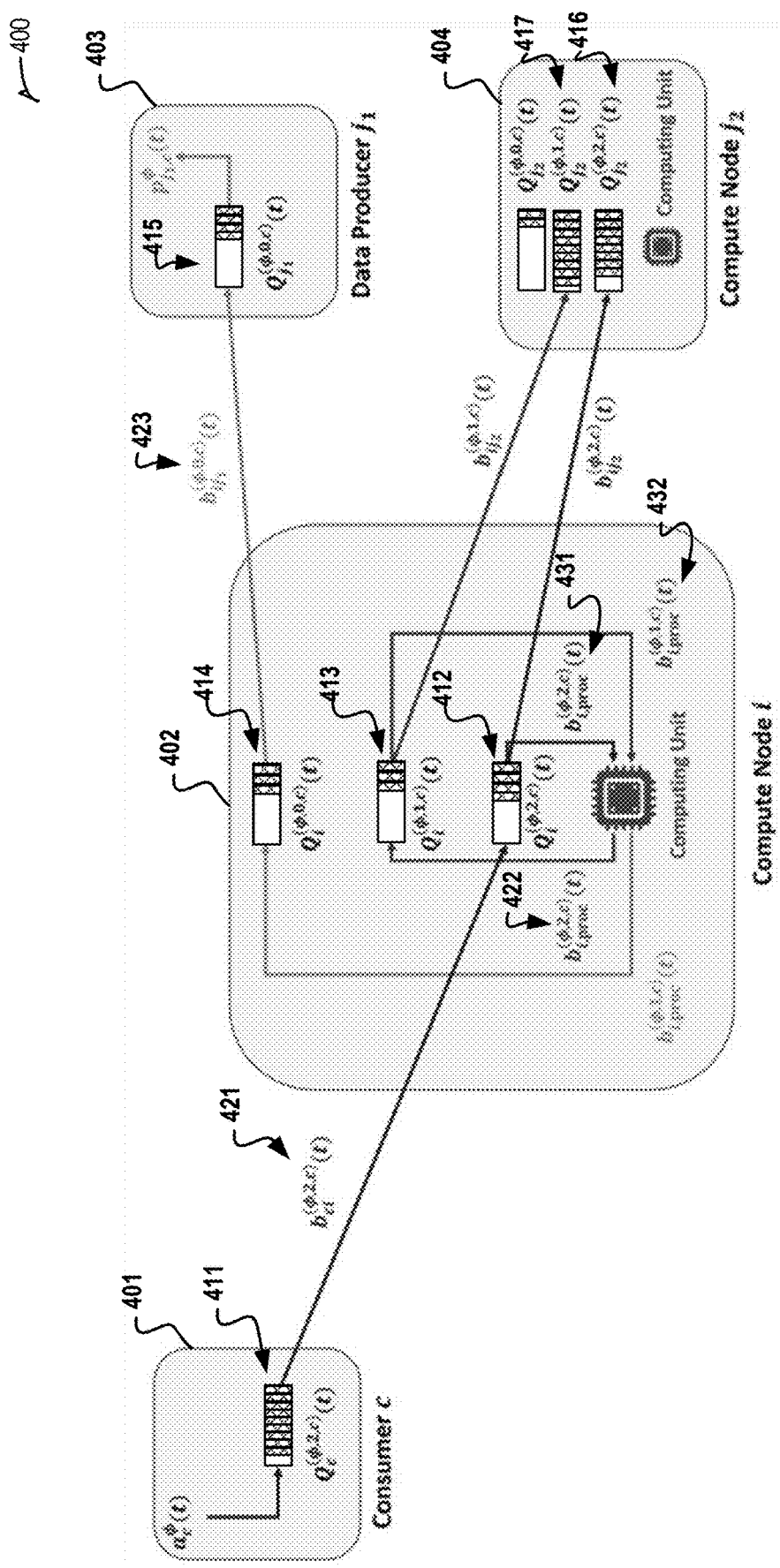
FIG. 4 illustrates a diagram showing example queuing dynamics among multiple nodes of a DCN in accordance with at least one embodiment.

FIG. 4 illustrates a diagram 400 showing example queuing dynamics among multiple nodes of a DCN in accordance with at least one embodiment. In the example shown, $Q_i^{(\phi,k,c)}(t)$ represents a request backlog of commodity ($\phi$,k,c) at node i in time slot t. The consumer c (401) injects service request interest packets for commodity ($\phi$,2,c) into the network with rate $a_c^\phi(t)$, and the injected requests are input to its injection backlog 411 corresponding to commodity ($\phi$,2,c). Consumer c (401) forwards the service request interest packets (421) for commodity ($\phi$,2,c) to compute node i (402), which has the required computing resources and software to implement function k=2, and the commodity ($\phi$,2,c) backlog 411 of consumer c is reduced accordingly.

In the example shown, the compute node i (402) analyzes its backlog 412 for the commodity ($\phi$,2,c) (e.g., against other backlogs for the commodity (e.g., 416)) and decides to commit to processing the commodity ($\phi$,2,c), e.g., because it's backlog for that respective function is less than that of the node 404. The respective backlogs at each node may be represented by a quantity of data packets the node has committed to processing, a relative ratio (e.g., a 0-1 number) or percentage of compute resources dedicated based on already-made commitments, or any other suitable type of metric that can be compared between nodes (which may have disparate compute powers/resources).

The node 402 then issues a processing commitment request 431. It then generates another service request interest packet 422 corresponding to commodity ($\phi$,1,c), analyzes its backlog 413 for the commodity ($\phi$,2,c) (e.g., against other backlogs for the commodity (e.g., 417)), and decides to commit to the execution of function ($\phi$,1) as well (e.g., because it's backlog for that respective function is less than that of the node 404) by issuing a processing commitment request 432. Based on the processing commitments, the compute node 402 reduces the local commodity backlogs 412 and 413 for commodities ($\phi$,2,c) and ($\phi$,1,c), respectively, and accordingly adds to the local backlogs 413 and 414 for commodities ($\phi$,1,c) and ($\phi$,0,c), respectively. The compute node i (402) then forwards data requests 423 for commodity ($\phi$,0,c) to the data producer node $j_1$ (403) for data production, and the reduces its local commodity backlog 414 for ($\phi$,0,c). The data producer node 403 then generates service workflow data for service $\phi$ with a rate $p_{j_1,c}^\phi(t)$, and reduces its backlog 415 accordingly.

In some instances, due to local congestion at the compute node i (403), the node 403 may determine to offload/forward the compute requests for commodity ($\phi$,2,c) and/or ($\phi$,1,c) to another node, such as its neighbor compute node $j_2$ (404), which, in the example shown, also has the required resources and software to execute both functions. The decision of whether to offload to another node may be based on an analysis of the respective backlogs of the nodes (e.g., 412 vs. 416 and 413 vs. 417) by the compute node 402. For example, the analysis may be performed using a backpressure routing algorithm (e.g., one based on Lyapunov drift optimization). In this way, compute load balancing can be achieved between the nodes 402, 404 for executing functions ($\phi$,1) and ($\phi$,2) for many different services or consumers. In some cases, the determination of whether to offload may be based on backlog information for neighboring nodes, which may come from periodic backlog advertisement messages (which may be referred to as "Hello" messages) sent by the neighboring nodes.

Figure 5:
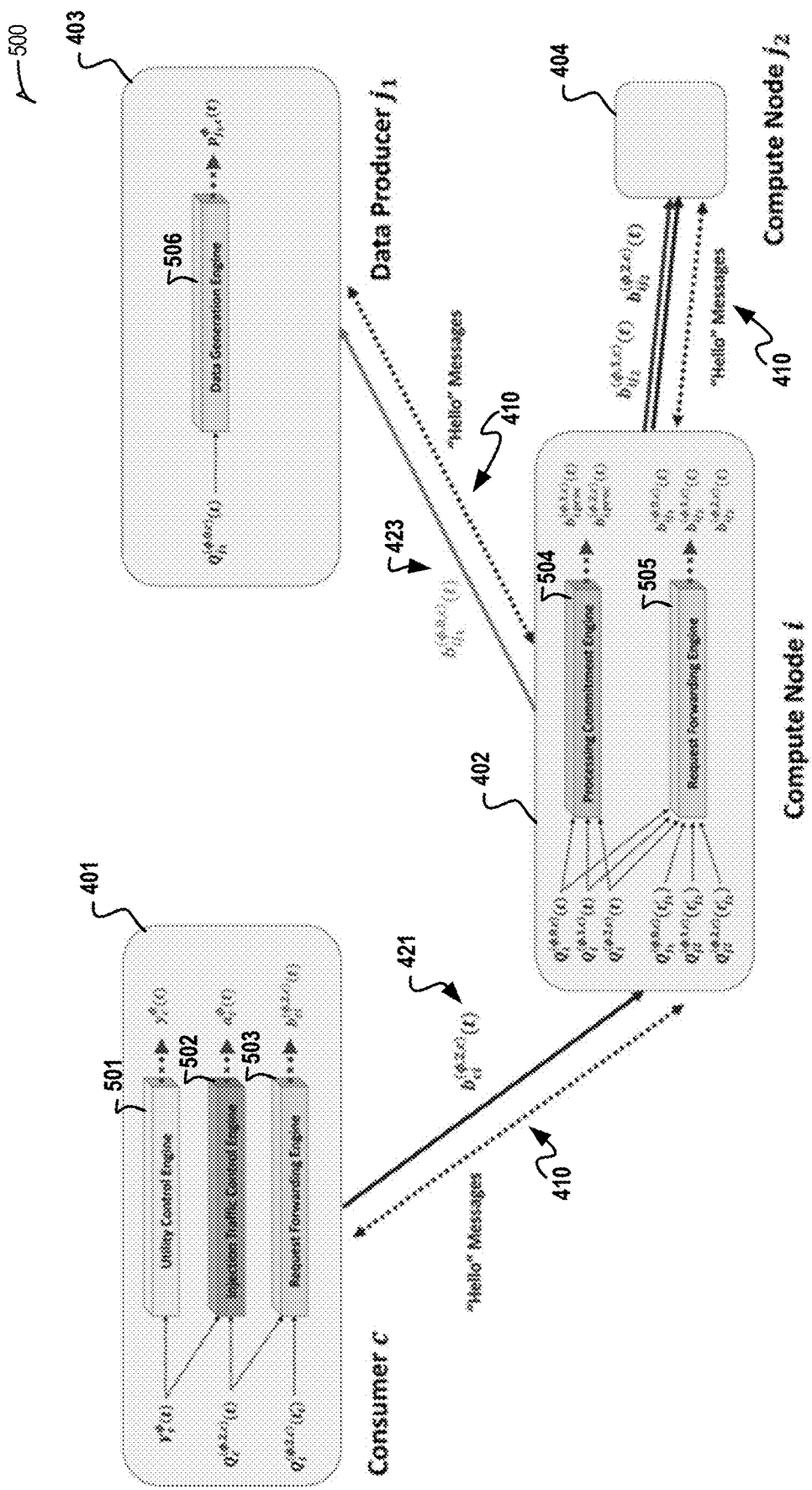
FIG. 5 illustrates a diagram showing example backlog advertisement messages that may be sent between nodes of a DCN in accordance with at least one embodiment.

FIG. 5 illustrates a diagram 500 showing example backlog advertisement messages 510 that may be sent between nodes of a DCN in accordance with at least one embodiment. In the example shown in FIG. 5, each of the compute nodes is implemented in the same manner as the compute nodes of FIG. 4. In certain embodiments, each node of the DCN may make observations of neighboring nodes by requesting backlog information from the neighboring nodes for certain functions. For example, each network node may periodically broadcast a "Hello" message, which may include its most updated commodity backlog information, to its one-hop neighbors. The backlog information carried by the "Hello" messages can be gathered and used by the listening neighboring nodes to make forwarding decisions. Moreover, in wireless scenarios, each node i can estimate the expected maximum transmission rate of the link from each neighbor j by averaging experienced rates through multiple receptions of "Hello" messages within a window-sized period. Furthermore, with a "Hello" message mechanism, each node can detect the joining or leaving of nodes from the network.

Additionally, FIG. 5 illustrates various engines for each node that may be used to implement a dynamic queuing-based orchestration model in accordance with embodiments herein. As shown in FIG. 5, consumer nodes (e.g., 401) of the DCN may include a utility control engine 501, an injection traffic control engine 502, and a request forwarding engine 503. Each compute node (e.g., 402, 404) of the DCN may include a processing commitment engine 504 and a request forwarding engine 505, and each data producing node (e.g., 403) may include a data generation engine 506. The functionality of each engine may be implemented by software, firmware, or hardware (or a combination thereof) of the nodes, and the details of the functionality for each engine is described further below.

Service Discovery Assisted Queuing-Based Control of DCN Orchestration

In addition to the queuing-based control described above, certain embodiments may also incorporate service discovery techniques to better understand the DCN topology and make better orchestration decisions. As before, the service discovery assisted orchestration involves dynamically deciding where a function should be executed and/or where data should be generated, how to route the request/data flow, and how to control the request traffic injected into the network. Each node in the network dynamically makes local decisions based on the request queue backlog observations within one-hop range as well as based on discovery information obtained for remote compute/data resources in the DCN. The resulting orchestration operations are adaptive to the network congestion situations.

In particular embodiments, for instance, each node may obtain the (single or multiple) shortest distances toward (single or multiple) remote compute and data generation resources through a service discovery procedure. The distances may be recorded in FIB entries.

Figure 6A:
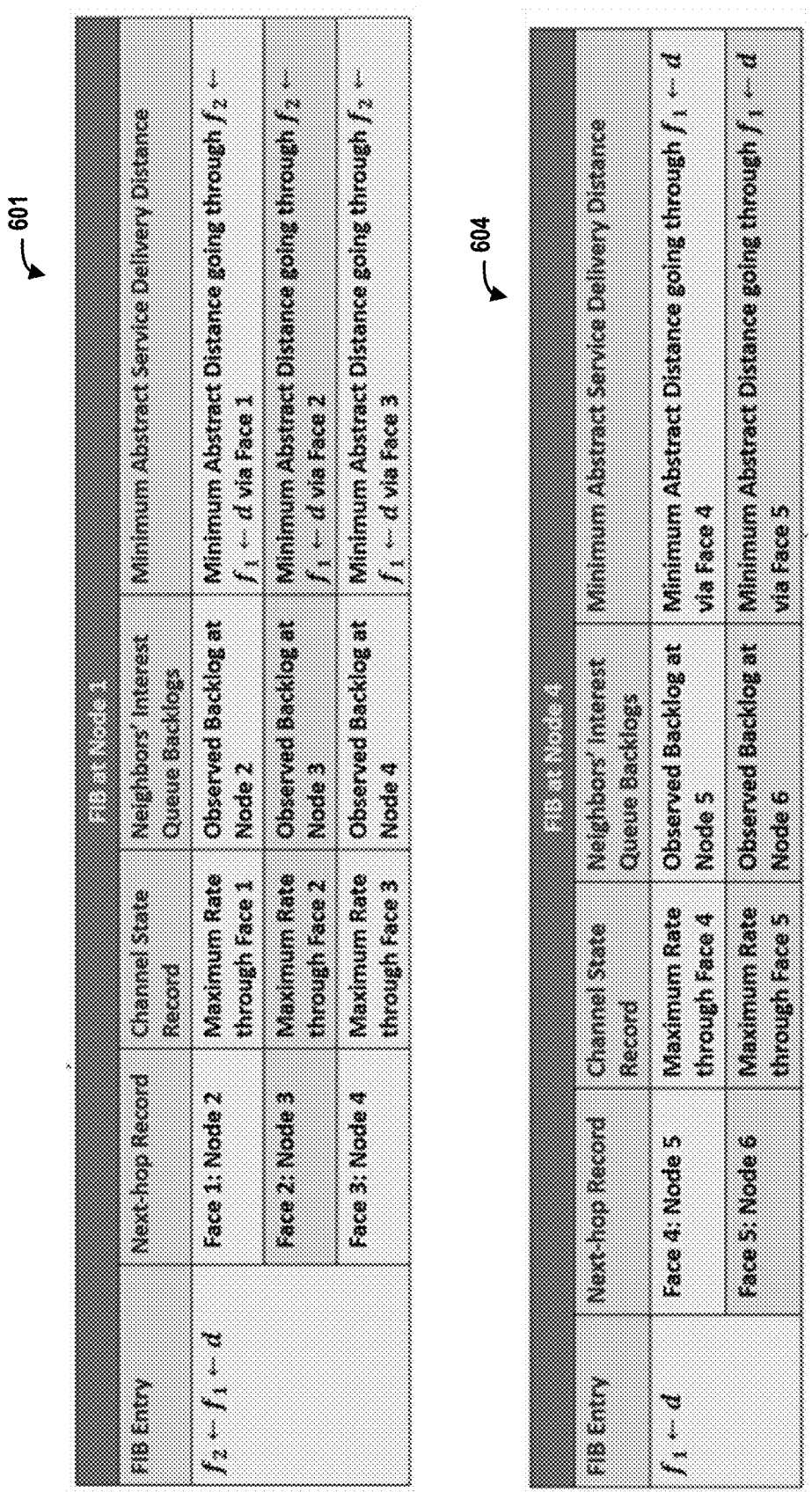

FIGS. 6A-6B illustrate example Forwarding Information Base (FIB) entries 601, 604, 609, 611 for nodes 301, 304, 309, 311 of the DCN 300 of FIG. 3A. Each FIB entry indicates a function chain of an interest packet received or generated by the node. For each FIB entry, there is a next-hop record entry for each "face" of the node (an interface with a one-hop adjacent node of the network) indicating which node of the network is associated with that "face"/interface, a channel state record entry for each of the next-hop records, an interest queue backlog record for each of the next-hop records (which may be obtained via Hello messages as described below), and, in certain embodiments, a minimum abstract service delivery distance (indicating a shortest route through the DCN for implementing the function chain of the FIB entry) for each of the next-hop records of the FIB entry.

In operation, the consumer node 301 may generate a stream of service request interest packets, which may have names in the structure of "$f_2 \leftarrow f_1 \leftarrow d$", where the name "d" carried by an interest packet includes its required data packet's ID. The nodes of the DCN 300 may each create a FIB entry with a naming structure "$f_2 \leftarrow f_1 \leftarrow d$" after generating or receiving an interest packet, respectively. The consumer or forwarding node may refer to the FIB entry "$f_2 \leftarrow f_1 \leftarrow d$" to make a forwarding decision. The service discovery interest packets with name "$f_2 \leftarrow f_1 \leftarrow d$" flow to compute nodes (304, 309, 311), obtaining processing commitments in the reverse order of the function chain, i.e., first for function $f_2$ (at node 304) and then for function $f_1$ (at node 309 or 311). After the processing commitment for function $f_2$, the compute node 304 creates a PIT FIB entry with the name "$f_1 \leftarrow d$", generates another interest packet with name "$f_1 \leftarrow d$", and forwards the packet referring the FIB entry "$f_1 \leftarrow d$". Similarly, after the processing commitment for function $f_1$, the compute node 309 or 311 creates a PIT entry with the name "d", generates an interest packet with name "d", and forwards the packet referring the FIB entry "d". The committed interest packets with name "d" then flow to the data producers (nodes 313 and 314), where a stream of data packets is generated and flows back to the consumer through the reverse paths and gets processed at the committing compute nodes that sequentially implement $f_1$ (at node 309 or 311) and then $f_2$ (at node 304).

The distributed orchestration operations made at a node may be based on both the backlog observations in the FIB entries and the service discovery results obtained through multiple-hop transmissions (e.g., the minimum abstract service delivery distance and/or channel state records in the FIB entries).

The service discovery procedure may be initiated by a discovery initiator node to sequentially search the needed compute or data producing resources of a function chain segment (or a segment of the function chain) according to the reversed chaining sequence if the initiator has no prior knowledge of where to request the resources from. In the discovery procedure, the discovery initiator may generate a discovery interest packet that is multicast through the DCN for multiple hops. If all the targeted compute/data-producing resources on the function chain have been reached in the desired sequence, a discovery data packet is generated by the data producer and flows back toward the original discovery initiator of the function chain segment along the reverse path. For a function chain segment, the discovery data packet may carry/update the discovery results. Correspondingly, all the authorized overhearing nodes can read the discovery results and update their local FIBs accordingly.

The service discovery procedure may be divided into two phases: (1) exploration of discovery interest packets, and (2) feedback of service discovery results.

Exploration of Discovery Interest Packets

At each hop, a discovery interest packet may be multicast by each node to its neighbor nodes to complete one hop forwarding. In addition to standard bit fields in NDN-based interest packet headers, the discovery interest packet for searching an example function chain segment $d \rightarrow f_1 \ldots \rightarrow f_k$ may include the following fields:

Name $f_k \leftarrow \ldots \leftarrow f_1 \leftarrow d$: requesting function $f_k$ as the immediate target.

Stop List: containing the list of nodes $[j_1, \ldots, j_n]$ (wherein the node's index represents its node-ID) that are sequentially visited by the discovery interest packet with name $f_k \leftarrow \ldots \leftarrow f_1 \leftarrow d$. This list keeps augmenting at each hop until reaching a node $j'_1$, which changes the packet's name. Before forwarding, node $j'_1$ resets the list to $[j'_1]$. As will be described further below, the creation and augmentation of the stop list in the discovery interest packet is used for loop detection in exploring the paths.

Initiator List: containing a sequence of nodes $[i_1, \ldots, i_q]$ that have function $f_k$ and are sequentially visited by a discovery interest packet with name $f_k \leftarrow \ldots \leftarrow f_1 \leftarrow d$. The number of IDs in the list, denoted by q, categorizes the status of the discovery interest packet into q stages:

Stage 1: The initiator list only contains one node-ID, e.g., $[i_1]$. Node $i_1$ may refer to the first initiator generating the discovery interest packet with name $f_k \leftarrow \ldots \leftarrow f_1 \leftarrow d$, and the generation is triggered by either of the two cases: i) node $i_1$ is a consumer and generates a discovery request of $f_k \leftarrow \ldots \leftarrow f_1 \leftarrow d$; or ii) node i has function $f_{k+1}$ and receives a discovery interest packet with name $f_{k+1} \leftarrow \ldots \leftarrow d$, it generates a new discovery interest packet with name $f_k \leftarrow \ldots \leftarrow f_1 \leftarrow d$.

Stage q with q≥2: The initiator list is a sequence of node-IDs $[i_1, \ldots, i_q]$. When node $i_q$ having function $f_k$ receives a discovery interest packet with initiator list $[i_1, \ldots, i_{q-1}]$ (of stage q−1) and name $f_k \leftarrow \ldots \leftarrow f_1 \leftarrow d$, it adds its node-ID into the packet's initiator list, and the packet is updated from stage q−1 to q and gets forwarded. Node $i_q$ becomes the current initiator of the discovery interest packet, while node $i_1, \ldots, i_{q-1}$ become its predecessor initiators.

The creation and augmentation of the initiator list in the discovery interest packet may allow for early detection of certain looping traffic and may be complementary to the stop-list-based detection of loops.

Figure 7:
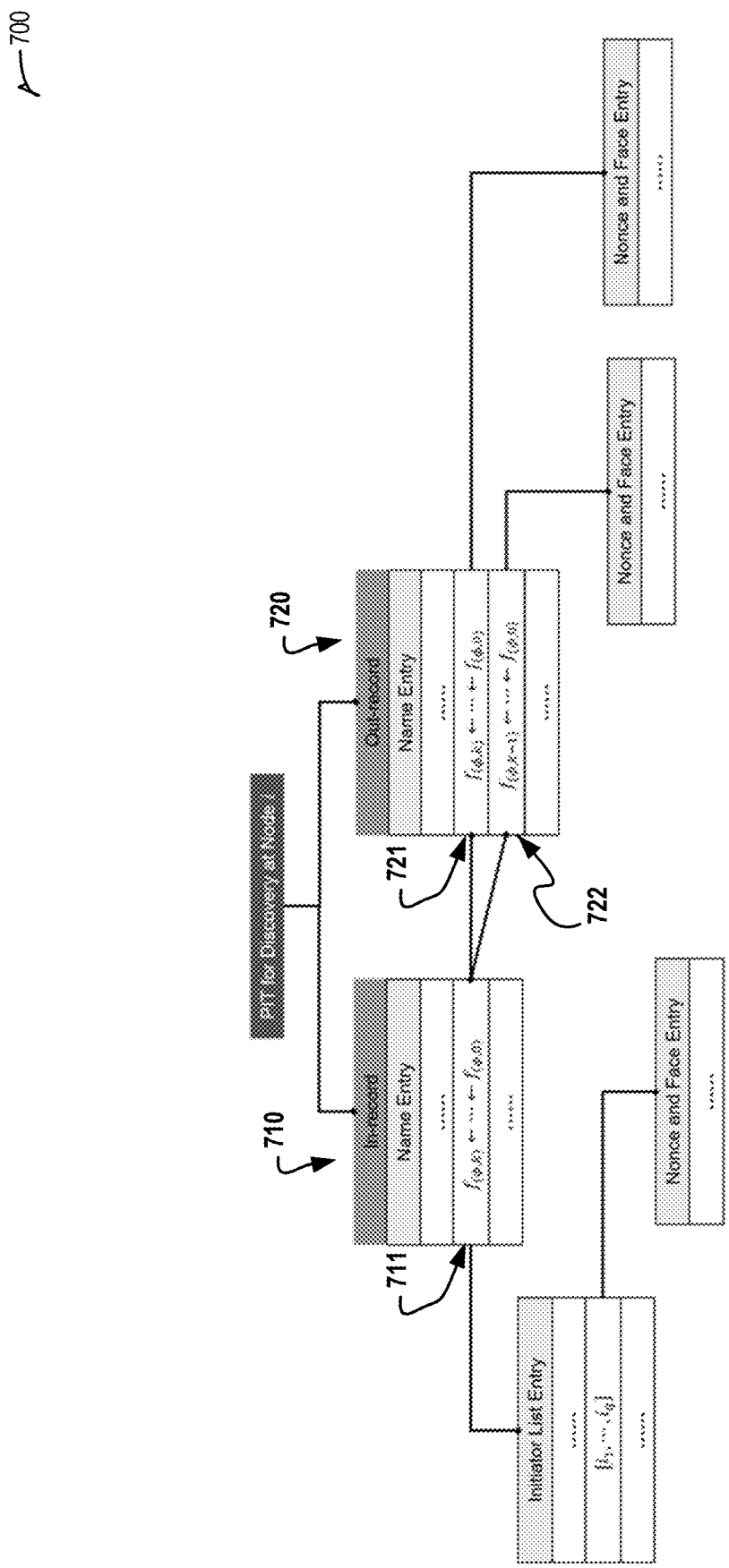
FIG. 7 illustrates an example Pending Interest Table (PIT) in accordance with at least one embodiment.

With possible name updates at each hop, the Pending Interest Table (PIT) for the service discovery of function chain may be different from the one in standard NDN. FIG. 7 illustrates an example PIT 700 in accordance with at least one embodiment. The example PIT 700 is a hierarchical table with in-record entries 710 (corresponding to incoming requests) and out-record entries 720 (corresponding to outgoing requests). As shown, the in-record entries 710 and out-record entries 720 are separately indexed by names. Name entries in both the in-record and out-record may be associated and mutually accessible if an incoming interest packet with the in-record name triggers the generation/forwarding of an outgoing packet with the out-record name. For instance, in the example shown, the PIT in-record entry 711 ($f_{(\phi,k)} \leftarrow \ldots \leftarrow f_{(\phi,0)}$) is associated with both PIT out-record entries 721 ($f_{(\phi,k-1)} \leftarrow \ldots \leftarrow f_{(\phi,0)}$) and 722 ($f_{(\phi,k)} \leftarrow \ldots \leftarrow f_{(\phi,0)}$) if the forwarding node i has function $f_{(\phi,k)}$. In certain embodiments, to facilitate loop detection, each in-record name entry may store the initiator lists of all the arrival interest packets with this name.

Figure 8:
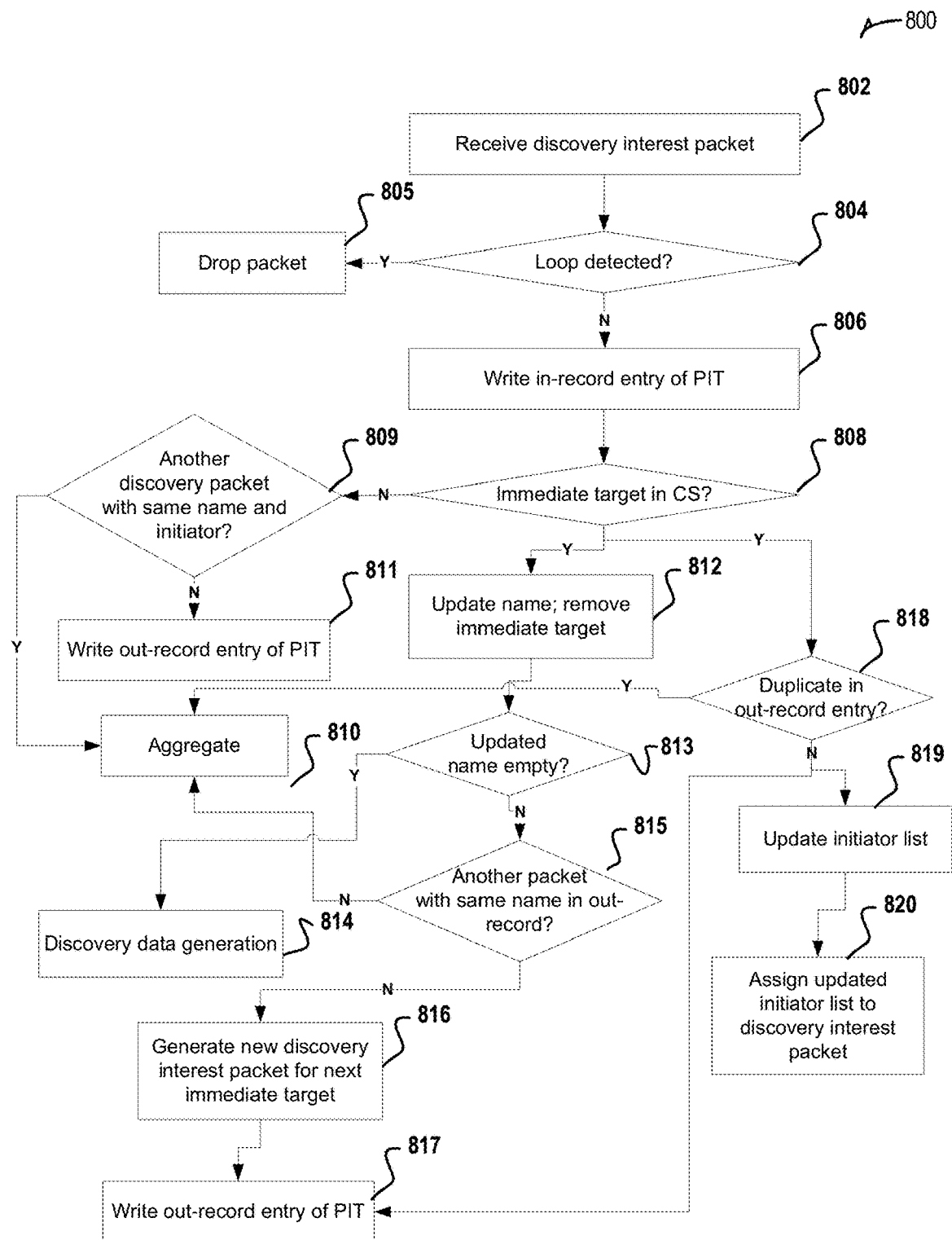
FIG. 8 illustrates a flow diagram of an example discovery interest pipeline in accordance with at least one embodiment.

FIG. 8 illustrates a flow diagram 800 of an example discovery interest pipeline in accordance with at least one embodiment. The example process shown in FIG. 8 may include additional or different operations, and the operations may be performed in the order shown or in another order. In some cases, one or more of the operations shown in FIG. 8 may be implemented as processes that include multiple operations, sub-processes, or other types of routines. In some cases, operations can be combined, performed in another order, performed in parallel, iterated, or otherwise repeated or performed another manner. In certain embodiments, the operations may be encoded as instructions (e.g., software instructions) that are executable by one or more processors (e.g., processors of the computing node executing the functional simulator) and stored on computer-readable media.

At 802, a discovery interest packet is received at a node. After receipt, in some embodiments, the node may check for local host scope violations and whether the packet has hopped more than a predefined hop number limit. If either is true, then the packet may be dropped.

At 804, a loop detection check begins to detect whether a routing loop has occurred with the discovery packet. This may include checking if the received stop list $H_I$ already contains the current node's ID, i.e., $i \in H_I$. If so, this indicates that node i has been revisited by packet I with name $f_k \leftarrow \ldots \leftarrow f_1 \leftarrow d$, which triggers dropping of the packet at 805. The packet dropping may be part of a standard interest loop pipeline of a NDN that includes dropping the packet and sending a NACK to the sender of the packet. If a loop is not detected based on the stop list, then additional loop detection steps may include comparing the name and initiator list of the received packet and of the ones stored in the PIT in-record entries. This mechanism may be complimentary to the stop list technique and can detect certain looping traffic even before a re-visit occurs. For instance, when packet I with initiator list $S_I$ arrives, if the name entry in the PIT in-record indicates a previous reception of another discovery interest packet I' with the same name but a different initiator list $S_I'$, and $S_I'$ is a subsequence of $S_I$ but not vice versa, the node detects packet I as looping traffic. This may ensure that a discovery interest packet does not flow back toward its predecessor initiators.

If no loop is detected at 804, then at 806, an in-record entry is written into the PIT with $f_k \leftarrow \ldots \leftarrow f_1 \leftarrow d$, and at 808, it is determined whether an immediate target $f_k$ is in a Content Store (CS) of the node. If $f_k$ is not found in the CS, node i further decides at 809 whether to aggregate the received interest packet by determining whether another discovery interest packet with the same name $f_k \leftarrow \ldots \leftarrow f_1 \leftarrow d$ and the same current initiator $i_q$ as packet I was sent previously. If so, node i aggregates I at 810; otherwise, at 811, the node i inserts a PIT out-record entry $f_k \leftarrow \ldots \leftarrow f_1 \leftarrow d$ (e.g., preparing for a regular forwarding).

If, however, $f_k$ is found in the CS at 808, then node i performs 812-817 and 818-820.

At 812, the node updates the name by removing the immediate target from I's name and determines whether the updated name is empty at 813. If so, then at 813, the discovery data generation pipeline begins to generate data for the service at 814. Otherwise, the updated name is $f_{k-1} \leftarrow \ldots \leftarrow d$, and the node checks whether a discovery interest packet with this name was sent before at 815. If not, node i generates a discovery interest packet I" at 816 with name $f_{k-1} \leftarrow \ldots \leftarrow d$ and initiator list [i] to look for the next immediate target $f_{k-1}$ and writes an out-record entry into the PIT at 817. Otherwise, the discovery packet is aggregated (810). At 818, it is determined whether a discovery interest packet with name $f_k \leftarrow \ldots \leftarrow d$ was sent before. If not, then at 819, node i updates the initiator list $S_I$ to $[i_1, \ldots, i_q, i]$ and records the generation of I" and the update of I by inserting PIT out-record entries. In addition, the node assigns the updated initiator list $S_I$ to the discovery interest packet I at 820. Inserting out-record PIT entries may include recording the outgoing faces of the forwarded discovery interest packets.

At each hop, the forwarder/initiator multicasts the interest packets to its multiple outgoing faces (i.e., connections to neighboring one-hop nodes). Besides possible updates of name, initiator list, and stop list, the forwarding node may implement the following operations: (1) reading the received interest packet's name and the sender's ID in the previous hop; (2) increasing the packet's hop count by 1 and updates the sender's ID to the current node; and (3) assigning a new nonce value to the packet. This may prevent falsely alarming the reciprocal flowing packets among the compute nodes searching each other for task-offloading as looping traffic.

Feedback of Service Discovery Results

Once a discovery interest packet with name d has reached a data producing node having data d, a discovery data packet for a function chain segment $d \to f_1 \to \ldots \to f_k$ may be generated. This discovery data packet then flows backward along the reverse path of the corresponding discovery interest packet to the function chain discovery initiator. The name of a discovery data packet may be the same as its corresponding discovery interest packet, e.g., if a discovery data packet with name $f_k \leftarrow \ldots \leftarrow f_1 \leftarrow d$ is forwarded through link (j,i), a discovery interest packet with name $f_k \leftarrow \ldots \leftarrow f_1 \leftarrow d$ must have been forwarded through link (i,j).

The discovery data packet's name may be updated in the reverse order respective to the discovery interest packet. For instance, if a node having function $f_{k+1}$ has generated a discovery interest packet with name $f_k \leftarrow \ldots \leftarrow f_1 \leftarrow d$ triggered by receiving a discovery interest packet with name $f_{k+1} \leftarrow \ldots \leftarrow f_1 \leftarrow d$, by the time when the node receives the corresponding discovery data packet with name $f_k \leftarrow \ldots \leftarrow f_1 \leftarrow d$, the node generates a discovery data packet with name $f_{k+1} \leftarrow \ldots \leftarrow f_1 \leftarrow d$ and forwards it. In addition, if a node has forwarded a discovery interest packet with name $f_k \leftarrow \ldots \leftarrow f_1 \leftarrow d$, then the node forwards the arriving discovery data packet with the same name.

FIGS. 9A-9F illustrate an example service discovery and feedback process in a DCN 900 in accordance with at least one embodiment. The example service discovery is for a function chain $d \to f_1 \to f_2$. As shown, node 1 is the function chain discovery initiator, node 2 may perform the function $f_2$, nodes 4 and 7 may perform the function $f_1$, and node 5 is a data producing node for the service data d.

Figure 9A:
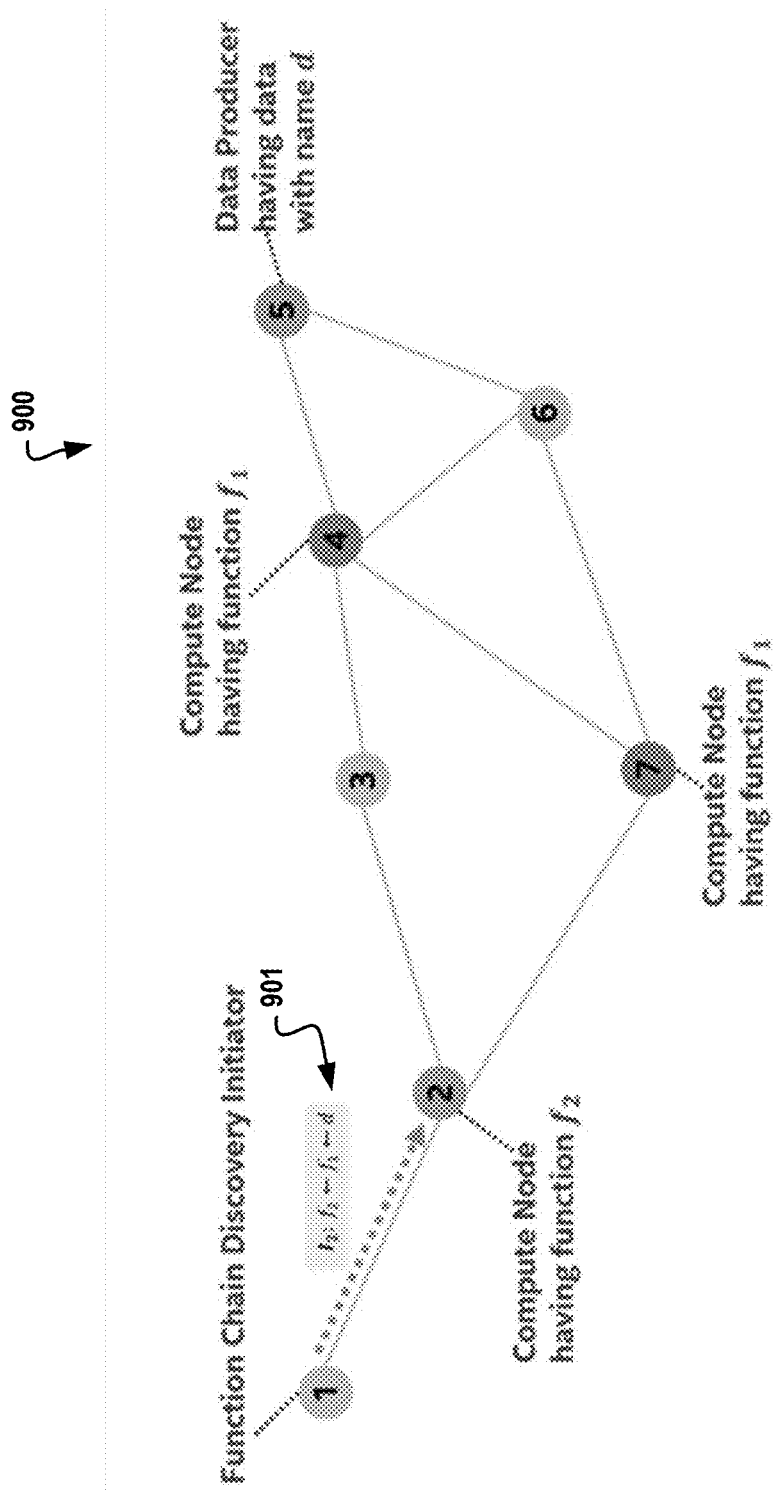
FIGS. 9A-9F illustrate an example service discovery and feedback process in a DCN in accordance with at least one embodiment.
Figure 9B:
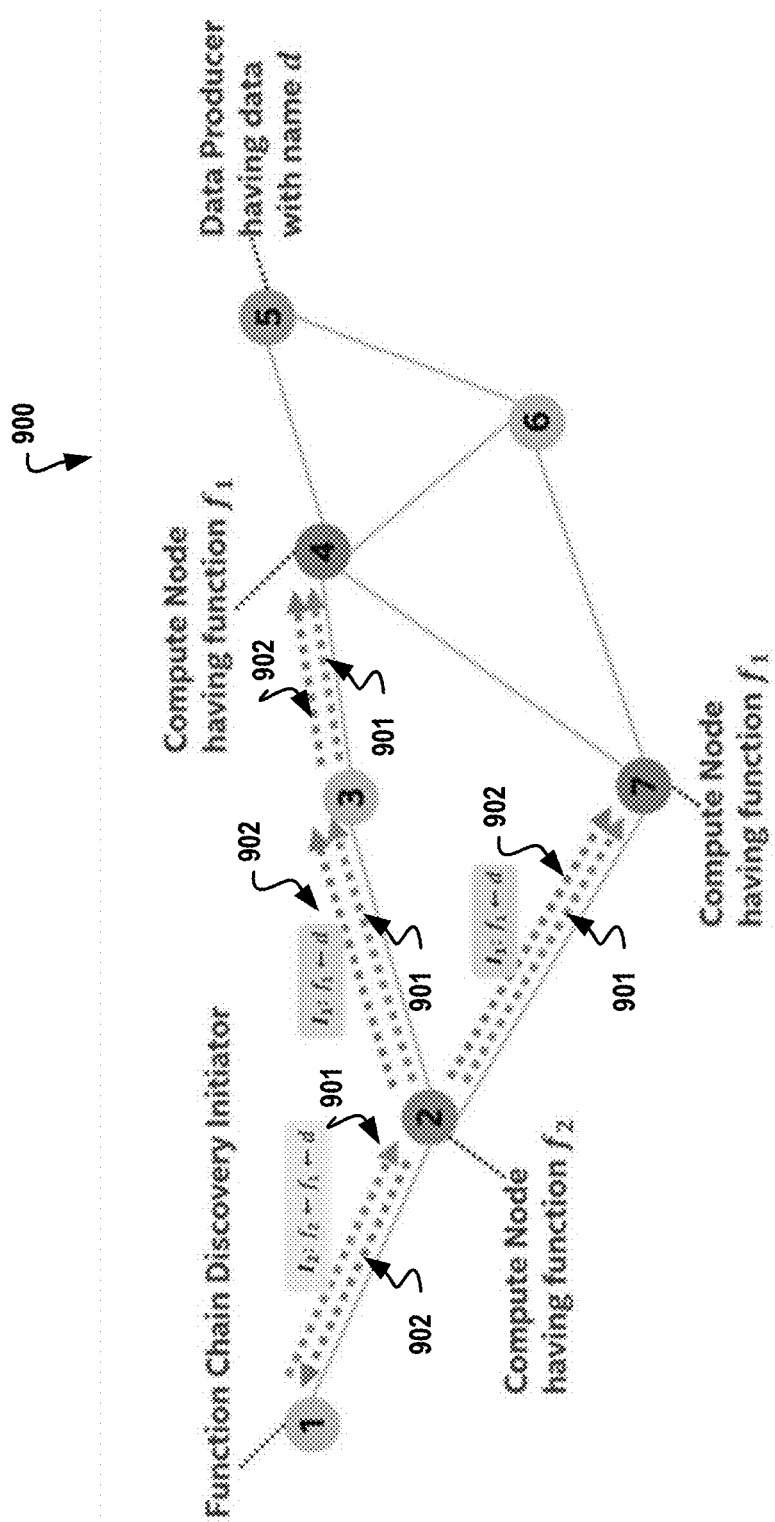

Referring to FIG. 9A, a service discovery interest packet $I_2$ (901) with name $f_2 \leftarrow f_1 \leftarrow d$ and initiator list ["1"] is generated by node 1 and flows to node 2, which may perform function $f_2$. Turning to FIG. 9B, node 2 generates/forwards two discovery interest packets: (1) a discovery interest packet $I_1$ (902) with name $f_1 \leftarrow d$ and initiator list ["1"] searching for function $f_1$; and (2) the discovery interest packet $I_2$ (901) with name $f_2 \leftarrow f_1 \leftarrow d$ but with an updated initiator list ["1, 2"] (which is to search for other nodes having function $f_2$). The interest packet $I_1$ is multicast to all the neighbor nodes (i.e., nodes 1, 3, and 7). In contrast, $I_2$ from node 2 may only be accepted by node 3 and 7 because node 1 detects a loop (i.e., the packet originated at node 1) and drops the received $I_2$ packet.

Figure 9C:
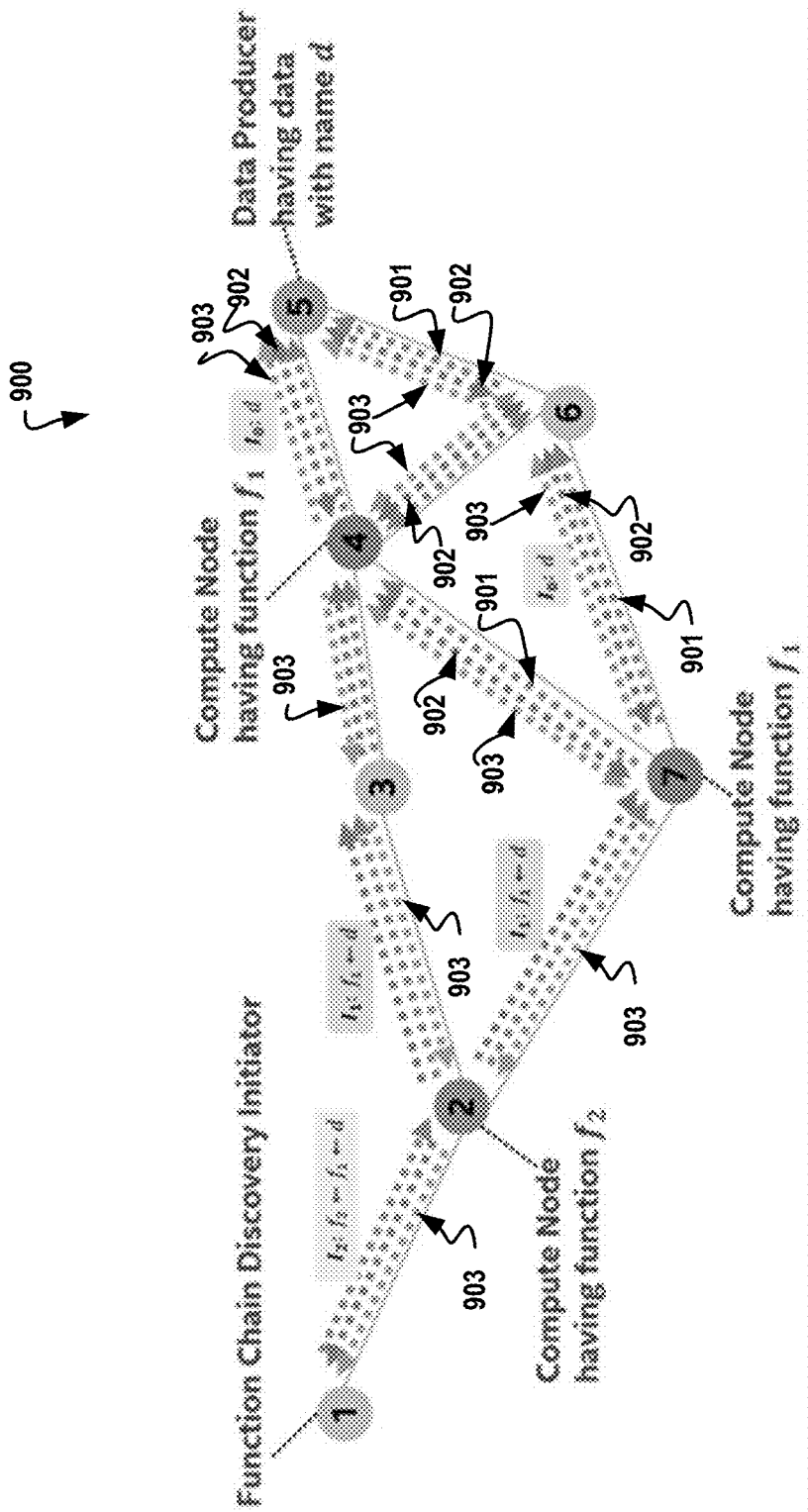

Turning to FIG. 9C, upon arrival of I at node 4 (or 7), which may perform function $f_1$, the node generates/forwards two packets: (1) a discovery interest packet $I_0$ (903) of with name d and initiator list ["4" (or ["7"]) searching for the data producer; and (2) the discovery interest packet $I_1$ (902) with name $f_1 \leftarrow d$ but with an updated initiator list ["2, 4"] (or ["2, 7"]) searching for other nodes having function $f_1$. Nodes 4 and 7 also search each other by mutually sending $I_1$ to prepare for possible $f_1$-task-offloading in the future. At the same time, $I_2$ is forwarded by both node 4 and 7 in a multi-cast manner. The exploration of $I_0$ (903) continues until reaching the data producer node 5, or a dead-end node (e.g., node 1), or the hop limit.

Figure 9D:
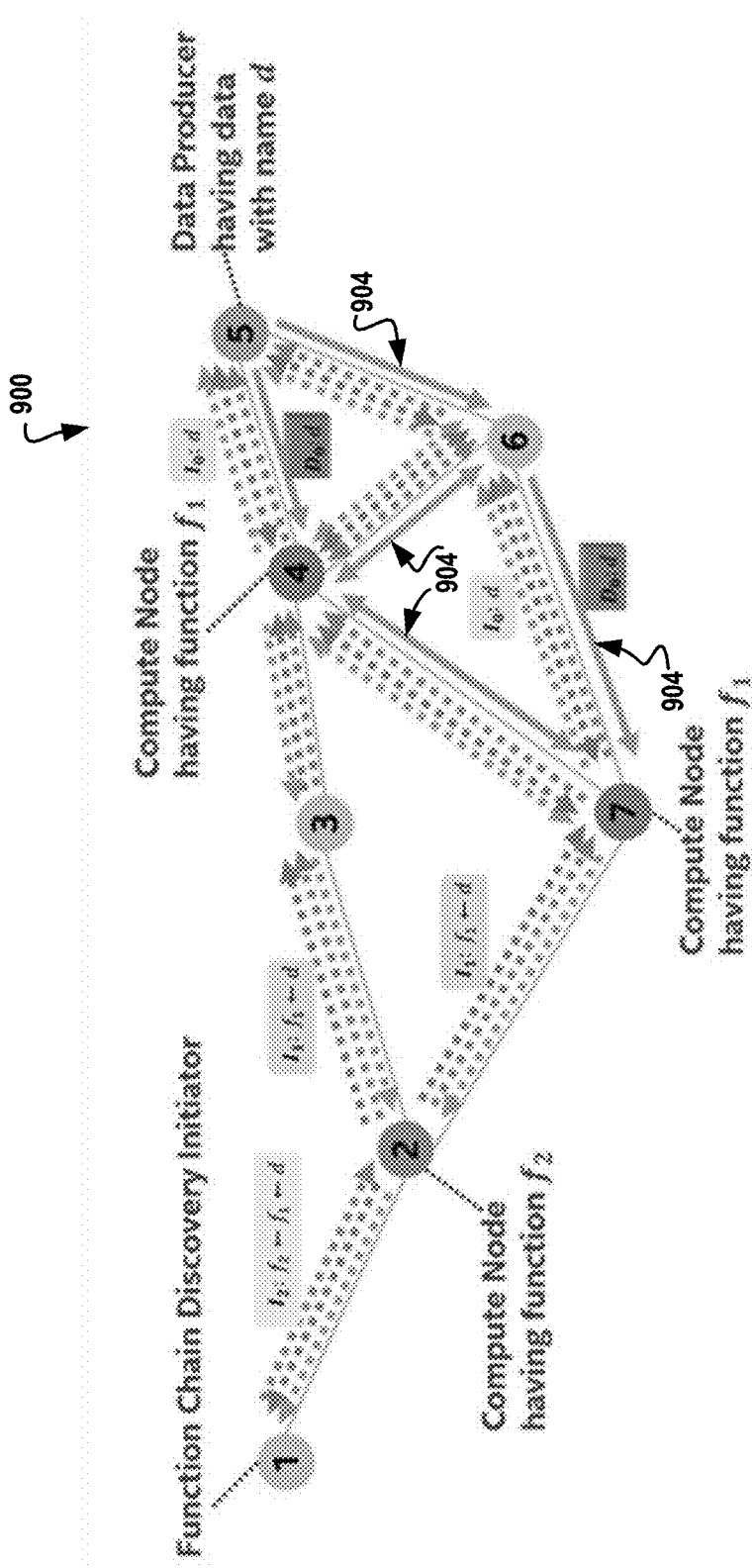
Figure 9E:
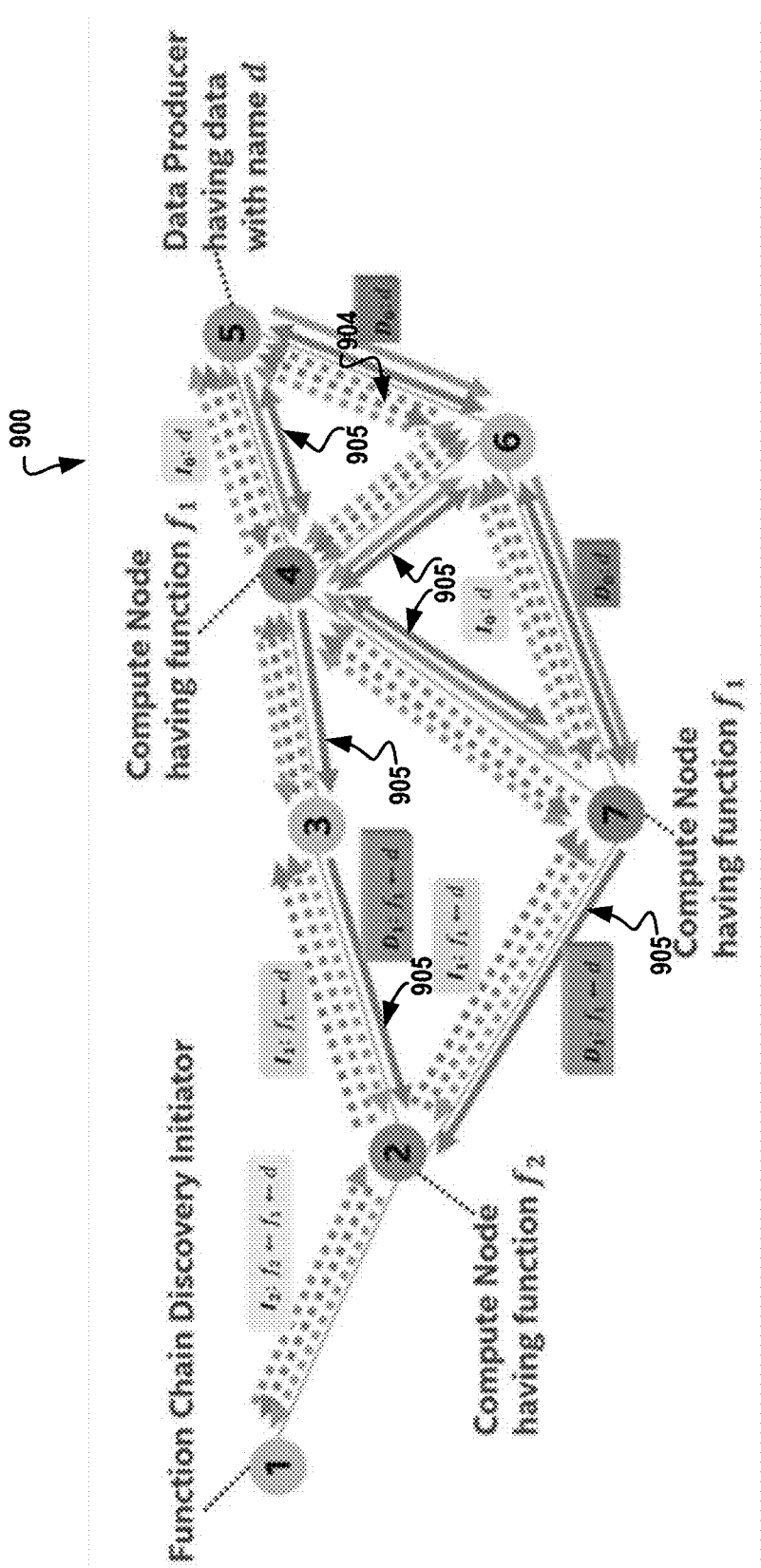
Figure 9F:
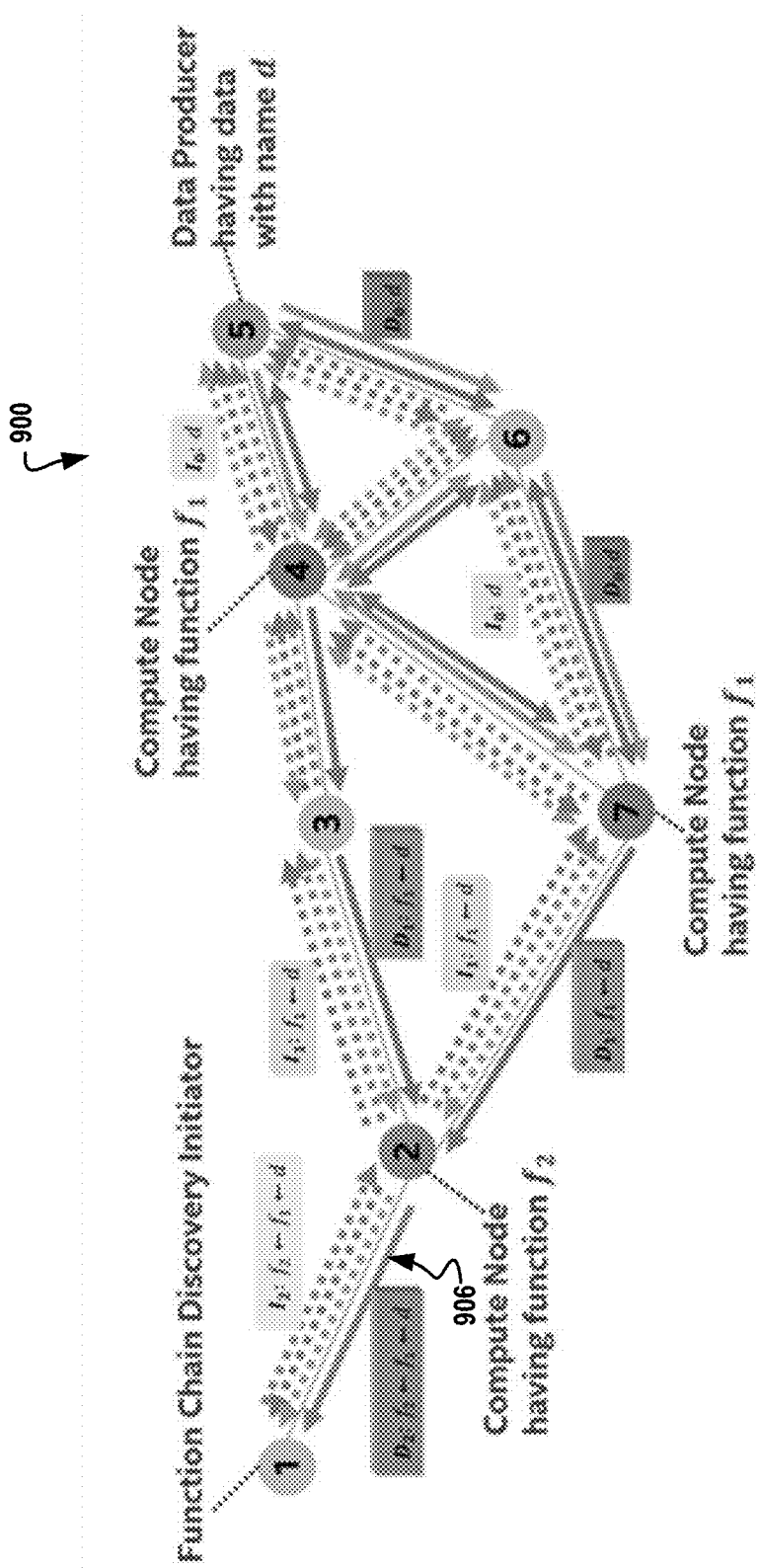

Turning to FIG. 9D, the data producer (node 5) generates a discovery data packet Do (904) with name d, and $D_0$ flows backwards until reaching node 4 and 7, which may implement function $f_1$ and are the initiators of the interest packet $I_0$. Turning to FIG. 9E, node 4 and 7 then generate discovery data packets $D_1$ (905) with name $f_1 \leftarrow d$. Nodes 4 and 7 then forward the $D_1$ packets back toward node 2, which may implement function $f_2$ and is the initiator of the interest packet $I_1$. The nodes also forward the $D_1$ packets toward each other as their mutual discovery feedbacks. Turning to FIG. 9F, after receiving $D_1$, node 2 generates the discovery data packet $D_2$ (906) with name $f_2 \leftarrow f_1 \leftarrow d$ and forwards it back toward node 1.

In certain embodiments, the implementation of a function may be modeled as going through a "processing link" (or "data producing link" for a data producer) with a link capacity dependent on the node's processing capacity (or data producing capacity for a data producer). The routing path may be augmented by adding the processing links and data producing links onto the routing path travelled by the discovery data packet to form an augmented path, which characterizes the overall trajectory travelled by a discovery data packet going through a function chain segment.

The discovery data packets carry/update the discovery result along the augmented path. At each hop, the discovery result carried by the discovery data packet includes an abstract distance value of the (discovered) shortest augmented path segment from a required data producer to the forwarding node. After receiving a discovery data packet through one or multiple faces, a node can calculate the minimum abstract distance of going through the function chain segment via each of those faces. The faces reached from the data producer and the corresponding minimum abstract distance are both recorded into FIB, e.g., as shown in FIGS. 4A-4B. The discovery data producer may also carry/update the minimum abstract distance value along its travelling augmented path. The abstract distance along an augmented path may be the sum of the abstract lengths of links along the path, including the communication, processing and data producing links.

Feedback of the Minimum Abstract Distance Along Augmented Paths

For a service $\phi$ with function chain: $(\phi,0) \to (\phi,1) \to \ldots \to (\phi,K_\phi)$, we denote $L_i^{(\phi,k)}$ as the minimum abstract distance from a data producer of service $\phi$ to node i going through function chain segment $(\phi,0) \to (\phi,1) \to \ldots \to (\phi,k)$, $0 \le k \le K_\phi$. The minimum abstract distance along the augmented path may be updated as follows:

Over the data producing link: When a data producer i of service $\phi$ receives a discovery interest packet with name $f_{(\phi,0)}$, it generates and forwards a discovery data packet immediately, and the carried abstract distance value is initialized as $L_i^{(\phi,0)} = l_{i,prod}^{(\phi)}$.

Over a communication link: When a discovery data packet with name $f_{(\phi,k)} \leftarrow \ldots \leftarrow f_{(\phi,0)}$ is forwarded over link (j,i), the receiving node i reads the bitfield of the discovery data packet and calculates an abstract distance value as $l_{ji} + L_j^{(\phi,k)}$. Define $L_{i,comm}^{(\phi,k)}$ as the minimum abstract distance value obtained by node i via the incident communication links from the neighbors. After listening for a predetermined period, denoted by $T_i^{(\phi,k)}$, during which node i can obtain multiple discovery data packets through multiple faces, denoted by $\mathcal{O}(i, T_i^{(\phi,k)})$, node i calculate $L_{i,comm}^{(\phi,k)}$ as $$L_{i,comm}^{(\phi,k)} = \min_{j \in O\left(i, T_i^{(\phi,k)}\right)} \{l_{ji} + L_j^{(\phi,k)}\}.$$

If node i does not have $f_{(\phi,k)}$, then $L_i^{(\phi,k)} = L_{i,comm}^{(\phi,k)}$.

Over a processing link: As a compute node i having function $f_{(\phi,k)}$ generates a discovery data packet $I_{(\phi,k)}$ with name $f_{(\phi,k)} \leftarrow \ldots \leftarrow f_{(\phi,0)}$ triggered by receiving a discovery data packet $I_{(\phi,k-1)}$ with name $f_{(\phi,k-1)} \leftarrow \ldots \leftarrow f_{(\phi,0)}$, node i recursively calculates the abstract distance value as $L_i^{(\phi,k)} = \min\{1_{i,proc} + L_i^{(\phi,k-1)}, L_{i,comm}^{(\phi,k)}\}$.

Orchestration Framework

FIGS. 10A-10E illustrate a flow diagram of an example DCN orchestration framework in accordance with at least one embodiment. The example process shown in FIGS. 10A-10E may include additional or different operations, and the operations may be performed in the order shown or in another order. In some cases, one or more of the operations shown in FIGS. 10A-10E may be implemented as processes that include multiple operations, sub-processes, or other types of routines. In some cases, operations can be combined, performed in another order, performed in parallel, iterated, or otherwise repeated or performed another manner. In certain embodiments, the operations may be encoded as instructions (e.g., software instructions) that are executable by one or more processors (e.g., processors of the computing node executing the functional simulator) and stored on computer-readable media.

In the example shown and described herein, it is assumed that the network is a time slotted system with constant slot granularity, and we normalize the time slots to integer units $t \in \{0, 1, 2, \ldots\}$. Each orchestration decision is made at the beginning of each time slot, and the resulting action lasts until the end of the time slot. Further, $C_{ij}(t)$ represents the maximum transmission rate of link $(i,j) \in \mathcal{E}$ at time slot t, i.e., the maximum amount of data that can be transmitted from node i to node j during the time in time slot t. If link (i,j) is a wired link, $C_{ij}(t)$ is therefore equal to a constant $\overline{C}_{ij}$. If link (i,j) is a wireless link, it is assumed that $C_{ij}(t)$ is identically and independent distributed across time slots, which is valid by the time slot's duration is longer than the coherence time of the wireless medium, and the expectation of $C_{ij}(t)$ can be denoted by $\overline{C}_{ij}$ and can be estimated by averaging the $C_{ij}(t)$ observed in multiple time slots. The maximum processing rate of a compute node is denoted as $i \in U_{(\phi,k)} \mathcal{P}^{(\phi,k)}$ by $C_{i,proc}$, which is measured by number of processing cycles per time slot. Furthermore, $C_{i,prod}$ represents the maximum data producing rate at a data producer $i \in U_\phi \mathcal{D}^\phi$ at time slot t.

The number of requests for service φ generated by consumer c and injected into the network at time slot t is denoted as $a_c^\phi(t)$, and it is assumed that $a_c^\phi(t)$ is upper bounded by a constant $A_{c,max}^\phi$. The number of compute requests of commodity (φ,k,c) that are scheduled to flow over link $(i,j) \in \mathcal{E}$ at time slot t is denoted by $b_{i,j}^{(\phi,k,c)}(t)$, $1 \leq k \leq K_\phi$. Additionally, $b_{i,j}^{(\phi,0,c)}(t)$ represents as the number of data requests (of commodity (φ,0,c)) for service φ serving consumer c that are scheduled to flow over link $(i,j) \in \mathcal{E}$ at time slot t, $b_{i,proc}^{(\phi,k,c)}(t)$, $1 \leq k \leq K_\phi$ represents the number of requests committed by compute node $i \in \mathcal{P}^{(\phi,k)}$ at time slot t for executing function (φ,k) and serving consumer c, and $p_{i,x}^\phi(t)$ represents the number of data requests handled by a data producer $i \in \mathcal{D}^\phi$ at time slot t for generating the workflow input data for service φ and serving consumer c.

By denoting the a(t), p(t), b(t) respectively as the concatenation of the $a_c^\phi(t)$, $p_{i,c}^\phi(t)$, and $[b_{i,j}^{(\phi,k,c)}(t); b_{i,proc}^{(\phi,k,c)}(t)]$, the orchestration may dynamically control the rates a(t), p(t), b(t) over time slots by solving the following:

$$\underset{a(t),b(t),p(t)}{\text{Maximize}} \sum_\phi \sum_{c \in C^\phi} \log\left(z^{(\phi,K_\phi)} \liminf_{t \to \infty} \frac{1}{t} \sum_{\tau=0}^{t-1} \mathbb{E}\{a_c^\phi(\tau)\}\right) \quad (1)$$

$$\text{Subject to: } \limsup_{t \to \infty} \frac{1}{t} \sum_{\tau=0}^{t-1} \mathbb{E}\{g_i^{(\phi,k,c)}(\tau)\} \leq 0, \text{ for all } (\phi, k), c \in C^\phi, i \in \mathcal{N} \quad (2)$$

$$0 \leq a_c^\phi(t) \leq A_{c,max}^\phi, \text{ for all } \phi, c \in C^\phi \quad (3)$$

$$\sum_\phi \sum_{k=0}^{K_\phi} \sum_{c \in C^\phi} z^{(\phi,k)} b_{ij}^{(\phi,k,c)}(t) \leq C_{ji}, \text{ for all } (i, j) \in \mathcal{E}, j \in O^{(\phi,k)}(i) \quad (4)$$

$$\sum_\phi \sum_{k:i \in \mathcal{P}^{(\phi,k)}} \sum_{c \in C^\phi} r^{(\phi,k)} b_{i,proc}^{(\phi,k,c)}(t) \leq C_{i,proc}, \text{ for all } i \in \bigcup_{(\phi,k)} \mathcal{P}^{(\phi,k)} \quad (5)$$

$$\sum_{\phi:i \in \mathcal{D}^\phi} \sum_{c \in C^\phi} z^{(\phi,0)} p_{i,c}^\phi(t) \leq C_{i,prod}, \text{ for all } i \in \bigcup_\phi \mathcal{D}^\phi \quad (6)$$

$$a_c^\phi(t), b_{ij}^{(\phi,k,c)}(t), b_{i,proc}^{(\phi,k,c)}(t), p_{i,c}^\phi(t) \in \mathbb{Z}^+, \quad (7)$$
$$\text{for all } (\phi, k), c \in C^\phi, i \in \mathcal{N}, (i, j) \in \mathcal{E}$$

For the orchestration problem formulated by Eq. (1)-(7), the objective shown as Eq. (1) is to maximize the total utility of the mean time average of the accepted requests rates of the consumers and services weighted by the delivered data chunk length, and $\mathbb{E}(*)$ denotes the expectation of *. The "logarithm" utility function is chosen for each consumer and service due to proportional fairness consideration. The optimization is subject to the network stability constraints for all the commodities. By defining $g_i^{(\phi,k,c)}(t)$ as the total scheduled incoming requests rate to the request queue of commodity (φ,k,c) at node i subtracted by the total scheduled outgoing request rates from the queue, i.e., $$g_i^{(\phi,k,c)}(t) \triangleq$$
$$\sum_{j:i \in O(j)} b_{ji}^{(\phi,k,c)}(t) + b_{i,proc}^{(\phi,k,c)}(t) 1(i \in \mathcal{P}^{(\phi,k+1)}, k < K_\phi) + a_c^\phi(t) 1(i = c, k = K_\phi) -$$
$$\sum_{j:i \in O(i)} b_{ij}^{(\phi,k,c)}(t) - b_{i,proc}^{(\phi,k,c)}(t) 1(i \in \mathcal{P}^{(\phi,k)}, k > 0) - p_{i,c}^\phi(t) 1(i \in \mathcal{D}^\phi, k = 0),$$

the network stability constraints are described by Eq. (2). The constraints of the maximum exogenously injected request rates initiated by each consumer for each service, the maximum total request forwarding rate over each link, the maximum total processing commitment rate at each compute node, and the maximum total data producing rate at each data producer are respectively described by Eq. (3)-(6). One may note that, in Eq. (4), the maximum total request forwarding rate over link (i,j) is upper bounded by the expected maximum transmission rate of the reverse link, which results from the backward data flowing with respect to the request flowing under DCN paradigm. Finally, Eq. (7) specifies that all the control variables are requests counts and therefore take non-negative integer values denoted by the set $\mathbb{Z}^+$.

Figure 10A:
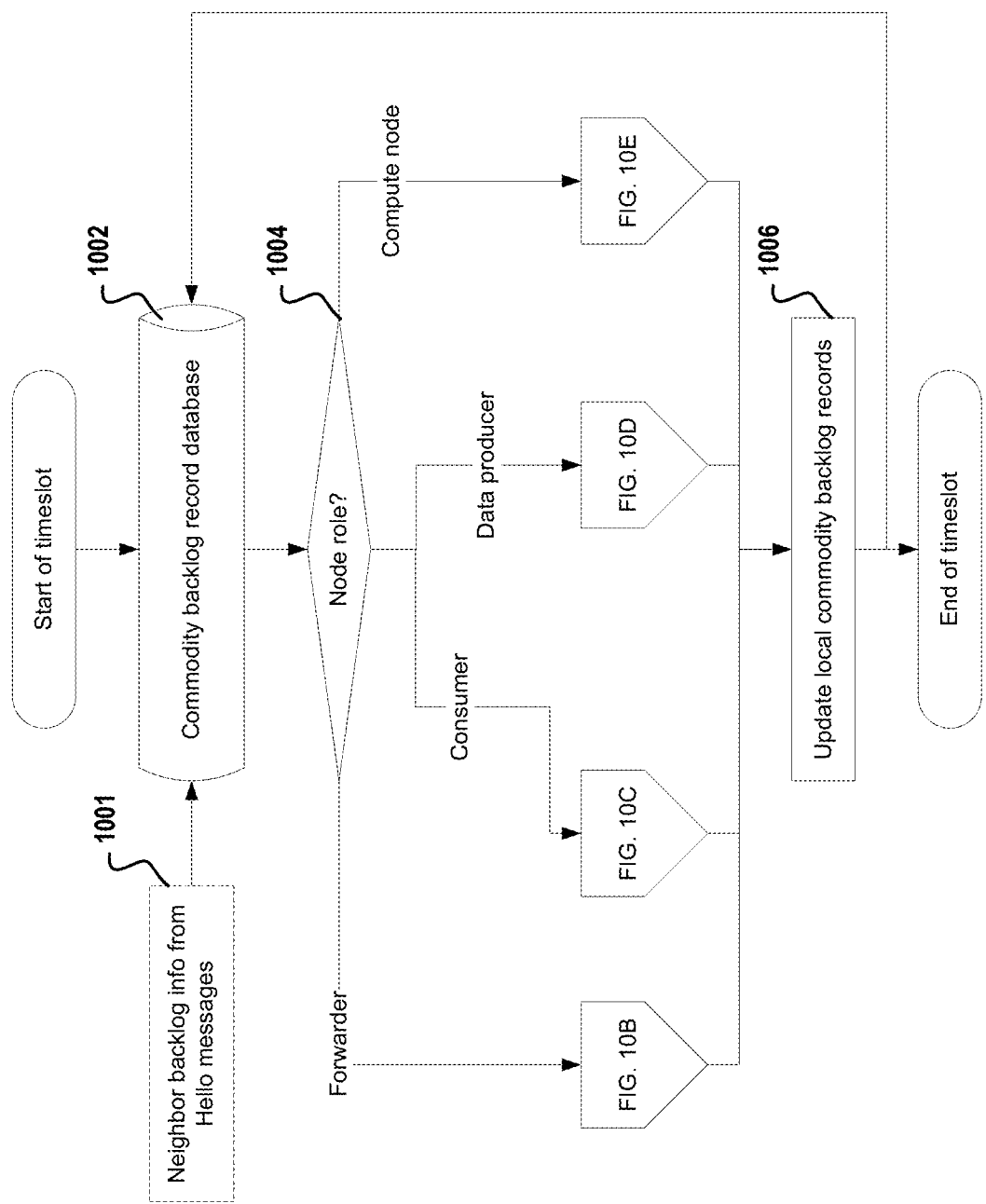
FIGS. 10A-10E illustrate a flow diagram of an example DCN orchestration framework in accordance with at least one embodiment.

Referring to FIG. 10A, an overall orchestration framework 1000 is shown for a DCN in accordance with embodiments described above. The example orchestration framework 1000 is detailed for each potential function of a node, i.e., forwarder, consumer, data producer, compute node, for each timeslot. Each orchestration block for the different roles can be executed and controlled in parallel by their corresponding operation engines (described further below) given the commodity backlog inputs from the commodity backlog record database 1002. As shown in FIG. 10A, the commodity backlog record database 1002 may be updated each timeslot based on the periodic "Hello" messages described above, which may include backlog information 1001 provided by neighboring nodes, as well as outputs from the various engines of the orchestration framework (e.g., updated backlog information) that are used to update the local backlog records at 1006.

Given the allocations of the exogenous request injection rates $a_c^\phi(t)$, the data producing rates $p_{i,c}^\phi(t)$, the processing commitment rates $b_{i,proc}^{(\phi,k,c)}(t)$, and the forwarding rates $b_{i,j}^{(\phi,k,c)}(t)$ of the commodities at each node i, The local commodity backlogs of the node may be updated at 1006 according to:

$$Q_i^{(\phi,k,c)}(t+1) \leq \left[ Q_i^{(\phi,k,c)}(t) - \sum_{j:j \in O(i)} b_{ij}^{(\phi,k,c)}(t) - b_{i,proc}^{(\phi,k,c)}(t) 1(i \in \mathcal{P}^{(\phi,k)}, k > 0) - p_{i,c}^\phi(t) 1(i \in \mathcal{D}^\phi, k = 0) \right]^+ + \sum_{j:i \in O(j)} b_{ji}^{(\phi,k,c)}(t) + b_{i,proc}^{(\phi,k+1,c)}(t) 1(i \in \mathcal{P}^{(\phi,k+1)}, k < K_\phi) + a_c^\phi(t) 1(i = c, k = K_\phi),$$

where $[*]^+ \triangleq \max\{*,0\}$, and $1(*)$ is takes value 1 when * is true and 0 otherwise. In the above equation, $Q_i^{(\phi,k,c)}(t)$ represents a current packet count to which the compute node is committed, $b_{i,j}^{(\phi,k,c)}(t)$ represents outgoing packets forwarded to other nodes, $b_{i,proc}^{(\phi,k,c)}(t)$ represents a processing commitment input of the compute node, $p_{i,c}^\phi(t)$ represents the data production rate, $b_{ji}^{(\phi,k,c)}(t)$ represents incoming (forwarded) packets from other compute nodes, $b_{i,proc}^{(\phi,k+1,c)}(t)$ represents a processing commitment output of the compute node, and $a_c^\phi(t)$ represents a request injection rate.

Figure 10B:
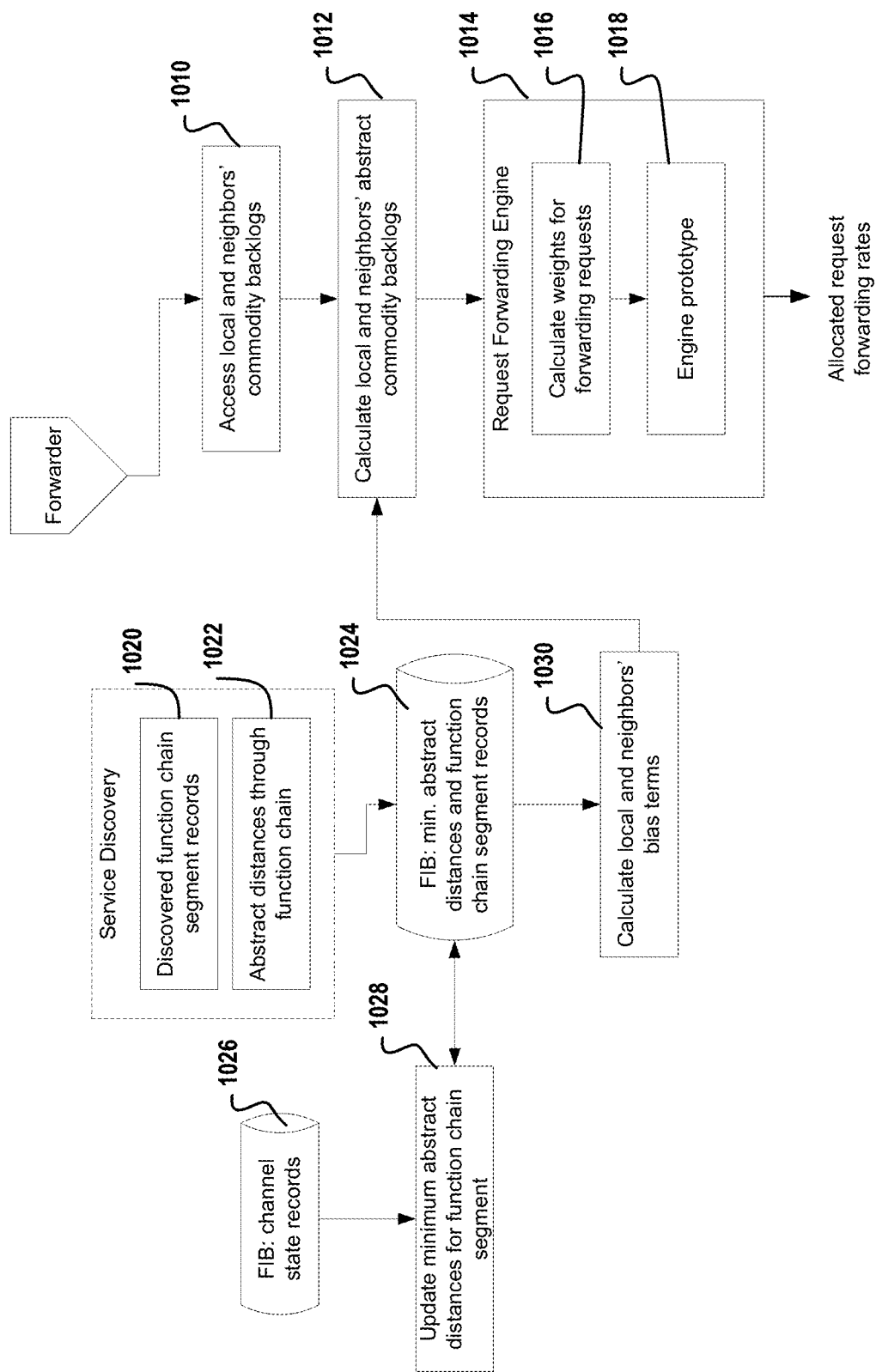

Referring now to FIG. 10B, a node acting as a forwarder may access, at 1010, the local backlog and neighbor backlog information in the commodity backlog record database 1002 (e.g., $Q_i^{(\phi,k,c)}$. In embodiments that incorporate the service discovery techniques described above, the node may then calculate, at 1012, the abstract commodity backlogs for itself and its neighbors. The abstract community backlogs may be calculated based on the information obtained from the service discovery procedure. For instance, as shown in FIG. 10B, the service discovery procedure may obtain discovered function chain segments 1020 and abstract distances 1022 through the function chains (e.g., as described above with respect to FIGS. 9A-9F). That information may be written into the FIB entries 1024, e.g., as described above, and may be used to calculate, at 1030, local and neighbor bias terms. The bias terms and the backlog data are then used to calculate the abstract backlogs at 1012. In addition, the FIB entries 1024 may be updated based on channel state records 1026 also in the FIB entries. Specifically, the channel state records 1026 may be used to update minimum abstract distances for the function chain segments recorded in the FIB entries 1024, e.g., as described above.

For example, the queuing-based backlog of the commodity $(\phi,k,c)$ at node i in time slot t may be referred to as $Q_i^{(\phi,k,c)}(t)$, whereas with service discovery results, we the abstract backlog of commodity $(\phi,k,c)$ at node i in time slot t may be referred to as $\tilde{Q}_i^{(\phi,k,c)}(t)$.

A node i may calculate the abstract commodity backlogs and input them into the forwarding engine according to the following:

$$\tilde{Q}_i^{(\phi,k,c)}(t) = Q_i^{(\phi,k,c)}(t) + \eta_i \frac{L_i^{(\phi,k)}}{z^{(\phi,k)}},$$

where $\eta_i$ is a parameter locally used by node i to control the weight of the bias factor respective to the commodity queue backlogs. In addition, by observing the queue lengths $Q_j^{(\phi,k,c)}(t_j')$ of each neighbor node $j \in \mathcal{O}^{(\phi,k)}(i)$ from the most recently received "Hello" message sent by node j at time $t_j'$ ($t_j' \leq t$), the node i may calculate $\tilde{Q}_j^{(\phi,k,c)}(t_j')$ as follows:

$$\tilde{Q}_j^{(\phi,k,c)}(t_j') = Q_j^{(\phi,k,c)}(t_j') + \eta_i \frac{L_j^{(\phi,k)}}{z^{(\phi,k)}}.$$

In some embodiments, one of two matrices of evaluating the abstract length of a link on an augmented path may be used. One option is to simply assign value 1 as the link's abstract length, and therefore the abstract distance of the augmented path is its hop count. Another choice is to assign a capacity dependent value as the abstract length of a link. For example, for a communication link (i,j), its abstract length $l_{ij}$ can be defined as $l_{ij} \triangleq 1/\overline{C}_{ji}$, where $\overline{C}_{ji}$ is the time average transmission capacity over the link; for a processing link at compute node i, its abstract length $l_{i,proc}^{(\phi,k)}$ for implementing the kth function of service $\phi$ can be defined as $$l_{i,proc}^{(\phi,k)} \triangleq \frac{r^{(\phi,k)}}{z^{(\phi,k)} C_{i,proc}},$$

where $C_{i,proc}$ is the processing capacity at node i, $r^{(\phi,k)}$ is the processing complexity of function $(\phi,k)$ defined as the number of cycles needed to process a data chunk, and $z^{(\phi,k)}$ represents function $(\phi,k)$'s output data chunk size; and for a data producing link at data producer node i, its abstract length $l_{i,prod}^{(\phi)}$ for generating the data for service $\phi$ can be defined as $l_{i,prod}^{(\phi)} \triangleq 1/C_{i,prod}$, where $C_{i,prod}$ is the data producing capacity at node i.

Orchestration Engines

The node can then provide the abstract commodity backlog information to its request forwarding engine 1014. The request forwarding engine 1014 may allocate the request forwarding rates over link (i,j), $j \in \mathcal{O}(i)$, which may include two submodules: one for calculating weights for forwarding requests (1016) and another for implementing an engine prototype with:

Input: $\tilde{Q}_i^{(\phi,k,c)}(t)$, $\tilde{Q}_j^{(\phi,k,c)}(t')$, $z^{(\phi,k)}$, $C_{ji}$, where the index $(\phi,k,c)$ is denoted by m: $m \triangleq (\phi_m, k_m, c_m)$ Output: $W_m(t) = [z^{(\phi_m,k_m)}]^2 [\tilde{Q}_i^{(\phi_m,k_m,c_m)}(t) - (\tilde{Q}_j^{(\phi_m,k_m,c_m)}(t_j')]$, $v_m = z^{(\phi_m,k_m)}$, and $C_0 = \overline{C}_{ji}$.

The outputs $W_m(t)$, $v_m$, and $C_0$ are then input to the engine prototype. The request forwarding engine's structure of queuing-based control (with no service discovery assistance) is the same as the above one with service discovery assistance, except for the difference that $\tilde{Q}_i^{(\phi_m,k_m,c_m)}(t)$ and $\tilde{Q}_j^{(\phi_m,k_m,c_m)}(t_j')$ is replaced by $Q_i^{(\phi_m,k_m,c_m)}(t)$ and $Q_j^{(\phi_m,k_m,c_m)}(t_j')$, respectively.

Each node i may use the same engine prototype for allocating processing rates, forwarding rates, and data producing rates, respectively, with different weight inputs. The engine prototype may operate as follows:

Input the weights $W^m(t)$, capacity $C_0$, and size/complexity parameters $v^m$, where m is the index of $W^m(t)$ and $v^m$.

Find the index m* such that $m^*=\text{argmax}_m\{W^m(t)\}$.

Output $\mu^m(t)$ for all the m as the allocated rates:

$$\mu^m(t) = \begin{cases} \lfloor \frac{C_0}{v^m} \rfloor, & \text{if } m = m^* \text{ and } W^m(t) > 0 \\ 0, & \text{otherwise} \end{cases}$$

The output of the request forwarding engine then includes the allocated request forwarding rates $b_{ij}^{(\phi,k,c)}(t)$ (which are also the outputs of the engine prototype, i.e., $b_{ij}^{(\phi_m,k_m,c_m)}(t)=\mu^m(t)$).

The request forwarding engine may calculate the values of the $b_{ij}^{(\phi,k,c)}(t)$ for each neighbor $j \in \mathcal{O}(i)$ to solve the following optimization to forward the requests:

$$\underset{\{b_{ij}^{(\phi,k,c)}(t)\}}{\text{Maximize}} \sum_\phi \sum_{k:j\in O(i)} \sum_{c\in C^\phi} [z^{(\phi,k)}]^2 [\tilde{Q}_i^{(\phi,k,c)}(t) - \tilde{Q}_j^{(\phi,k,c)}(t'_j)] b_{ij}^{(\phi,k,c)}(t)$$

Subject to: $\sum_\phi \sum_{k:j\in O(i)} \sum_{c\in C^\phi} z^{(\phi,k)} b_{ij}^{(\phi,k,c)}(t) \leq C_{ji}$, $b_{ij}^{(\phi,k,c)}(t) \in \mathbb{Z}^+$.

In embodiments where the service discovery information is used, the inputs to the request forwarding engine 1014 are the abstract commodity backlogs calculated at 1012. However, in some embodiments, where the service discovery procedure is not be implemented, the inputs to the request forwarding engine 1014 may be the commodity backlog information accessed at 1010. The allocated request forwarding rates can then be used, e.g., as shown in FIG. 10A, to update the commodity backlog records at 1006.

Figure 10C:
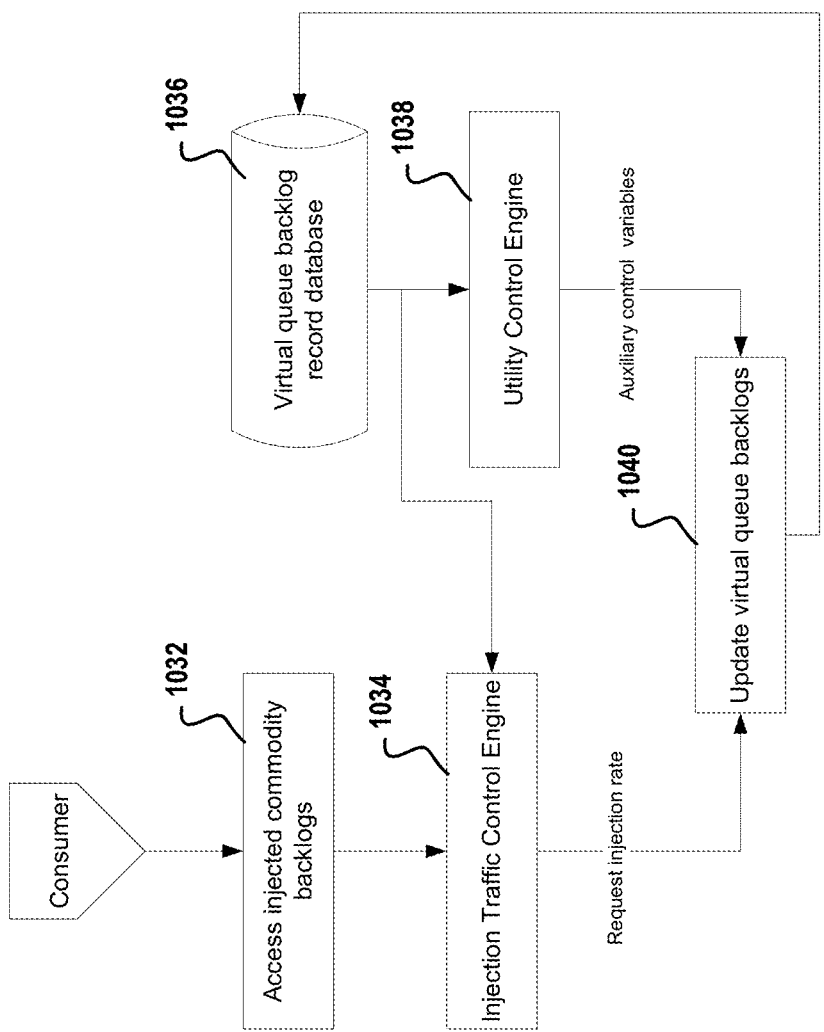

Referring now to FIG. 10C, a node acting as a consumer may access the injected commodity backlog information (e.g., 511 of FIG. 5, which may be represented as $Q_i^{(\phi,k,c)}(t)$ at the consumer node) at 1032 provide those as input to the injection traffic control engine 1034. The node may also provide virtual queue backlog information from the virtual queue backlog record database 1036 to the injection traffic control engine 1034.

A node may include a virtual queue backlog record database and an operation module of updating virtual queue backlogs if the node is the consumer of certain services. The virtual queues may be used in obtaining rigorous throughput utility performance guarantee for solving the optimization problem. A virtual queue may be setup at consumer c for service $\phi$ with queue backlog $Y_c^\phi(t)$, corresponding to the creation of a continuous auxiliary control variable $y_c^\phi(t)$ together with the request injection rate $a_c^\phi(t)$. A virtual queue backlog may then be updated according to the following:

$$Y_c^\phi(t+1)=[Y_c^\phi(t)+y_c^\phi(t)-z^{(\phi,K_\phi)}a_c^\phi(t)]^+.$$

The introduction of the auxiliary variable $y_c^\phi(t)$ and the virtual queue backlog $Y_c^\phi(t)$ the utility and traffic control may transform the original problem described by Eq. (1)-(7) above into a mathematical tractable form, which is due to the strict concavity of the objective function shown as Eq. (1) and the non-convexity of the domains of a(t), p(t), b(t) shown as Eq. (7).

After denoting y(t) as the concatenated vector of $y_c^\phi(t)$ and $\mathbb{R}^+$ as the set of non-negative real number, the problem in Eq. (2)-(8) may thus be transformed into the following equivalent problem:

$$\underset{a(t),b(t),p(t),y(t)}{\text{Maximize}} \lim \inf_{t \to \infty} \frac{1}{t} \sum_{\tau=0}^{t-1} \sum_\phi \sum_{c \in C^\phi} \mathbb{E}\{\log(y_c^\phi(\tau))\} \quad (8)$$

Subject to:

$$\lim\sup_{t \to \infty} \frac{1}{t} \sum_{\tau=0}^{t-1} \mathbb{E}\{y_c^\phi(\tau) - z^{(\phi,K_\phi)}a_c^\phi(t)\} \leq 0, \text{ for all } \phi, c \in C^\phi \quad (9)$$

$$0 \leq y_c^\phi(\tau) \leq A_{c,max}^\phi, \text{ for all } \phi, c \in C^\phi \quad (10)$$

$$y_c^\phi(\tau) \in \mathbb{R}^+, \text{ for all } \phi, c \in C^\phi \quad (11)$$

$$Eq.(3) - Eq.(8) \quad (12)$$

Eq. (9) may be satisfied by controlling the virtual queue length $Y_c^\phi(t)$ to be stable.

Based on both inputs, the injection traffic control engine 1034 determines a request injection rate $a_i^\phi(t)$, which may be determined as follows:

Input $Q_i^{(\phi,k,c)}(t), Y_i^\phi(t)$;

Output $a_i^\phi(t): a_i^\phi(t) = \begin{cases} \lfloor A_{c,max}^\phi \rfloor, & \text{if } Y_i^\phi(t) > z^{(\phi,K_\phi)}Q_i^{(\phi,K_\phi,i)}(t) \\ 0, & \text{otherwise} \end{cases}$, where $\lfloor * \rfloor$ represents taking the largest integer without exceeding *.

The injection traffic control engine may calculate the value of $a_i^\phi(t)$ to solve the following optimization for each requested service $\phi$:

$$\underset{a_i^\phi(t)}{\text{Maximize}} \left[ Y_i^\phi(t) - z^{(\phi,K_\phi)} Q_i^{(\phi,K_\phi,i)}(t) \right] a_c^\phi(t)$$

Subject to: $0 \leq a_c^\phi(\tau) \leq A_{c,max}^\phi$, $a_c^\phi(\tau) \in \mathbb{Z}^+$.

The node also provides the virtual queue backlog information (e.g., $Y_c^\phi(t)$ described above) from the virtual queue backlog record database 1036 to the utility control engine 1038, which determines auxiliary control variables $y_c^\phi(t)$. The utility control engine 1038 may determine the value of $y_c^\phi(t)$ as follows:

Input $Y_i^\phi(t)$;

Output $y_i^\phi(t): y_i^\phi(t) = \min\left\{ \frac{V}{Y_i^\phi(t)}, A_{i,max}^\phi \right\}$, for all $\phi$ such that $i \in C^\phi$, where V is a control parameter whose value indicates the emphasis on maximizing throughput utility with respect to alleviating network congestion, where $A_{i,max}^\phi$ is the upper limit of $a_c^\phi(t)$.

The utility control engine may calculate the value of $y_i^\phi(t)$ to solve the following optimization for each requested service p:

$$\underset{y_i^\phi(t)}{\text{Maximize}} \quad V\log(y_i^\phi(t)) - y_i^\phi(t)Y_c^\phi(t)$$

$$\text{Subject to:} \quad 0 \le y_c^\phi(\tau) \le A_{c,max}^\phi, \ y_c^\phi(\tau) \in \mathbb{R}^+.$$

The auxiliary control variables and the request injection rate are then used to update the virtual queue backlogs at 1040, e.g., according to $$Y_c^\phi(t+1) = [Y_c^\phi(t) + y_c^\phi(t) - Z^{(\phi,K\phi)}a_c^\phi(t)]^+.$$

The request injection rate information can be used, e.g., as shown in FIG. 10A, to update the commodity backlog records at 1006.

Figure 10D:
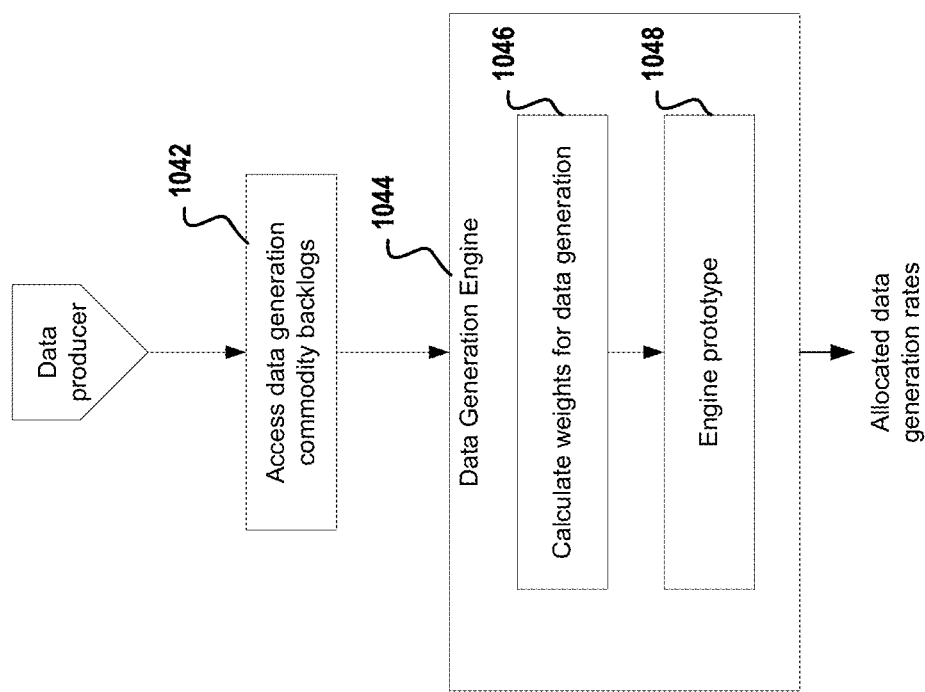

Referring now to FIG. 10D, a node acting as a data producer may access, at 1042, data generation commodity backlog information (e.g., 515 of FIG. 5, which may be represented as $Q_i^{(\phi,k,c)}(t)$ at the data producer node, as described above), which is provided to the data generation engine 1044. If a node i is a data producer for certain services, it can allocate the rates of generating the data required by those services by running the data generation engine (e.g., 606), which may include a module for calculating weights for data producing and another for implementing the engine prototype.

Weight calculation for data producing at data producer i may consist of the following:

Input commodity backlog $Q_i^{(\phi,0,c)}(t)$, chunk size $z^{(\phi,0)}$, maximum data producing rate $C_{i,prod}$, where the index $(\phi,0,c)$ is denoted by m: $m \triangleq (\phi_f, 0, c_f)$.

Output $W^m(t) = z^{(\phi_m,0)} Q_i^{(\phi_m,0,c_m)}(t)$, $v^m = z^{(\phi_m,0)}$, and $C_0 = C_{i,prod}$.

The outputs $W^m(t)$, $v^m$, and $C_0$ are then input to the engine prototype, and the output of the data generation engine includes the allocated data producing rates $p_{i,c}^\phi(t)$ (which are the also the outputs of the engine prototype, i.e., $p_{i,c_m}^{\phi_m}(t) = \mu^m(t)$).

The data generation engine then calculates weights for data generation at 1046 (e.g., $W^m(t)$, $v^m$, and $C_0$ as described above), and then uses the weights as inputs to the engine prototype. The data generation engine outputs allocated data generation rates (e.g., $p_{i,c}^\phi(t)$ described above), which can then be used, e.g., as shown in FIG. 10A, to update the commodity backlog records at 1006.

The data generation engine 1044 may calculate the value of the $p_{i,c}^\phi(t)$ to solve the following optimization to produce the data for all the consumers requesting the supportable services:

$$\underset{\{p_{i,c}^\phi(t)\}}{\text{Maximize}} \sum_{\phi:i \in D^\phi} \sum_{c \in C^\phi} [z^{\phi,0}]^2 Q_i^{(\phi,0,c)}(t) p_{i,c}^\phi(t)$$

$$\text{Subject to:} \sum_{\phi:i \in D^\phi} \sum_{c \in C^\phi} z^{(\phi,0)} p_{i,c}^\phi(t) \le C_{i,prod}, p_{i,c}^\phi(t) \in \mathbb{Z}^+.$$

Figure 10E:
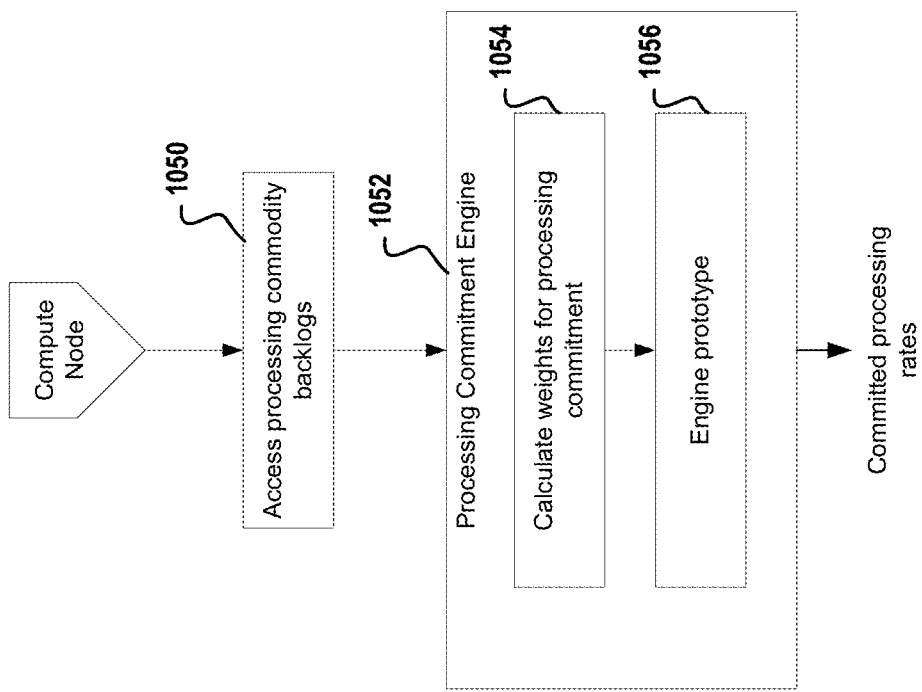

Referring now to FIG. 10E, a node acting as a compute node may access, at 1050, processing commodity backlog information (e.g., (e.g., 512, 513 of FIG. 5, which may be represented as $Q_i^{(\phi,k,c)}(t)$ at the compute node, as described above), which is provided to the processing commitment engine 1052. If a node i is a compute node for certain functions (e.g., 502, 504), it can allocate the processing commitment rates $b_{i,proc}^{(\phi,k,c)}(t)$ for executing these functions by running the processing commitment engine 604, which may include submodules for weight calculation and the engine prototype described above.

The weight calculation for the processing commitment at node i may consist of the following:

Input commodity backlog $Q_i^{(\phi,k,c)}(t)$, data chunk size $z^{(\phi,k)}$, processing complexity $r^{(\phi,k)}$, maximum processing rate $C_{i,proc}$, wherein the index $(\phi,k,c)$ is denoted by m: $m \triangleq (\phi_f, k_f, c_f)$.

$$\text{Output } W^m(t) = \frac{\left[z^{(\phi_m,k_m)} Q_i^{(\phi_m,k_m,c_m)}(t) - z^{(\phi_m,k_m-1)} Q_i^{(\phi_m,k_m-1,c_m)}(t)\right] z^{(\phi_m,k_m)}}{r^{(\phi_m,k_m)}},$$

$$v^m = r^{(\phi_m,k_m)}, \text{ and } C_0 = C_{i,proc}.$$

The outputs $W^f(t)$, $v^f$, and $C_0$ are then input to the engine prototype described above, and the output of the processing commitment engine (e.g., 604) may include the allocated processing commitment rates $b_{i,proc}^{(\phi,k,c)}(t)$ (which are the also the outputs of the engine prototype, i.e., $b_{i,proc}^{(\phi_m,k_m,c_m)}(t) = \mu^m(t)$). The committing processing rates can then be used, e.g., as shown in FIG. 10A, to update the commodity backlog records at 1006.

The processing commitment engine may calculate the value of the $b_{i,proc}^{(\phi,k,c)}(t)$ to solve the following optimization to make processing commitments:

$$\underset{\{b_{i,poc}^{(\phi,k,c)}(t)\}}{\text{Maximize}} \sum_\phi \sum_{k:i \in P(\phi,k)} \sum_{c \in C^\phi} \left[z^{(\phi,k)} Q_i^{(\phi,k,c)}(t) - z^{(\phi,k-1)} Q_i^{(\phi,k-1,c)}(t)\right] z^{(\phi,k)} b_{i,proc}^{(\phi,k,c)}(t)$$

$$\text{Subject to:} \sum_\phi \sum_{k:i \in P(\phi,k)} \sum_{c \in C^\phi} r^{(\phi,k)} b_{i,poc}^{(\phi,k,c)}(t) \le C_{i,proc}.$$

Late Response of Discovery Data Packet and Update of the Minimum Abstract Distance In certain embodiments, a node located on at least one augmented path may wait and keep listening for a predetermined period after obtaining a first required abstract distance value via a face and may calculate the minimum abstract distance among possibly multiple abstract distance values gathered from multiple faces during the listening time. These received discovery data packets can be aggregated into one that is forwarded back toward the initiator after the listening period ends. After forwarding, instead of deleting the corresponding PIT entry, it may be tagged as a backup entry and possibly moved into a secondary memory. The backup PIT entry can be kept for a longer backup period until being deleted.

In case a required discovery data packet forwarded by node j arrives at a node i later than the end of node i's listening period (but earlier than its backup period ends), by which a $L_i^{(\phi,k)}$ value has been calculated and forwarded, but the newly received abstract distance value $L_j^{(\phi,k)}$ satisfies $1_{ji}+L_i^{(\phi,k)}<L_i^{(\phi,k)}$, or value $L_j^{(\phi,k-1)}$ satisfies $1_{ji}+L_j^{(\phi,k-1)}+1_{i,proc}<L_i^{(\phi,k)}$, then node i updates its local $L_i^{(\phi,k)}$ value to $1_{ji}+L_j^{(\phi,k)}$ or $1_{ji}+L_j^{(\phi,k-1)}+1_{i,proc}$. Afterwards, node i refers the backup PIT entry and forwards a new discovery data packet carrying the updated $L_i^{(\phi,k)}$.

Adaptive Data Packet Routing

In certain instances, a DCN may contain moving nodes (e.g., mobile compute devices, e.g., mobile phones, or vehicles) which may result in that one or multiple routing paths travelled by the interest packets are no longer available or become too expensive to utilize by the time when the data chunks flow back. In this disclosure, the following mechanisms may be used enable the adaptation of data chunks' routing.

Refer to Other Interest Packets Requested by the Same Consumer:

Since the interest packets generated by the same consumer may route along multiple paths, an intermediate node may have received multiple interest packets of the same commodity from multiple faces, which are also the outgoing faces for data chunks. Thus, in data chunk's routing, if an outgoing face no longer reaches the next hop forwarder, or the forwarding cost via an outgoing face increases to an unbearable level, the node can re-route the corresponding data chunks by simply forwarding them to other outgoing faces that lead to the same consumer.

If a node i having received data chucks with name $f_K \leftarrow \ldots \leftarrow f_1 \leftarrow d$ loses all the next-hop forwarders recorded in the PIT and has no additional knowledge where to forward the data chunk, node i then searches the next-hop forwarder by initiating a special discovery procedure. This discovery procedure is similar to the one above with two differences:

The generated discovery interest packet's name is $f_{k+1} \rightarrow \ldots \rightarrow f_K \rightarrow$ Consumer_ID, indicating the next step searching target is $f_{k+1}$, where K is the last function index, and the final target is the consumer.

If the special discovery interest packet with (possibly updated) name $f_k \rightarrow \ldots \rightarrow f_K \rightarrow$ Consumer_ID arrives at a node j that has knowledge of reaching the consumer while going through $f_k \rightarrow \ldots \rightarrow f_K$, e.g., node j is on another routing path to the consumer. then node j can directly generate a discovery data packet and forwards it back toward node i.

If a moving node having received the data chunk happens to detect no authorized neighbor or detects at least one suspicious/adversary node in its radio range, for security purpose, the node carries the data chunk for a period until moving to a secure area where the detected neighbors are authorized. Then the node either resumes the forwarding or initiates a new discovery procedure to search the route.

The node can then provide the abstract commodity backlog information to its request forwarding engine 1014. The request forwarding engine 1014 may allocate the request forwarding rates over link (i,j), $j \in \mathcal{O}(i)$, by running the request forwarding engine (e.g., 603, 605), which may include two submodules: one for calculating weights for forwarding requests (1016) and another for implementing an engine prototype described below.

Each node i may use the same engine prototype for allocating processing rates, forwarding rates, and data producing rates, respectively, with different weight inputs. The engine prototype may operate as follows:

Input the weights $W^m(t)$, capacity $C_0$, and size/complexity parameters $v^m$, where m is the index of $W^m(t)$ and $v^m$.

Find the index $m^*$ such that $m^* = \mathrm{argmax}_m \{W^m(t)\}$.

Output $\mu^m(t)$ for all the m as the allocated rates:

$$\mu^m(t) = \begin{cases} \left\lfloor \dfrac{C_0}{v^m} \right\rfloor, & \text{if } m = m^* \text{ and } W^{m^*}(t) > 0 \\ 0, & \text{otherwise} \end{cases}.$$

Weight calculation for request forwarding over link (i,j) may consist of the following:

Input commodity backlog $Q_i^{(\phi,k,c)}(t)$, observed $Q_j^{(\phi,k,c)}(t')$ at time t', chunk size $z^{(\phi,k)}$, expected maximum transmission rate $\overline{C}_{ji}$, where the index $(\phi,k,c)$ is denoted by m: $m \triangleq (\phi_m, k_m, c_m)$.

Output $W^m(t) = z^{(\phi_m,k_m)}[Q_i^{(\phi_m,k_m,c_m)}(t) - Q_j^{(\phi_m,k_m,c_m)}(t'_j)]$, $v^m = z^{(\phi_m,k_m)}$, and $C_0 = \overline{C}_{ji}$.

The outputs $W_m(t)$, $v^m$, and $C_0$ are then input to the engine prototype, and the output of the request forwarding engine then includes the allocated request forwarding rates $b_{ij}^{(\phi,k,c)}(t)$ (which are also the outputs of the engine prototype, i.e., $b_{ij}^{(\phi_m,k_m,c_m)}(t)$).

The request forwarding engine may calculate the values of the $b_{ij}^{(\phi,k,c)}(t)$ for each neighbor $j \in \mathcal{O}(i)$ to solve the following optimization to forward the requests:

$$\underset{\{b_{ij}^{(\phi,k,c)}(t)\}}{\text{Maximize}} \sum_\phi \sum_{k:j \in O(i)} \sum_{c \in C^\phi} [z^{(\phi,k)}]^2 [Q_i^{(\phi,k,c)}(t) - Q_j^{(\phi,k,c)}(t'_j)] b_{ij}^{(\phi,k,c)}(t)$$

$$\text{Subject to:} \sum_\phi \sum_{k:j \in O(i)} \sum_{c \in C^\phi} z^{(\phi,k)} b_{ij}^{(\phi,k,c)}(t) \leq \overline{C}_{ji}, \ b_{ij}^{(\phi,k,c)}(t) \in \mathbb{Z}^+.$$

In embodiments where the service discovery information is used, the inputs to the request forwarding engine 1014 are the abstract commodity backlogs calculated at 1012. However, in some embodiments, where the service discovery procedure is not be implemented, the inputs to the request forwarding engine 1014 may be the commodity backlog information accessed at 1010. The allocated request forwarding rates can then be used, e.g., as shown in FIG. 10A, to update the commodity backlog records at 1006.

Referring now to FIG. 10C, a node acting as a consumer may access the injected commodity backlog information (e.g., 511 of FIG. 5, which may be represented as $Q_i^{(\phi,k,c)}(t)$ at the consumer node) at 1032 provide those as input to the injection traffic control engine 1034. The node may also provide virtual queue backlog information from the virtual queue backlog record database 1036 to the injection traffic control engine 1034.

A node may include a virtual queue backlog record database and an operation module of updating virtual queue backlogs if the node is the consumer of certain services. The virtual queues may be used in obtaining rigorous throughput utility performance guarantee for solving the optimization problem. A virtual queue may be setup at consumer c for service $\phi$ with queue backlog $Y_c^\phi(t)$, corresponding to the creation of a continuous auxiliary control variable $y_c^\phi(t)$ together with the request injection rate $a_c^\phi(t)$. A virtual queue backlog may then be updated according to the following:

$$Y_c^\phi(t+1) = [Y_c^\phi(t) + y_c^\phi(t) - z^{(\phi,K_\phi)} a_c^\phi(t)]^+.$$

The introduction of the auxiliary variable $y_c^\phi(t)$ and the virtual queue backlog $Y_c^\phi(t)$ the utility and traffic control may transform the original problem described by Eq. (1)-(7) above into a mathematical tractable form, which is due to the strict concavity of the objective function shown as Eq. (1) and the non-convexity of the domains of a(t), p(t), b(t) shown as Eq. (7).

After denoting y(t) as the concatenated vector of $y_c^\phi(t)$ and $\mathbb{R}^+$ as the set of non-negative real number, the problem in Eq. (2)-(8) may thus be transformed into the following equivalent problem:

$$\underset{a(t),b(t),p(t),y(t)}{\text{Maximize}} \liminf_{t\to\infty} \frac{1}{t} \sum_{\tau=0}^{t-1} \sum_\phi \sum_{c\in C^\phi} \mathbb{E}\{\log(y_c^\phi(\tau))\} \quad (13)$$

Subject to:

$$\limsup_{t\to\infty} \frac{1}{t} \sum_{\tau=0}^{t-1} \mathbb{E}\{y_c^{(t)}(\tau) - z^{(\phi,K_\phi)} a_c^\phi(t)\} \le 0, \text{ for all } \phi, c \in C^\phi \quad (14)$$

$$0 \le y_c^\phi(\tau) \le A_{c,max}^\phi, \text{ for all } \phi, c \in C^\phi \quad (15)$$

$$y_c^{(t)}(\tau) \in \mathbb{R}^+, \text{ for all } \phi, c \in C^\phi \quad (16)$$

Eq. (3) – Eq. (8) (17)

Eq. (9) may be satisfied by controlling the virtual queue length $Y_c^\phi(t)$ to be stable.

Based on both inputs, the injection traffic control engine 1034 determines a request injection rate $a_i^\phi(t)$, which may be determined as follows:

Input $Q_i^{(\phi,k,c)}(t), Y_i^\phi(t)$;

Output $a_i^\phi(t): a_i^\phi(t) = \begin{cases} \lfloor A_{c,max}^\phi \rfloor, & \text{if } Y_i^\phi(t) > z^{(\phi,K_\phi)} Q_i^{(\phi,K_\phi,i)}(t) \\ 0, & \text{otherwise} \end{cases}$ where $\lfloor * \rfloor$ represents taking the largest integer without exceeding $*$.

The injection traffic control engine may calculate the value of $a_i^\phi(t)$ to solve the following optimization for each requested service $\phi$:

$$\underset{a_i^\phi(t)}{\text{Maximize}} \quad [Y_i^\phi(t) - z^{(\phi,K_\phi)} Q_i^{(\phi,K_\phi,i)}(t)] a_c^\phi(t)$$

$$\text{Subject to: } 0 \le a_c^\phi(\tau) \le A_{c,max}^\phi, a_c^\phi(\tau) \in \mathbb{Z}^+.$$

The node also provides the virtual queue backlog information (e.g., $Y_c^\phi(t)$ described above) from the virtual queue backlog record database 1036 to the utility control engine 1038, which determines auxiliary control variables $y_c^\phi(t)$. The utility control engine 1038 may determine the value of $y_c^\phi(t)$ as follows:

Input $Y_i^\phi(t)$;
Output $y_i^\phi(t)$:

$$y_i^\phi(t) = \min\left\{\frac{V}{y_i^\phi(t)}, A_{i,max}^\phi\right\},$$

for all $\phi$ such that $i \in C^\phi$, where V is a control parameter whose value indicates the emphasis on maximizing throughput utility with respect to alleviating network congestion, where $A_{i,max}^\phi$ is the upper limit of $a_c^\phi(t)$.

The utility control engine may calculate the value of $y_i^\phi(t)$ to solve the following optimization for each requested service $\phi$:

$$\underset{y_i^\phi(t)}{\text{Maximize}} \quad V\log(y_i^\phi(t)) - y_i^\phi(t) Y_c^\phi(t)$$

$$\text{Subject to: } 0 \le y_c^\phi(\tau) \le A_{c,max}^\phi, y_c^\phi(\tau) \in \mathbb{R}^+.$$

The auxiliary control variables and the request injection rate are then used to update the virtual queue backlogs at 1040, e.g., according to $$Y_c^\phi(t+1) = [Y_c^\phi(t) + y_c^\phi(t) - z^{(\phi,K_\phi)} a_c^\phi(t)]^+.$$

The request injection rate information can be used, e.g., as shown in FIG. 10A, to update the commodity backlog records at 1006.

Referring now to FIG. 10D, a node acting as a data producer may access, at 1042, data generation commodity backlog information (e.g., 515 of FIG. 5, which may be represented as $Q_i^{(\phi,k,c)}(t)$ at the data producer node, as described above), which is provided to the data generation engine 1044. If a node i is a data producer for certain services, it can allocate the rates of generating the data required by those services by running the data generation engine (e.g., 606), which may include a module for calculating weights for data producing and another for implementing the engine prototype.

Weight calculation for data producing at data producer i may consist of the following:

Input commodity backlog $Q_i^{(\phi,k,c)}(t)$, chunk size $z^{(\phi,0)}$, maximum data producing rate $C_{i,prod}$, where the index $(\phi,0,c)$ is denoted by m: $m \triangleq (\phi_f, 0, c_f)$.

Output $W^m(t) = z^{(\phi_m,0)} Q_i^{(\phi_m,0,c_m)}(t)$, $v^m = z^{(\phi_m,0)}$, and $C_0 = C_{i,prod}$.

The outputs $W_m(t), v^m$, and $C_0$ are then input to the engine prototype, and the output of the data generation engine includes the allocated data producing rates $p_{i,c}^\phi(t)$ (which are the also the outputs of the engine prototype, i.e., $p_{i,c_m}^{\phi_m}(t) = \mu^m(t)$).

The data generation engine then calculates weights for data generation at 1046 (e.g., $W^m(t), v^m$, and $C_0$ as described above), and then uses the weights as inputs to the engine prototype 1048. The data generation engine outputs allocated data generation rates (e.g., $p_{i,c}^\phi(t)$ described above), which can then be used, e.g., as shown in FIG. 10A, to update the commodity backlog records at 1006.

The data generation engine 1044 may calculate the value of the $p_{i,c}^\phi(t)$ to solve the following optimization to produce the data for all the consumers requesting the supportable services:

$$\underset{\{p_{i,c}^\phi(t)\}}{\text{Maximize}} \sum_{\phi: i \in D^\phi} \sum_{c \in C^\phi} [z^{(\phi,0)}]^2 Q_i^{(\phi,0,c)}(t) p_{i,c}^\phi(t)$$

$$\text{Subject to: } \sum_{\phi: i \in D^\phi} \sum_{c \in C^\phi} z^{(\phi,0)} p_{i,c}^\phi(t) \le C_{i,prod}, p_{i,c}^\phi(t) \in \mathbb{Z}^+.$$

Referring now to FIG. 10E, a node acting as a compute node may access, at 1050, processing commodity backlog information (e.g., (e.g., 512, 513 of FIG. 5, which may be represented as $Q_i^{(\phi,k,c)}(t)$ at the compute node, as described above), which is provided to the processing commitment engine 1052. If a node i is a compute node for certain functions (e.g., 502, 504), it can allocate the processing commitment rates $b_{i,proc}^{(\phi,k,c)}(t)$ for executing these functions by running the processing commitment engine 604, which may include submodules for weight calculation and the engine prototype described above.

The weight calculation for the processing commitment at node i may consist of the following:

Input commodity backlog $Q_i^{(\phi,k,c)}(t)$, data chunk size $z^{(\phi,k)}$, processing complexity $r^{(\phi,k)}$, maximum processing rate $C_{i,proc}$, wherein the index $(\phi,k,c)$ is denoted by m: $m \triangleq (\phi_f, k_f, c_f)$.

Output $$W^m(t) = \frac{[z^{(\phi_m,k_m)} Q_i^{(\phi_m,k_m,c_m)}(t) - z^{(\phi_m,k_m-1)} Q_i^{(\phi_m,k_m-1,c_m)}(t)] z^{(\phi_m,k_m)}}{r^{(\phi_m,k_m)}},$$

$$v^m = r^{(\phi_m,k_m)}, \text{ and } C_0 = C_{i,proc}.$$

The outputs $W^f(t)$, $v^f$, and $C_0$ are then input to the engine prototype described above, and the output of the processing commitment engine (e.g., 604) may include the allocated processing commitment rates $b_{i,proc}^{(\phi,k,c)}(t)$ (which are the also the outputs of the engine prototype, i.e., $b_{i,proc}^{(\phi_m,k_m,c_m)}(t) = \mu^m(t)$). The committing processing rates can then be used, e.g., as shown in FIG. 10A, to update the commodity backlog records at 1006.

The processing commitment engine may calculate the value of the $b_{i,proc}^{(\phi,k,c)}(t)$ to solve the following optimization to make processing commitments:

$$\underset{\{b_{i,poc}^{(\phi,k,c)}(t)\}}{\text{Maximize}} \sum_\phi \sum_{k:i \in P^{(\phi,k)}} \sum_{c \in C^\phi} [z^{(\phi,k)} Q_i^{(\phi,k,c)}(t) - z^{(\phi,k-1)} Q_i^{(\phi,k-1,c)}(t)] z^{(\phi,k)} b_{i,proc}^{(\phi,k,c)}(t)$$

$$\text{Subject to: } \sum_\phi \sum_{k:i \in P^{(\phi,k)}} \sum_{c \in C^\phi} r^{(\phi,k)} b_{i,poc}^{(\phi,k,c)}(t) \leq C_{i,proc}$$

Late Response of Discovery Data Packet and Update of the Minimum Abstract Distance In certain embodiments, a node located on at least one augmented path may wait and keep listening for a predetermined period after obtaining a first required abstract distance value via a face and may calculate the minimum abstract distance among possibly multiple abstract distance values gathered from multiple faces during the listening time. These received discovery data packets can be aggregated into one that is forwarded back toward the initiator after the listening period ends. After forwarding, instead of deleting the corresponding PIT entry, it may be tagged as a backup entry and possibly moved into a secondary memory. The backup PIT entry can be kept for a longer backup period until being deleted.

In case a required discovery data packet forwarded by node j arrives at a node i later than the end of node i's listening period (but earlier than its backup period ends), by which a $L_j^{(\phi,k)}$ value has been calculated and forwarded, but the newly received abstract distance value $L_j^{(\phi,k)}$ satisfies $l_{ji} + L_m^{(\phi,k)} < L_i^{(\phi,k)}$ or value $L_j^{(\phi,k-1)}$ satisfies $L_{ji} + L_j^{(\phi,k-1)} + l_{i,proc} < L_i^{(\phi,k)}$, then node i updates its local $L_i^{(\phi,k)}$ value to $L_{ji} + L_j^{(\phi,k)}$ or $l_{ji} + L_j^{(\phi,k-1)} + l_{i,proc}$. Afterwards, node i refers the backup PIT entry and forwards a new discovery data packet carrying the updated $L_i^{(\phi,k)}$.

Long Term Self-Learning of Network Nodes

According to the long-term local observation on the time-varying traffic passing by, each network node can dynamically make reconfiguration decisions that takes effect over a much longer period. These decisions may involve reconfiguring the function placement, data caching and forwarding face activation:

Function placement reconfiguration: When a compute node having no function $f$ observes that $f$ is frequently requested during a period, the node can intelligently make a judgement on whether to download $f$ or not. The judgement may involve comparing the estimated downloading cost of $f$ and the estimated long-term cost of routing the processing request/data for $f$ to/from other compute nodes having $f$. If the node decides to download, it can initiate a discovery/delivery procedure searching to download $f$.

Data caching reconfiguration: When a node observes that a data resource d is frequently requested, the node can decide whether to fetch and cache d based on comparing the estimated fetching/caching cost with the estimated long-term cost of routing the requests/data.

Forwarding face activation: When a node observes that a forwarding face is seldomly used in a period, the node can deactivate the face and put it into sleeping mode to save cost; on other hand, the node can reactivate a face if the node has been suffering local traffic congestion for a period.

Simulation of Orchestration Framework

FIGS. 11A-11D illustrate an example DCN 1100 and corresponding simulation results for orchestration implementations in the DCN 1100. In the example DCN 1100, a fog topology is shown, with nodes 1-4 being cloud nodes (each of which has computing capacity equal to $2 \times 10^7$ cycles/second for purposes of the simulation), nodes 5-9 are edge nodes (each of which has computing capacity equal to $5 \times 10^6$ cycles/second for purposes of the simulation), and nodes 10-19 are mesh nodes having communication ability but not computing ability (for purposes of the simulation). Further, each link connecting two cloud nodes has capacity 100 Mbps, each link connecting two edge nodes or connecting a cloud node, and an edge node has a capacity of 80 Mbps. The links connecting at least one mesh node are all wireless links and have free space pathloss (with a pathloss coefficient equal to 2). Each link connecting an edge node and a mesh node suffers Rician fading with Rician factor equal to 10 dB, and each link connecting two mesh nodes suffers Rayleigh fading. For purposes of the simulation, a time slot's length is 20 ms, and each node makes its orchestration decision at the beginning of each time slot. Two function chaining services are delivered within the network: i) Service 1 with function chain $(1,0) \rightarrow (1,1) \rightarrow (1,2)$; ii) Service 2 with function chain $(2,0) \rightarrow (2,1) \rightarrow (2,2)$. The processing complexities are $r^{(1,1)} = r^{(2,1)} = 5 \times 10^3$ cycles/chunk; $r^{(1,2)} = 2 \times 10^4$ cycles/chunk; $r^{(2,2)} = 10^4$ cycles/chunk. The data chunk sizes are $z^{(1,0)} = z^{(1,1)} = z^{(2,0)} = z^{(2,1)} = 50$ KB; $z^{(1,2)} = 100$ KB; $z^{(2,2)} = 20$ KB. In the example simulations, nodes 10, 12, 14 are the consumers requesting for Service 1, while nodes 16-19 are all data producers; nodes 15, 17, 19 are the consumers requesting for Service 2, while node 10-13 are all data producers. It is assumed for purposes of the simulation that each data producer has sufficient large data producing capacity, and each cloud and edge node can implement all the functions of the two services.

Figure 11A:
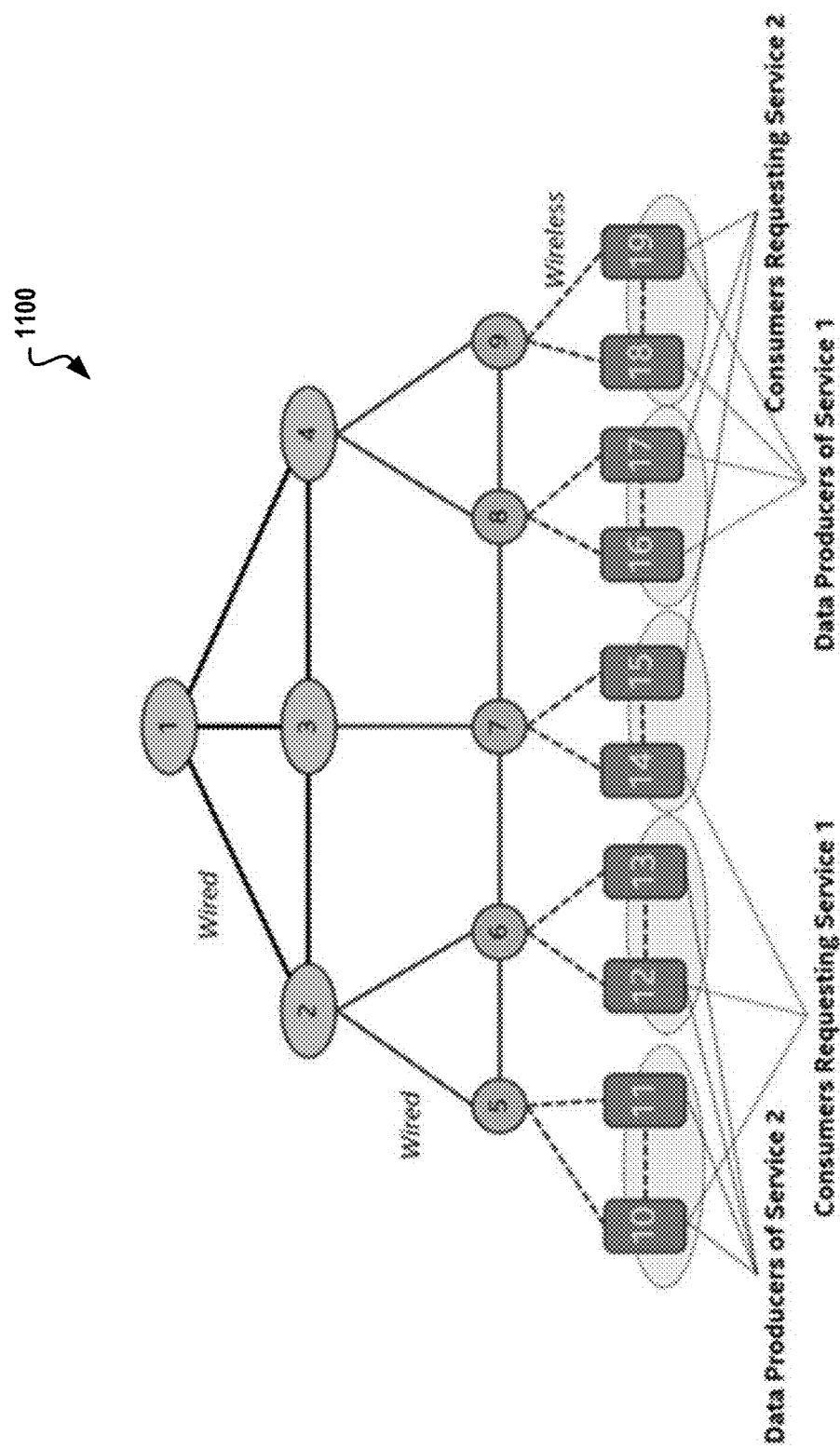
FIGS. 11A-11D illustrate an example DCN and corresponding simulation results for orchestration implementations in the DCN.
Figure 11B:
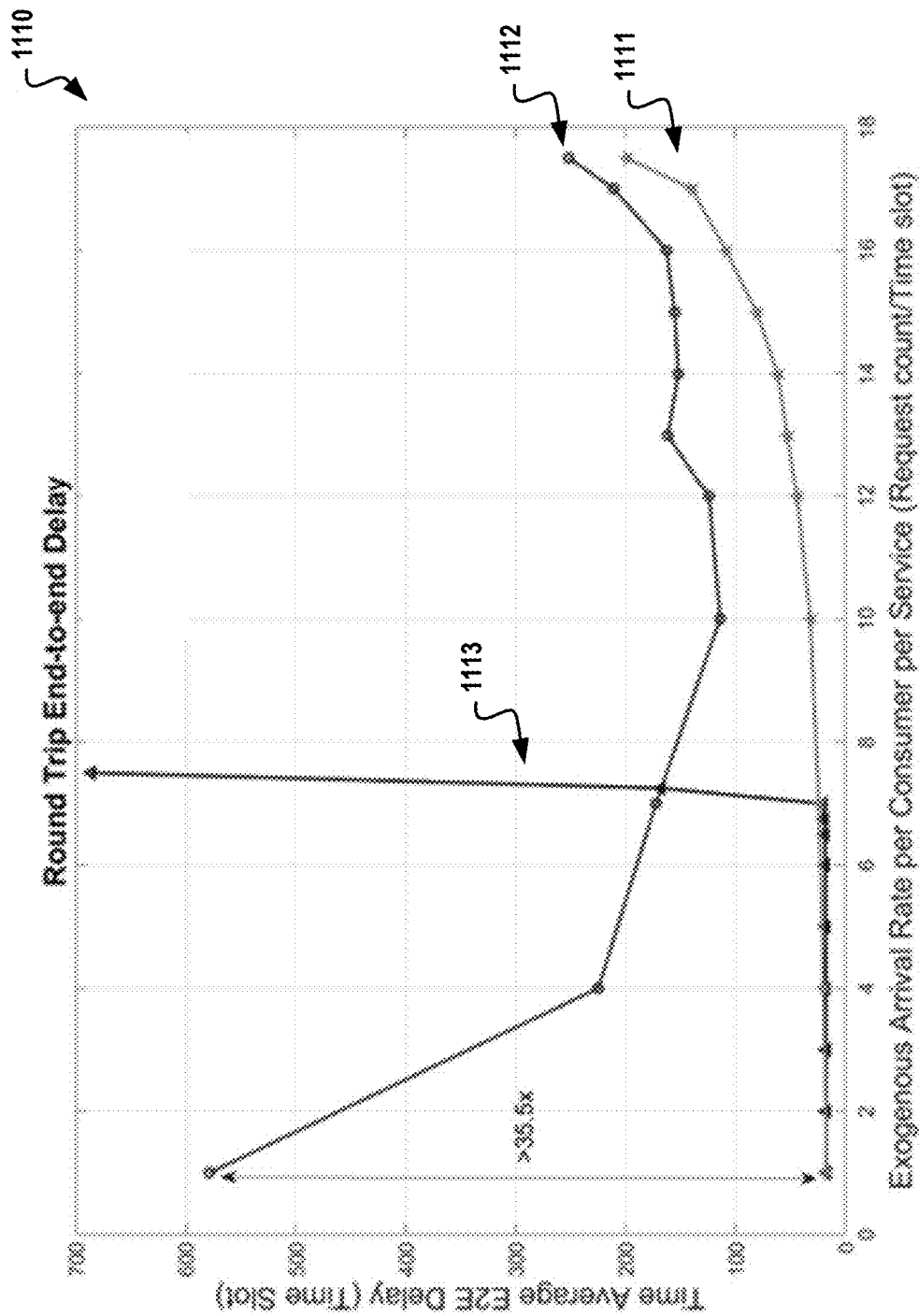

FIG. 11B illustrates a chart 1110 showing a comparison of the round-trip end-to-end (E2E) delay performance among a service discovery assisted queuing control scheme (1111), the queuing control scheme without service discovery (1112), and a best route scheme (1113). As shown, in the low request traffic scenario, both the service discovery assisted backpressure scheme and the best route scheme achieve much lower E2E delay than the backpressure scheme. This is because the topological information (obtained through service discovery) provided to the best route scheme and the service discovery assisted backpressure scheme can guide the interest packets to flow along the most efficient paths. However, as the request arrival rates at each consumer for each service increases beyond 7 request count/time slot, the best route scheme can no longer support the network traffic as its resulting E2E delay sharply rises, while the other two schemes maintain proper traffic supporting. This is because the two backpressure-related schemes are more adaptive to traffic increase. In the meanwhile, the backpressure with service discovery's assistance keeps resulting lower E2E delay than the backpressure without the assistance.

Figure 11C:
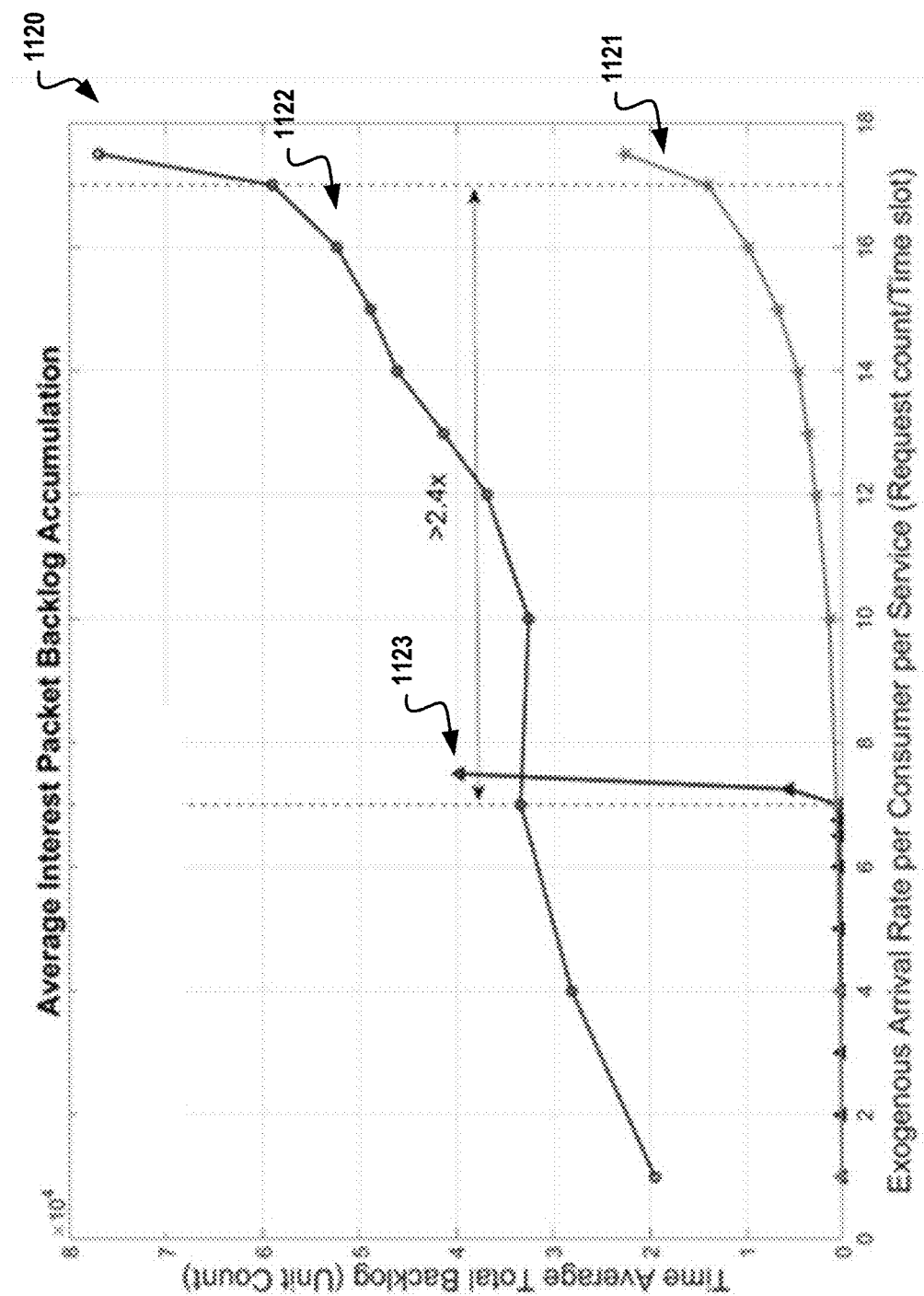
Figure 11D:
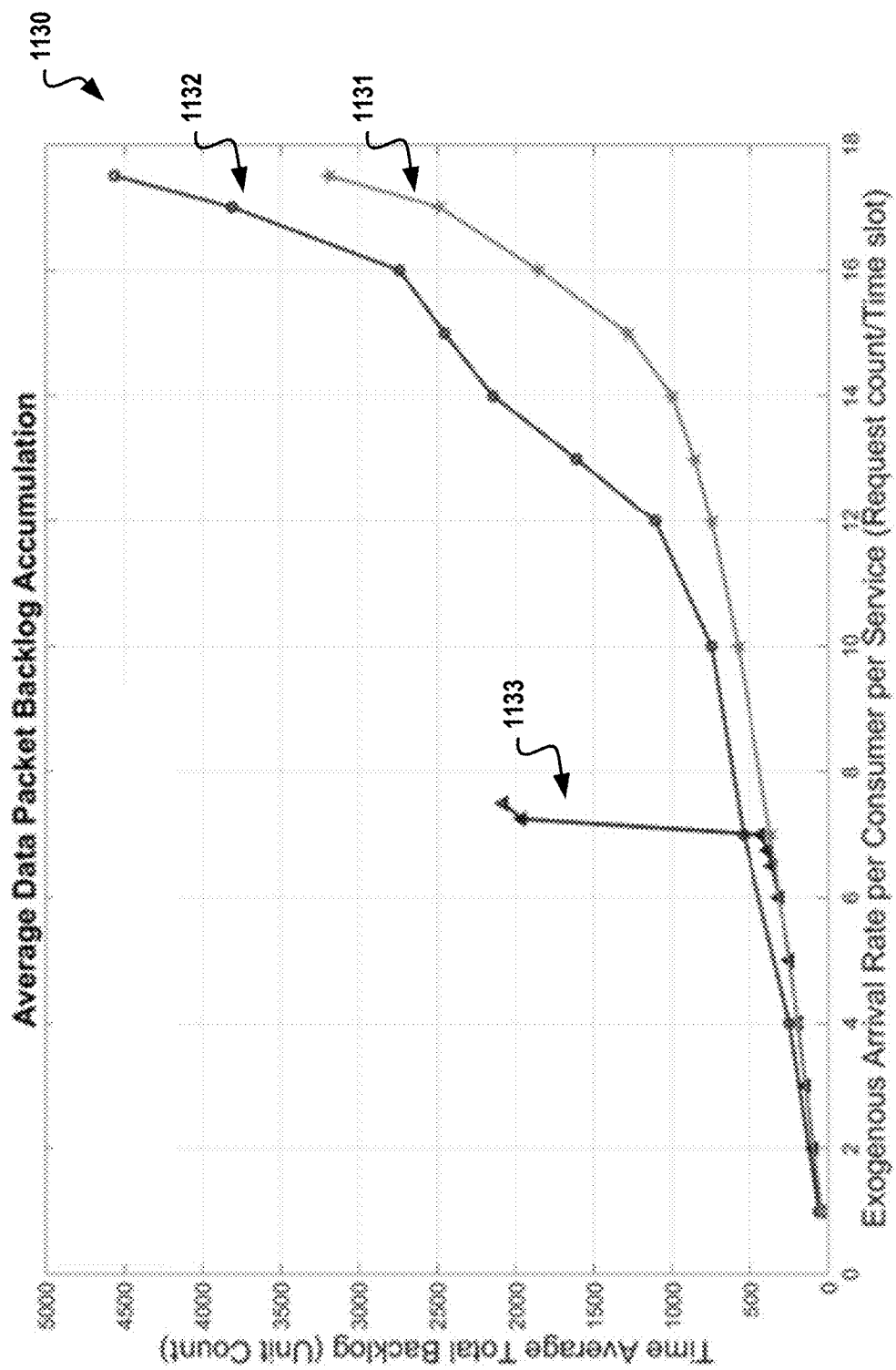

FIGS. 11C, 11D respectively illustrate charts for the time-average total backlog of interest packets (1120) and data packets (1130) as the request traffic increases. In the chart 1120, the plotted lines are for service discovery assisted queuing control scheme (1121), the queuing control scheme without service discovery (1122), and a best route scheme (1123). Similarly, in the chart 1130, the plotted lines are for service discovery assisted queuing control scheme (1131), the queuing control scheme without service discovery (1132), and a best route scheme (1133). As shown, the request arrival rates where the resulting backlog values have sharp rises indicate the schemes' throughput limits. For instance, in FIG. 11C, the throughput limits of the backpressure and service discovery assisted backpressure are larger than that of the best route scheme, which indicates the adaptation advantage of the two backpressure-related schemes. In addition, the backlog accumulation under backpressure scheme is much larger than the other two schemes. This is because the backpressure scheme has no prior topological information to guide its routing but has to use interest packets to explore it. In contrast, with the service discovery results, each node has the knowledge of which faces to choose for forwarding and how far the required resources are, and therefore can bias the interest packet routing along the most efficient paths.

Edge Compute Network Examples

Figure 12:
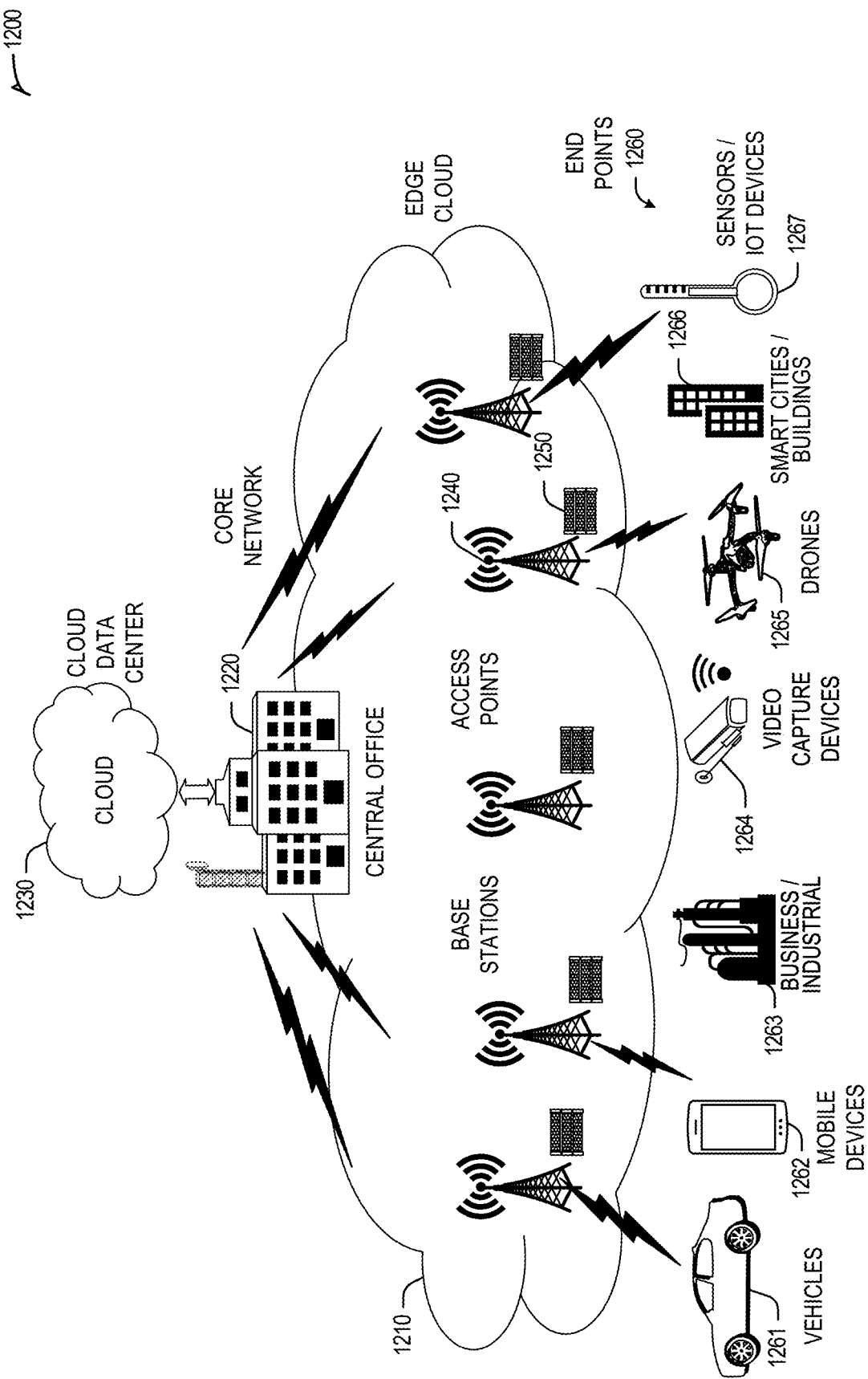
FIG. 12 illustrates an overview of an Edge cloud configuration for Edge computing.

FIG. 12 is a block diagram 1200 showing an overview of a configuration for Edge computing, which includes a layer of processing referred to in many of the following examples as an "Edge cloud". As shown, the Edge cloud 1210 is co-located at an Edge location, such as an access point or base station 1240, a local processing hub 1250, or a central office 1220, and thus may include multiple entities, devices, and equipment instances. The Edge cloud 1210 is located much closer to the endpoint (consumer and producer) data sources 1260 (e.g., autonomous vehicles 1261, user equipment 1262, business and industrial equipment 1263, video capture devices 1264, drones 1265, smart cities and building devices 1266, sensors and IoT devices 1267, etc.) than the cloud data center 1230. Compute, memory, and storage resources which are offered at the edges in the Edge cloud 1210 are critical to providing ultra-low latency response times for services and functions used by the endpoint data sources 1260 as well as reduce network backhaul traffic from the Edge cloud 1210 toward cloud data center 1230 thus improving energy consumption and overall network usages among other benefits.

Compute, memory, and storage are scarce resources, and generally decrease depending on the Edge location (e.g., fewer processing resources being available at consumer endpoint devices, than at a base station, than at a central office). However, the closer that the Edge location is to the endpoint (e.g., user equipment (UE)), the more that space and power is often constrained. Thus, Edge computing attempts to reduce the amount of resources needed for network services, through the distribution of more resources which are located closer both geographically and in network access time. In this manner, Edge computing attempts to bring the compute resources to the workload data where appropriate, or, bring the workload data to the compute resources.

The following describes aspects of an Edge cloud architecture that covers multiple potential deployments and addresses restrictions that some network operators or service providers may have in their own infrastructures. These include, variation of configurations based on the Edge location (because edges at a base station level, for instance, may have more constrained performance and capabilities in a multi-tenant scenario); configurations based on the type of compute, memory, storage, fabric, acceleration, or like resources available to Edge locations, tiers of locations, or groups of locations; the service, security, and management and orchestration capabilities; and related objectives to achieve usability and performance of end services. These deployments may accomplish processing in network layers that may be considered as "near Edge", "close Edge", "local Edge", "middle Edge", or "far Edge" layers, depending on latency, distance, and timing characteristics.

Edge computing is a developing paradigm where computing is performed at or closer to the "Edge" of a network, typically through the use of a compute platform (e.g., x86 or ARM compute hardware architecture) implemented at base stations, gateways, network routers, or other devices which are much closer to endpoint devices producing and consuming the data. For example, Edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within Edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 13:
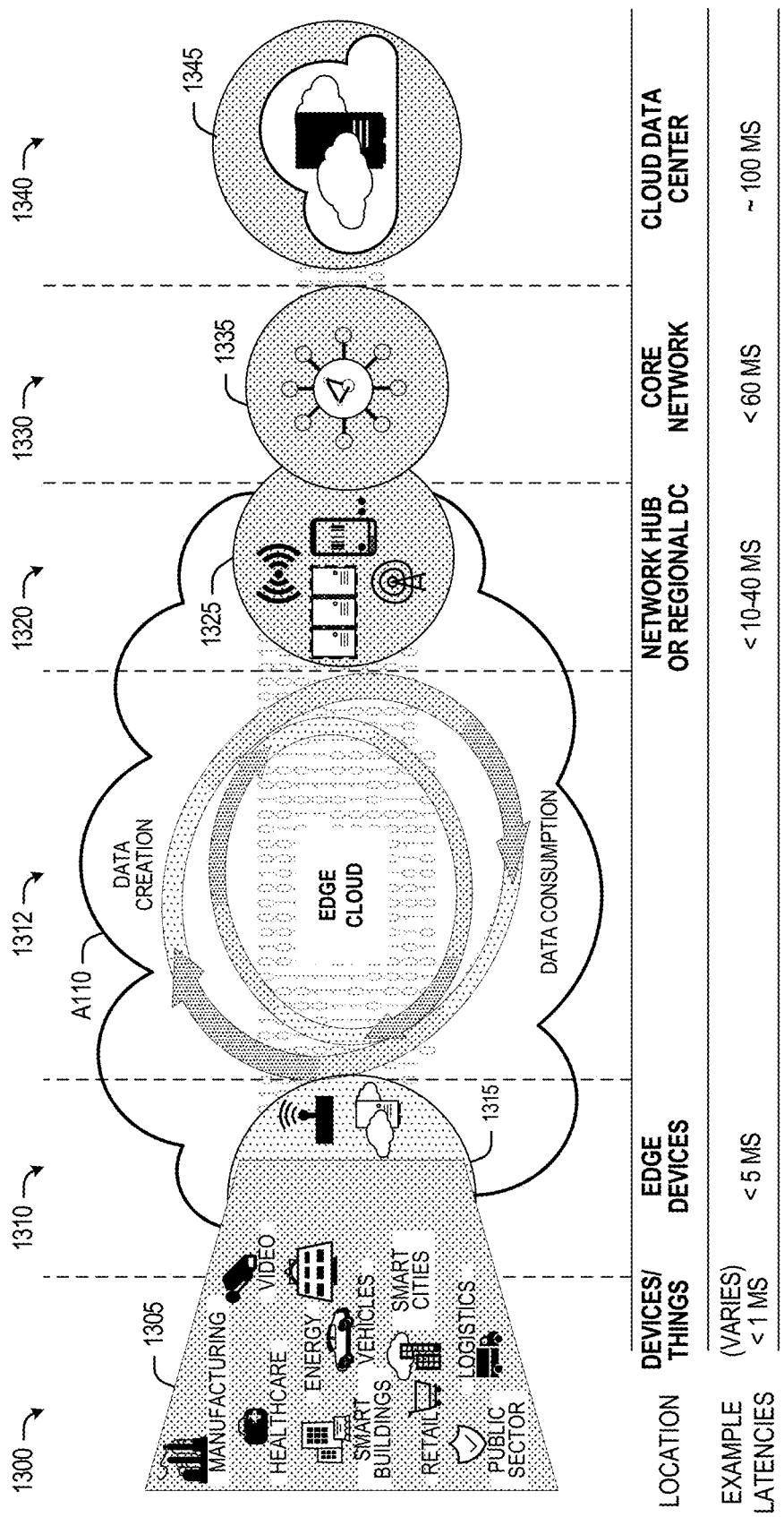
FIG. 13 illustrates operational layers among endpoints, an Edge cloud, and cloud computing environments.

FIG. 13 illustrates operational layers among endpoints, an Edge cloud, and cloud computing environments. Specifically, FIG. 13 depicts examples of computational use cases 1305, utilizing the Edge cloud 1210 among multiple illustrative layers of network computing. The layers begin at an endpoint (devices and things) layer 1300, which accesses the Edge cloud 1210 to conduct data creation, analysis, and data consumption activities. The Edge cloud 1210 may span multiple network layers, such as an Edge devices layer 1310 having gateways, on-premise servers, or network equipment (nodes 1315) located in physically proximate Edge systems; a network access layer 1320, encompassing base stations, radio processing units, network hubs, regional data centers (DC), or local network equipment (equipment 1325); and any equipment, devices, or nodes located therebetween (in layer 1312, not illustrated in detail). The network communications within the Edge cloud 1210 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1300, under 5 ms at the Edge devices layer 1310, to even between 10 to 40 ms when communicating with nodes at the network access layer 1320. Beyond the Edge cloud 1210 are core network 1330 and cloud data center 1340 layers, each with increasing latency (e.g., between 50-60 ms at the core network layer 1330, to 100 or more ms at the cloud data center layer). As a result, operations at a core network data center 1335 or a cloud data center 1345, with latencies of at least 50 to 100 ms or more, will not be able to accomplish many time-critical functions of the use cases 1305. Each of these latency values are provided for purposes of illustration and contrast; it will be understood that the use of other access network mediums and technologies may further reduce the latencies. In some examples, respective portions of the network may be categorized as "close Edge", "local Edge", "near Edge", "middle Edge", or "far Edge" layers, relative to a network source and destination. For instance, from the perspective of the core network data center 1335 or a cloud data center 1345, a central office or content data network may be considered as being located within a "near Edge" layer ("near" to the cloud, having high latency values when communicating with the devices and endpoints of the use cases 1305), whereas an access point, base station, on-premise server, or network gateway may be considered as located within a "far Edge" layer ("far" from the cloud, having low latency values when communicating with the devices and endpoints of the use cases 1305). It will be understood that other categorizations of a particular network layer as constituting a "close", "local", "near", "middle", or "far" Edge may be based on latency, distance, number of network hops, or other measurable characteristics, as measured from a source in any of the network layers 1300-1340.

The various use cases 1305 may access resources under usage pressure from incoming streams, due to multiple services utilizing the Edge cloud. To achieve results with low latency, the services executed within the Edge cloud 1210 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to Service Level Agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, Edge computing within the Edge cloud 1210 may provide the ability to serve and respond to multiple applications of the use cases 1305 (e.g., object tracking, video surveillance, connected cars, etc.) in real-time or near real-time, and meet ultra-low latency requirements for these multiple applications. These advantages enable a whole new class of applications (e.g., Virtual Network Functions (VNFs), Function as a Service (FaaS), Edge as a Service (EaaS), standard processes, etc.), which cannot leverage conventional cloud computing due to latency or other limitations.

However, with the advantages of Edge computing comes the following caveats. The devices located at the Edge are often resource constrained and therefore there is pressure on usage of Edge resources. Typically, this is addressed through the pooling of memory and storage resources for use by multiple users (tenants) and devices. The Edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because Edge locations may be unmanned and may even need permissioned access (e.g., when housed in a third-party location). Such issues are magnified in the Edge cloud 1210 in a multi-tenant, multi-owner, or multi-access setting, where services and applications are requested by many users, especially as network usage dynamically fluctuates and the composition of the multiple stakeholders, use cases, and services changes.

At a more generic level, an Edge computing system may be described to encompass any number of deployments at the previously discussed layers operating in the Edge cloud 1210 (network layers 1300-1340), which provide coordination from client and distributed computing devices. One or more Edge gateway nodes, one or more Edge aggregation nodes, and one or more core data centers may be distributed across layers of the network to provide an implementation of the Edge computing system by or on behalf of a telecommunication service provider ("telco", or "TSP"), internet-of-things service provider, cloud service provider (CSP), enterprise entity, or any other number of entities. Various implementations and configurations of the Edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the Edge computing system does not necessarily mean that such node or device operates in a client or agent/minion/follower role; rather, any of the nodes or devices in the Edge computing system refer to individual entities, nodes, or subsystems which include discrete or connected hardware or software configurations to facilitate or use the Edge cloud 1210.

As such, the Edge cloud 1210 is formed from network components and functional features operated by and within Edge gateway nodes, Edge aggregation nodes, or other Edge compute nodes among network layers 1310-1330. The Edge cloud 1210 thus may be embodied as any type of network that provides Edge computing and/or storage resources which are proximately located to radio access network (RAN) capable endpoint devices (e.g., mobile computing devices, IoT devices, smart devices, etc.), which are discussed herein. In other words, the Edge cloud 1210 may be envisioned as an "Edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks, etc.) may also be utilized in place of or in combination with such 3GPP carrier networks.

The network components of the Edge cloud 1210 may be servers, multi-tenant servers, appliance computing devices, and/or any other type of computing devices. For example, the Edge cloud 1210 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC converter(s), DC/AC converter(s), DC/DC converter(s), power regulators, transformers, charging circuitry, batteries, wired inputs, and/or wireless power inputs. Example housings and/or surfaces thereof may include or connect to mounting hardware to enable attachment to structures such as buildings, telecommunication structures (e.g., poles, antenna structures, etc.), and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, infrared or other visual thermal sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, rotors such as propellers, etc.) and/or articulating hardware (e.g., robot arms, pivotable appendages, etc.). In some circumstances, the sensors may include any type of input devices such as user interface hardware (e.g., buttons, switches, dials, sliders, microphones, etc.). In some circumstances, example housings include output devices contained in, carried by, embedded therein and/or attached thereto. Output devices may include displays, touchscreens, lights, light-emitting diodes (LEDs), speakers, input/output (I/O) ports (e.g., universal serial bus (USB)), etc. In some circumstances, Edge devices are devices presented in the network for a specific purpose (e.g., a traffic light), but may have processing and/or other capacities that may be utilized for other purposes. Such Edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 15B. The Edge cloud 1210 may also include one or more servers and/or one or more multi-tenant servers. Such a server may include an operating system and implement a virtual computing environment. A virtual computing environment may include a hypervisor managing (e.g., spawning, deploying, commissioning, destroying, decommissioning, etc.) one or more virtual machines, one or more containers, etc. Such virtual computing environments provide an execution environment in which one or more applications and/or other software, code, or scripts may execute while being isolated from one or more other applications, software, code, or scripts.

Figure 14:
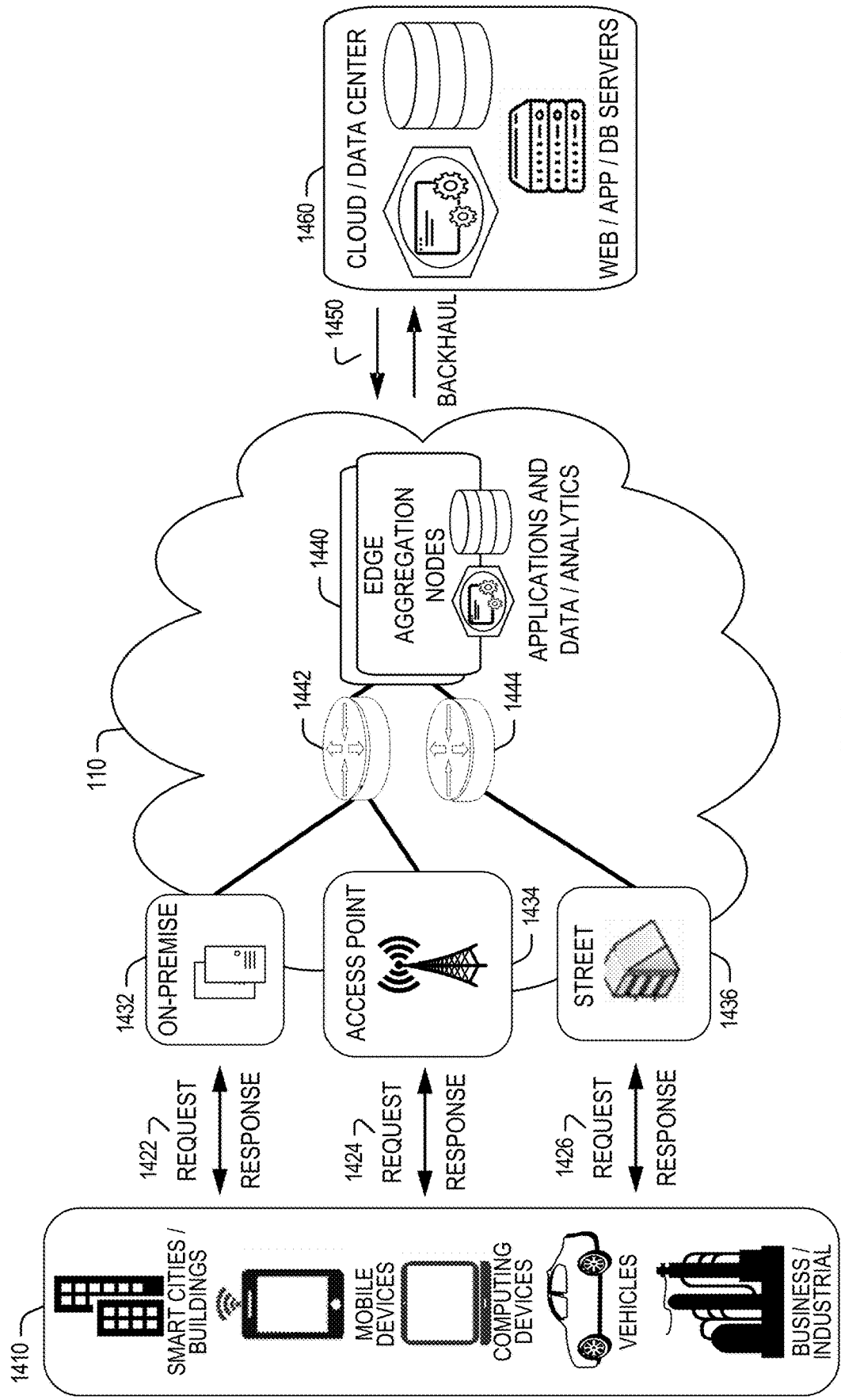
FIG. 14 illustrates an example approach for networking and services in an Edge computing system.

In FIG. 14, various client endpoints 1410 (in the form of mobile devices, computers, autonomous vehicles, business computing equipment, industrial processing equipment) exchange requests and responses that are specific to the type of endpoint network aggregation. For instance, client endpoints 1410 may obtain network access via a wired broadband network, by exchanging requests and responses 1422 through an on-premise network system 1432. Some client endpoints 1410, such as mobile computing devices, may obtain network access via a wireless broadband network, by exchanging requests and responses 1424 through an access point (e.g., a cellular network tower) 1434. Some client endpoints 1410, such as autonomous vehicles may obtain network access for requests and responses 1426 via a wireless vehicular network through a street-located network system 1436. However, regardless of the type of network access, the TSP may deploy aggregation points 1442, 1444 within the Edge cloud 1210 to aggregate traffic and requests. Thus, within the Edge cloud 1210, the TSP may deploy various compute and storage resources, such as at Edge aggregation nodes 1440, to provide requested content. The Edge aggregation nodes 1440 and other systems of the Edge cloud 1210 are connected to a cloud or data center 1460, which uses a backhaul network 1450 to fulfill higher-latency requests from a cloud/data center for websites, applications, database servers, etc. Additional or consolidated instances of the Edge aggregation nodes 1440 and the aggregation points 1442, 1444, including those deployed on a single server framework, may also be present within the Edge cloud 1210 or other areas of the TSP infrastructure.

Compute Node Architecture Examples

Any of the compute nodes or devices discussed with reference to the present Edge computing systems and environment may be fulfilled based on the components depicted in FIGS. 15A and 15B. Respective Edge compute nodes may be embodied as a type of device, appliance, computer, or other "thing" capable of communicating with other Edge, networking, or endpoint components. For example, an Edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 15A:
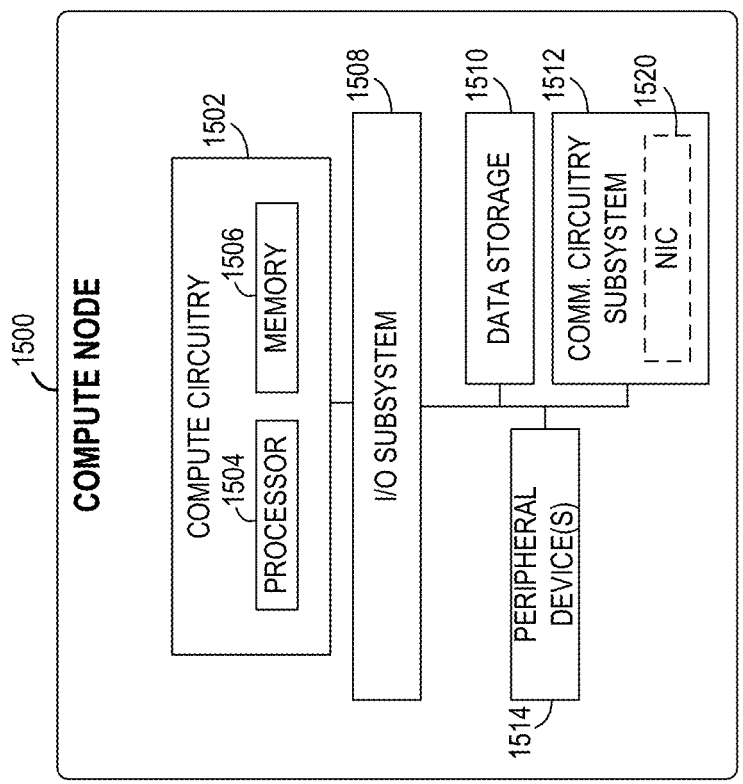
FIG. 15A provides an overview of example components for compute deployed at a compute node in an Edge computing system.

In the simplified example depicted in FIG. 15A, an Edge compute node 1500 includes a compute engine (also referred to herein as "compute circuitry") 1502, an input/output (I/O) subsystem (also referred to herein as "I/O circuitry") 1508, data storage (also referred to herein as "data storage circuitry") 1510, a communication circuitry subsystem 1512, and, optionally, one or more peripheral devices (also referred to herein as "peripheral device circuitry") 1514. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1500 may be embodied as any type of engine, device, or collection of devices capable of performing various compute functions. In some examples, the compute node 1500 may be embodied as a single device such as an integrated circuit, an embedded system, a field-programmable gate array (FPGA), a system-on-a-chip (SOC), or other integrated system or device. In the illustrative example, the compute node 1500 includes or is embodied as a processor (also referred to herein as "processor circuitry") 1504 and a memory (also referred to herein as "memory circuitry") 1506. The processor 1504 may be embodied as any type of processor(s) capable of performing the functions described herein (e.g., executing an application). For example, the processor 1504 may be embodied as a multi-core processor(s), a microcontroller, a processing unit, a specialized or special purpose processing unit, or other processor or processing/controlling circuit.

In some examples, the processor 1504 may be embodied as, include, or be coupled to an FPGA, an application specific integrated circuit (ASIC), reconfigurable hardware or hardware circuitry, or other specialized hardware to facilitate performance of the functions described herein. Also in some examples, the processor D104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, storage disks, or AI hardware (e.g., GPUs, programmed FPGAs, or ASICs tailored to implement an AI model such as a neural network). Such an xPU may be designed to receive, retrieve, and/or otherwise obtain programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that an xPU, an SOC, a CPU, and other variations of the processor 1504 may work in coordination with each other to execute many types of operations and instructions within and on behalf of the compute node 1500.

The memory 1506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device (e.g., memory circuitry) is any number of block addressable memory devices, such as those based on NAND or NOR technologies (for example, Single-Level Cell ("SLC"), Multi-Level Cell ("MLC"), Quad-Level Cell ("QLC"), Tri-Level Cell ("TLC"), or some other NAND). In some examples, the memory device(s) includes a byte-addressable write-in-place three dimensional crosspoint memory device, or other byte addressable write-in-place non-volatile memory (NVM) devices, such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric transistor random access memory (FeTRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, a combination of any of the above, or other suitable memory. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may include a transistor-less stackable cross point architecture in which memory cells sit at the intersection of word lines and bit lines and are individually addressable and in which bit storage is based on a change in bulk resistance. In some examples, all or a portion of the memory 1506 may be integrated into the processor 1504. The memory 1506 may store various software and data used during operation such as one or more applications, data operated on by the application(s), libraries, and drivers.

In some examples, resistor-based and/or transistor-less memory architectures include nanometer scale phase-change memory (PCM) devices in which a volume of phase-change material resides between at least two electrodes. Portions of the example phase-change material exhibit varying degrees of crystalline phases and amorphous phases, in which varying degrees of resistance between the at least two electrodes can be measured. In some examples, the phase-change material is a chalcogenide-based glass material. Such resistive memory devices are sometimes referred to as memristive devices that remember the history of the current that previously flowed through them. Stored data is retrieved from example PCM devices by measuring the electrical resistance, in which the crystalline phases exhibit a relatively lower resistance value(s) (e.g., logical "0") when compared to the amorphous phases having a relatively higher resistance value(s) (e.g., logical "1").

Example PCM devices store data for long periods of time (e.g., approximately 10 years at room temperature). Write operations to example PCM devices (e.g., set to logical "0", set to logical "1", set to an intermediary resistance value) are accomplished by applying one or more current pulses to the at least two electrodes, in which the pulses have a particular current magnitude and duration. For instance, a long low current pulse (SET) applied to the at least two electrodes causes the example PCM device to reside in a low-resistance crystalline state, while a comparatively short high current pulse (RESET) applied to the at least two electrodes causes the example PCM device to reside in a high-resistance amorphous state.

In some examples, implementation of PCM devices facilitates non-von Neumann computing architectures that enable in-memory computing capabilities. Generally speaking, traditional computing architectures include a central processing unit (CPU) communicatively connected to one or more memory devices via a bus. As such, a finite amount of energy and time is consumed to transfer data between the CPU and memory, which is a known bottleneck of von Neumann computing architectures. However, PCM devices minimize and, in some cases, eliminate data transfers between the CPU and memory by performing some computing operations in-memory. Stated differently, PCM devices both store information and execute computational tasks. Such non-von Neumann computing architectures may implement vectors having a relatively high dimensionality to facilitate hyperdimensional computing, such as vectors having 10,000 bits. Relatively large bit width vectors enable computing paradigms modeled after the human brain, which also processes information analogous to wide bit vectors.

The compute circuitry 1502 is communicatively coupled to other components of the compute node 1500 via the I/O subsystem 1508, which may be embodied as circuitry and/or components to facilitate input/output operations with the compute circuitry 1502 (e.g., with the processor 1504 and/or the main memory 1506) and other components of the compute circuitry 1502. For example, the I/O subsystem 1508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1508 may form a portion of a system-on-a-chip (SoC) and be incorporated, along with one or more of the processor 1504, the memory 1506, and other components of the compute circuitry 1502, into the compute circuitry 1502.

The one or more illustrative data storage devices/disks 1510 may be embodied as one or more of any type(s) of physical device(s) configured for short-term or long-term storage of data such as, for example, memory devices, memory, circuitry, memory cards, flash memory, hard disk drives (HDDs), solid-state drives (SSDs), and/or other data storage devices/disks. Individual data storage devices/disks 1510 may include a system partition that stores data and firmware code for the data storage device/disk 1510. Individual data storage devices/disks 1510 may also include one or more operating system partitions that store data files and executables for operating systems depending on, for example, the type of compute node 1500.

The communication circuitry 1512 may be embodied as any communication circuit, device, or collection thereof, capable of enabling communications over a network between the compute circuitry 1502 and another compute device (e.g., an Edge gateway of an implementing Edge computing system). The communication circuitry 1512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1512 includes a network interface controller (NIC) 1520, which may also be referred to as a host fabric interface (HFI). The NIC 1520 may be embodied as one or more add-in-boards, daughter cards, network interface cards, controller chips, chipsets, or other devices that may be used by the compute node 1500 to connect with another compute device (e.g., an Edge gateway node). In some examples, the NIC 1520 may be embodied as part of a system-on-a-chip (SoC) that includes one or more processors, or included on a multichip package that also contains one or more processors. In some examples, the NIC 1520 may include a local processor (not shown) and/or a local memory (not shown) that are both local to the NIC 1520. In such examples, the local processor of the NIC 1520 may be capable of performing one or more of the functions of the compute circuitry 1502 described herein. Additionally, or alternatively, in such examples, the local memory of the NIC 1520 may be integrated into one or more components of the client compute node at the board level, socket level, chip level, and/or other levels.

Additionally, in some examples, a respective compute node 1500 may include one or more peripheral devices 1514. Such peripheral devices 1514 may include any type of peripheral device found in a compute device or server such as audio input devices, a display, other input/output devices, interface devices, and/or other peripheral devices, depending on the particular type of the compute node 1500. In further examples, the compute node 1500 may be embodied by a respective Edge compute node (whether a client, gateway, or aggregation node) in an Edge computing system or like forms of appliances, computers, subsystems, circuitry, or other components.

Figure 15B:
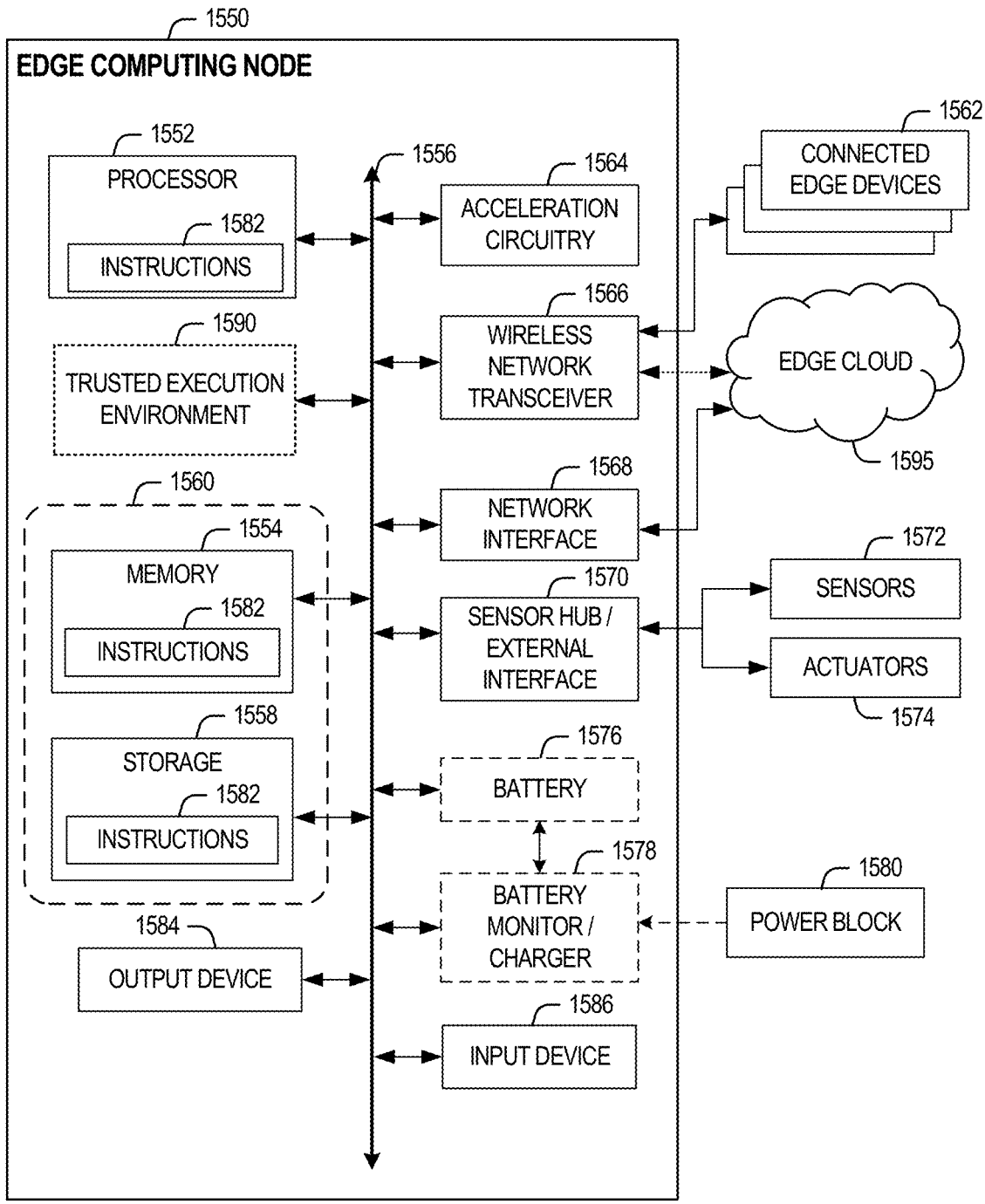
FIG. 15B provides a further overview of example components within a computing device in an Edge computing system.

In a more detailed example, FIG. 15B illustrates a block diagram of an example of components that may be present in an Edge computing node 1550 for implementing the techniques (e.g., operations, processes, methods, and methodologies) described herein. This Edge computing node 1550 provides a closer view of the respective components of node 1500 when implemented as or as part of a computing device (e.g., as a mobile device, a base station, server, gateway, etc.). The Edge computing node 1550 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing node 1550, or as components otherwise incorporated within a chassis of a larger system.

The Edge computing device 1550 may include processing circuitry in the form of a processor 1552, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1552 may be a part of a system on a chip (SoC) in which the processor 1552 and other components are formed into a single integrated circuit, or a single package, such as the Edison™ or Galileo™ SoC boards from Intel Corporation, Santa Clara, Calif. As an example, the processor 1552 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, Calif., a MIPS®-based design from MIPS Technologies, Inc. of Sunnyvale, Calif., an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1552 and accompanying circuitry may be provided in a single socket form factor, multiple socket form factor, or a variety of other formats, including in limited hardware configurations or configurations that include fewer than all elements shown in FIG. 15B.

The processor 1552 may communicate with a system memory 1554 over an interconnect 1556 (e.g., a bus). Any number of memory devices may be used to provide for a given amount of system memory. As examples, the memory D154 may be random access memory (RAM) in accordance with a Joint∈lectron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1558 may also couple to the processor 1552 via the interconnect 1556. In an example, the storage 1558 may be implemented via a solid-state disk drive (SSDD). Other devices that may be used for the storage 1558 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1558 may be on-die memory or registers associated with the processor 1552. However, in some examples, the storage 1558 may be implemented using a micro hard disk drive (HDD). Further, any number of new technologies may be used for the storage 1558 in addition to, or instead of, the technologies described, such resistance change memories, phase change memories, holographic memories, or chemical memories, among others.

The components may communicate over the interconnect 1556. The interconnect 1556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1556 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1556 may couple the processor 1552 to a transceiver 1566, for communications with the connected Edge devices 1562. The transceiver 1566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected Edge devices 1562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1566 (or multiple transceivers) may communicate using multiple standards or radios for communications at a different range. For example, the Edge computing node 1550 may communicate with close devices, e.g., within about 10 meters, using a local transceiver based on Bluetooth Low Energy (BLE), or another low power radio, to save power. More distant connected Edge devices 1562, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1566 (e.g., a radio transceiver) may be included to communicate with devices or services in a cloud (e.g., an Edge cloud 1595) via local or wide area network protocols. The wireless network transceiver 1566 may be a low-power wide-area (LPWA) transceiver that follows the IEEE 802.15.4, or IEEE 802.15.4g standards, among others. The Edge computing node 1550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1566, as described herein. For example, the transceiver 1566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1568 may be included to provide a wired communication to nodes of the Edge cloud 1595 or to other devices, such as the connected Edge devices 1562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1568 may be included to enable connecting to a second network, for example, a first NIC 1568 providing communications to the cloud over Ethernet, and a second NIC 1568 providing communications to other devices over another type of network.

Given the variety of types of applicable communications from the device to another component or network, applicable communications circuitry used by the device may include or be embodied by any one or more of components 1564, 1566, 1568, or 1570. Accordingly, in various examples, applicable means for communicating (e.g., receiving, transmitting, etc.) may be embodied by such communications circuitry.

The Edge computing node 1550 may include or be coupled to acceleration circuitry 1564, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific Edge computing tasks for service management and service operations discussed elsewhere in this document.

The interconnect 1556 may couple the processor 1552 to a sensor hub or external interface 1570 that is used to connect additional devices or subsystems. The devices may include sensors 1572, such as accelerometers, level sensors, flow sensors, optical light sensors, camera sensors, temperature sensors, global navigation system (e.g., GPS) sensors, pressure sensors, barometric pressure sensors, and the like. The hub or interface 1570 further may be used to connect the Edge computing node 1550 to actuators 1574, such as power switches, valve actuators, an audible sound generator, a visual warning device, and the like.

In some optional examples, various input/output (I/O) devices may be present within or connected to, the Edge computing node 1550. For example, a display or other output device 1584 may be included to show information, such as sensor readings or actuator position. An input device 1586, such as a touch screen or keypad may be included to accept input. An output device 1584 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the Edge computing node 1550. A display or console hardware, in the context of the present system, may be used to provide output and receive input of an Edge computing system; to manage components or services of an Edge computing system; identify a state of an Edge computing component or service; or to conduct any other number of management or administration functions or service use cases.

A battery 1576 may power the Edge computing node 1550, although, in examples in which the Edge computing node 1550 is mounted in a fixed location, it may have a power supply coupled to an electrical grid, or the battery may be used as a backup or for temporary capabilities. The battery 1576 may be a lithium ion battery, or a metal-air battery, such as a zinc-air battery, an aluminum-air battery, a lithium-air battery, and the like.

A battery monitor/charger 1578 may be included in the Edge computing node 1550 to track the state of charge (SoCh) of the battery 1576, if included. The battery monitor/charger 1578 may be used to monitor other parameters of the battery 1576 to provide failure predictions, such as the state of health (SoH) and the state of function (SoF) of the battery 1576. The battery monitor/charger 1578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1578 may communicate the information on the battery 1576 to the processor 1552 over the interconnect 1556. The battery monitor/charger 1578 may also include an analog-to-digital (ADC) converter that enables the processor 1552 to directly monitor the voltage of the battery 1576 or the current flow from the battery 1576. The battery parameters may be used to determine actions that the Edge computing node 1550 may perform, such as transmission frequency, mesh network operation, sensing frequency, and the like.

A power block 1580, or other power supply coupled to a grid, may be coupled with the battery monitor/charger 1578 to charge the battery 1576. In some examples, the power block 1580 may be replaced with a wireless power receiver to obtain the power wirelessly, for example, through a loop antenna in the Edge computing node 1550. A wireless battery charging circuit, such as an LTC4020 chip from Linear Technologies of Milpitas, California, among others, may be included in the battery monitor/charger 1578. The specific charging circuits may be selected based on the size of the battery 1576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1558 may include instructions 1582 in the form of software, firmware, or hardware commands to implement the techniques described herein. Although such instructions 1582 are shown as code blocks included in the memory 1554 and the storage 1558, it may be understood that any of the code blocks may be replaced with hardwired circuits, for example, built into an application specific integrated circuit (ASIC).

In an example, the instructions 1582 provided via the memory 1554, the storage 1558, or the processor 1552 may be embodied as a non-transitory, machine-readable medium 1560 including code to direct the processor 1552 to perform electronic operations in the Edge computing node 1550. The processor 1552 may access the non-transitory, machine-readable medium 1560 over the interconnect 1556. For instance, the non-transitory, machine-readable medium 1560 may be embodied by devices described for the storage 1558 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 1560 may include instructions to direct the processor 1552 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Also in a specific example, the instructions 1582 on the processor 1552 (separately, or in combination with the instructions 1582 of the machine readable medium 1560) may configure execution or operation of a trusted execution environment (TEE) 1590. In an example, the TEE 1590 operates as a protected area accessible to the processor 1552 for secure execution of instructions and secure access to data. Various implementations of the TEE 1590, and an accompanying secure area in the processor 1552 or the memory 1554 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1550 through the TEE 1590 and the processor 1552.

While the illustrated examples of FIG. D1A and FIG. D1B include example components for a compute node and a computing device, respectively, examples disclosed herein are not limited thereto. As used herein, a "computer" may include some or all of the example components of FIGS. D1A and/or D1B in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIGS. D1A and/or D1B, each of which may include different sub-components, different memory capacities, I/O capabilities, etc. For example, because some implementations of distributed networking and/or distributed computing are associated with particular desired functionality, examples disclosed herein include different combinations of components illustrated in FIGS. D1A and/or D1B to satisfy functional objectives of distributed computing tasks. In some examples, the term "compute node" or "computer" only includes the example processor D104, memory D106 and I/O subsystem D108 of FIG. D1A. In some examples, one or more objective functions of a distributed computing task(s) rely on one or more alternate devices/structure located in different parts of an Edge networking environment, such as devices to accommodate data storage (e.g., the example data storage D110), input/output capabilities (e.g., the example peripheral device(s) D114), and/or network communication capabilities (e.g., the example NIC D120).

In some examples, computers operating in a distributed computing and/or distributed networking environment (e.g., an Edge network) are structured to accommodate particular objective functionality in a manner that reduces computational waste. For instance, because a computer includes a subset of the components disclosed in FIGS. D1A and D1B, such computers satisfy execution of distributed computing objective functions without including computing structure that would otherwise be unused and/or underutilized. As such, the term "computer" as used herein includes any combination of structure of FIGS. D1A and/or D1B that is capable of satisfying and/or otherwise executing objective functions of distributed computing tasks. In some examples, computers are structured in a manner commensurate to corresponding distributed computing objective functions in a manner that downscales or upscales in connection with dynamic demand. In some examples, different computers are invoked and/or otherwise instantiated in view of their ability to process one or more tasks of the distributed computing request(s), such that any computer capable of satisfying the tasks proceed with such computing activity.

In the illustrated examples of FIGS. D1A and D1B, computing devices include operating systems. As used herein, an "operating system" is software to control example computing devices, such as the example Edge compute node D100 of FIG. D1A and/or the example Edge compute node D150 of FIG. D1B. Example operating systems include, but are not limited to consumer-based operating systems (e.g., Microsoft® Windows® 10, Google® Android® OS, Apple® Mac® OS, etc.). Example operating systems also include, but are not limited to industry-focused operating systems, such as real-time operating systems, hypervisors, etc. An example operating system on a first Edge compute node may be the same or different than an example operating system on a second Edge compute node. In some examples, the operating system invokes alternate software to facilitate one or more functions and/or operations that are not native to the operating system, such as particular communication protocols and/or interpreters. In some examples, the operating system instantiates various functionalities that are not native to the operating system. In some examples, operating systems include varying degrees of complexity and/or capabilities. For instance, a first operating system corresponding to a first Edge compute node includes a real-time operating system having particular performance expectations of responsivity to dynamic input conditions, and a second operating system corresponding to a second Edge compute node includes graphical user interface capabilities to facilitate end-user I/O.

In further examples, a non-transitory machine-readable medium (e.g., a computer-readable medium) also includes any medium (e.g., storage device, storage disk, etc.) that is capable of storing, encoding or carrying instructions for execution by a machine and that cause the machine to perform any one or more of the methodologies of the present disclosure or that is capable of storing, encoding or carrying data structures utilized by or associated with such instructions. A "non-transitory machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks (e.g., SSDs); magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. As used herein, the term non-transitory computer readable medium is expressly defined to include any type of computer readable storage device and/or storage disk and to exclude propagating signals and to exclude transmission media. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

EXAMPLES

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" a server or "an apparatus of" a client or an "apparatus" of an edge compute node is meant to refer to a "component" of a server or client or edge computer node, as the component is defined above. The "apparatus" as referred to herein may refer, for example, include a compute circuitry, the compute circuitry including, for example, processing circuitry and a memory coupled thereto.

Example 1 includes an apparatus of node of a data centric network (DCN), the apparatus including an interconnect interface to connect the apparatus to one or more components of the node, and a processor to: receive a first service request interest packet from another node of the DCN, the first service request interest packet indicating a set of functions to be performed on source data to implement a service; determine that the node can perform a particular function of the set of functions; determine, based on a local backlog corresponding to the particular function and backlogs of one or more other nodes of the DCN corresponding to the particular function, whether to commit to performing the particular function or to forward the service request interest packet to another node; and cause a second service request interest packet to be transmitted to another node of the DCN based on the determination.

Example 2 includes the subject matter of claim 1, wherein the processor is to determine whether to commit to performing the particular function or to forward the service request interest packet to another node of the DCN further based on service delivery information indicating, for each face of the node, a service delivery distance for implementing the set of functions.

Example 3 includes the subject matter of claim 2, wherein the service delivery distance is based on a number of network hops in the DCN for implementing the set of functions indicated by the second service request interest packet.

Example 4 includes the subject matter of claim 3, wherein the number of network hops includes hops between nodes of the DCN and processing hops in the DCN corresponding to the performance of a function in the set of functions.

Example 5 includes the subject matter of any one of claims 2-4, wherein the processor is to obtain the service delivery information by: receiving a service discovery interest packet from another node of the DCN, the service discovery interest packet indicating the set of functions; determining that the node can perform a particular function; causing a new service discovery interest packet to be transmitted to one or more other nodes of the DCN, the new service discovery interest packet indicating the set of functions without the particular function; and receiving, from one or more other nodes of the DCN, discovery data packets indicating the service delivery distance information for implementing the set of functions.

Example 6 includes the subject matter of any one of claims 1-5, wherein the processor is to determine whether to commit to performing the particular function or to forward the service request interest packet to another node using on a backpressure routing algorithm based on Lyapunov drift optimization.

Example 7 includes the subject matter of any one of claims 1-6, wherein the processor is, based on a determination to commit to performing the particular function, generate the second service request interest packet to indicate the set of functions without the particular function.

Example 8 includes the subject matter of any one of claims 1-6, wherein the processor is, based on a determination to forward the services request interest packet to another node, generate the second service request interest packet to indicate the set of functions with the particular function.

Example 9 includes the subject matter of any one of claims 1-8, wherein the set of functions indicates a sequence of functions to be performed on source data to implement the service in reverse order of performance, and the particular function is the first function indicated in the reverse order.

Example 10 includes the subject matter of any one of claims 1-9, wherein the processor is further to receive periodic messages from the other nodes of the DCN indicating their respective backlogs corresponding to the particular function.

Example 11 includes the subject matter of any one of claims 1-10, wherein the processor is further to: obtain a service data packet from another node of the DCN; perform the first function on the service data packet; and cause output data of the first function to be transmitted to another node of the network in a service data packet.

Example 12 includes one or more computer-readable media comprising instructions that, when executed by one or more processors of a node of a data centric network (DCN), cause the one or more processors to: receive a first service request interest packet from another node of the DCN, the first service request interest packet indicating a set of functions to be performed on source data to implement a service; determine that the node can perform a particular function of the set of functions; determine, based on a local backlog corresponding to the particular function and backlogs of one or more other nodes of the DCN corresponding to the particular function, whether to commit to performing the particular function or to forward the service request interest packet to another node; and cause a second service request interest packet to be transmitted to another node of the DCN based on the determination.

Example 13 includes the subject matter of claim 12, wherein the instructions are to determine whether to commit to performing the particular function or to forward the service request interest packet to another node of the DCN further based on service delivery information indicating, for each face of the node, a service delivery distance for implementing the set of functions.

Example 14 includes the subject matter of claim 13, wherein the service delivery distance is based on a number of network hops in the DCN for implementing the set of functions indicated by the second service request interest packet.

Example 15 includes the subject matter of claim 14, wherein the number of network hops includes hops between nodes of the DCN and processing hops in the DCN corresponding to the performance of a function in the set of functions.

Example 16 includes the subject matter of any one of claims 13-15, wherein the instructions are to obtain the service delivery information by: receiving a service discovery interest packet from another node of the DCN, the service discovery interest packet indicating the set of functions; determining that the node can perform a particular function; causing a new service discovery interest packet to be transmitted to one or more other nodes of the DCN, the new service discovery interest packet indicating the set of functions without the particular function; and receiving, from one or more other nodes of the DCN, discovery data packets indicating the service delivery distance information for implementing the set of functions.

Example 17 includes the subject matter of any one of claims 12-16, wherein the instructions are to determine whether to commit to performing the particular function or to forward the service request interest packet to another node using on a backpressure routing algorithm based on Lyapunov drift optimization.

Example 18 includes the subject matter of any one of claims 12-17, wherein the instructions are, based on a determination to commit to performing the particular function, generate the second service request interest packet to indicate the set of functions without the particular function.

Example 19 includes the subject matter of any one of claims 12-17, wherein the instructions are, based on a determination to forward the services request interest packet to another node, generate the second service request interest packet to indicate the set of functions with the particular function.

Example 20 includes the subject matter of any one of claims 12-19, wherein the set of functions indicates a sequence of functions to be performed on source data to implement the service in reverse order of performance, and the particular function is the first function indicated in the reverse order.

Example 21 includes the subject matter of any one of claims 12-20, wherein the instructions are further to receive periodic messages from the other nodes of the DCN indicating their respective backlogs corresponding to the particular function.

Example 22 includes the subject matter of any one of claims 12-21, wherein the instructions are further to: receive a service data packet from another node of the DCN; perform the first function on the service data packet; and cause output data of the first function to be transmitted to another node of the network in a service data packet.

Example 23 includes a method to be performed by a node of a data centric network (DCN), comprising: receiving a first service request interest packet, the first service request interest packet indicating a sequence of functions, in reverse order, to be executed to implement at least a portion of a service on source data; orchestrating execution of a first function of the sequence of functions, comprising: determining that the node can perform the first function; committing to execution of the first function based on local backlog information corresponding to the first function and backlog information of one or more other nodes of the DCN corresponding to the first function; and transmitting one or more second service request interest packets to other nodes of the DCN indicate the sequence of functions, in reverse order, without the first function.

Example 24 includes the subject matter of claim 23, further comprising: receiving a third service request interest packet indicating a sequence of functions in reverse order; forwarding the third service request interest packet to one or more other nodes of the DCN for execution of the first function based on the local backlog information corresponding to the first function and the backlog information of one or more other nodes of the DCN corresponding to the first function.

Example 25 includes the subject matter of claim 24, further comprising: performing a service discovery procedure in the DCN, comprising: transmitting a service discovery interest packet to one or more other nodes of the DCN, the service discovery interest packets indicating the sequence of functions, in reverse order, to be implemented to perform at least a portion of the service on source data; and receiving, from the one or more other nodes of the DCN, a discovery data packet indicating service delivery distance information for implementing the sequence of functions; wherein the forwarding of the third service request interest packet comprises: selecting a node of the DCN based on the service delivery distance information; and transmitting the third service request interest packet to the selected node.

Example 26 includes the subject matter of claim 25, further comprising: computing local abstract backlog information corresponding to the first function for the node and computing abstract backlog information of one or more other nodes of the DCN corresponding to the first function based on the service delivery distance information; wherein the node selection is based on the local abstract backlog information and the abstract backlog information of one or more other nodes of the DCN.

Example 27 includes the subject matter of claim 26, further comprising: computing bias terms based on the service delivery distance information; wherein the bias terms are used to compute the local abstract backlog information corresponding to the first function for the node and computing abstract backlog information of one or more other nodes of the DCN.

Example 28 includes the subject matter of any one of claims 25-27, wherein the service delivery distance information indicates a shortest path segment in the DCN from the node to a data producer node of the DCN.

Example 29 includes the subject matter of any one of claims 23-28, further comprising: receiving a service data packet from another node of the DCN; performing the first function on data of the service data packet; and transmitting output data of the first function to another node of the network in a service data packet.

Example X1 includes a system comprising means to perform one or more elements of a method of any one of Examples 23-29.

Example X2 includes a machine-readable storage including machine-readable instructions which, when executed, implement the method of any one of Examples 23-29.

Example X5 includes an edge computing system, including respective edge processing devices and nodes to invoke or perform the operations of Examples 23-29, or other subject matter described herein.

Example X6 includes one or more computer readable media comprising instructions, wherein execution of the instructions by processor circuitry is to cause the processor circuitry to perform the method of Examples 23-29.

Example X7 includes a computer program comprising the instructions of Example X6.

Example X8 includes an Application Programming Interface defining functions, methods, variables, data structures, and/or protocols for the computer program of Example X7.

Example X9 includes an apparatus comprising circuitry loaded with the instructions of Example X6.

Example X10 includes an apparatus comprising circuitry operable to run the instructions of Example X6.

Example X11 includes an integrated circuit comprising one or more of the processor circuitry of Example X6 and the one or more computer readable media of Example X7.

Example X12 includes a computing system comprising the one or more computer readable media and the processor circuitry of Example X6.

Example X13 includes an apparatus comprising means for executing the instructions of Example X6.

Example X14 includes a signal generated as a result of executing the instructions of Example X6.

Example X15 includes a data unit generated as a result of executing the instructions of Example X6.

Example X16 includes the data unit of claim 27, the data unit is a datagram, network packet, data frame, data segment, a Protocol Data Unit (PDU), a Service Data Unit (SDU), a message, or a database object.

Example X16 includes a signal encoded with the data unit of Example X15 or X16.

Example X16 includes an electromagnetic signal carrying the instructions of Example X6.

Example X16 includes an apparatus comprising means for performing the method of Examples 23-29.

Any of the above-described examples may be combined with any other example (or combination of examples), unless explicitly stated otherwise. Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

What is claimed is:

1. An apparatus of node of a data centric network (DCN), the apparatus including an interconnect interface to connect the apparatus to one or more components of the node, and a processor to:

receive a first service request interest packet from another node of the DCN, the first service request interest packet indicating a set of functions to be performed on source data to implement a service;

determine that the node can perform a particular function of the set of functions;

determine, based on a local backlog corresponding to the particular function, and backlogs of one or more other nodes of the DCN corresponding to the particular function, and service delivery information indicating, for each face of the node, a service delivery distance for implementing the set of functions, whether to commit to performing the particular function or to forward the service request interest packet to another node; and cause a second service request interest packet to be transmitted to another node of the DCN based on the determination.

2. The apparatus of claim 1, wherein the service delivery distance is based on a number of network hops in the DCN for implementing the set of functions indicated by the second service request interest packet.

3. The apparatus of claim 2, wherein the number of network hops includes hops between nodes of the DCN and processing hops in the DCN corresponding to the performance of a function in the set of functions.

4. The apparatus of claim 1, wherein the processor is to obtain the service delivery information by:

receiving a service discovery interest packet from another node of the DCN, the service discovery interest packet indicating the set of functions;

determining that the node can perform a particular function;

causing a new service discovery interest packet to be transmitted to one or more other nodes of the DCN, the new service discovery interest packet indicating the set of functions without the particular function; and receiving, from one or more other nodes of the DCN, discovery data packets indicating the service delivery distance information for implementing the set of functions.

5. The apparatus of claim 1, wherein the processor is to determine whether to commit to performing the particular function or to forward the service request interest packet to another node using on a backpressure routing algorithm based on Lyapunov drift optimization.

6. The apparatus of claim 1, wherein the processor is, based on a determination to commit to performing the particular function, generate the second service request interest packet to indicate the set of functions without the particular function.

7. The apparatus of claim 1, wherein the processor is, based on a determination to forward the services request interest packet to another node, generate the second service request interest packet to indicate the set of functions with the particular function.

8. The apparatus of claim 1, wherein the processor is further to receive periodic messages from the other nodes of the DCN indicating their respective backlogs corresponding to the particular function.

9. The apparatus of claim 1, wherein the processor is further to:

obtain a service data packet from another node of the DCN;

perform the first function on the service data packet; and cause output data of the first function to be transmitted to another node of the network in a service data packet.

10. One or more computer-readable media comprising instructions that, when executed by one or more processors of a node of a data centric network (DCN), cause the one or more processors to:

receive a first service request interest packet from another node of the DCN, the first service request interest packet indicating a set of functions to be performed on source data to implement a service;

determine that the node can perform a particular function of the set of functions;

determine, based on a local backlog corresponding to the particular function, and backlogs of one or more other nodes of the DCN corresponding to the particular function, and service delivery information indicating, for each face of the node, a service delivery distance for implementing the set of functions, whether to commit to performing the particular function or to forward the service request interest packet to another node; and cause a second service request interest packet to be transmitted to another node of the DCN based on the determination.

11. The computer-readable media of claim 10, wherein the service delivery distance is based on a number of network hops in the DCN for implementing the set of functions indicated by the second service request interest packet.

12. The computer-readable media of claim 11, wherein the number of network hops includes hops between nodes of the DCN and processing hops in the DCN corresponding to the performance of a function in the set of functions.

13. The computer-readable media of claim 10, wherein the instructions are to obtain the service delivery information by:

receiving a service discovery interest packet from another node of the DCN, the service discovery interest packet indicating the set of functions;

determining that the node can perform a particular function;

causing a new service discovery interest packet to be transmitted to one or more other nodes of the DCN, the new service discovery interest packet indicating the set of functions without the particular function; and receiving, from one or more other nodes of the DCN, discovery data packets indicating the service delivery distance information for implementing the set of functions.

14. The computer-readable media of claim 10, wherein the instructions are to determine whether to commit to performing the particular function or to forward the service request interest packet to another node using on a backpressure routing algorithm based on Lyapunov drift optimization.

15. The computer-readable media of claim 10, wherein the instructions are, based on a determination to commit to performing the particular function, generate the second service request interest packet to indicate the set of functions without the particular function.

16. The computer-readable media of claim 10, wherein the instructions are, based on a determination to forward the services request interest packet to another node, generate the second service request interest packet to indicate the set of functions with the particular function.

17. The computer-readable media of claim 10, wherein the instructions are further to:

receive a service data packet from another node of the DCN;

perform the first function on the service data packet; and cause output data of the first function to be transmitted to another node of the network in a service data packet.

18. A method to be performed by a node of a data centric network (DCN), comprising:

receiving a first service request interest packet, the first service request interest packet indicating a sequence of functions, in reverse order, to be executed to implement at least a portion of a service on source data;

orchestrating execution of a first function of the sequence of functions, comprising:

determining that the node can perform the first function;

committing to execution of the first function based on local backlog information corresponding to the first function, and backlog information of one or more other nodes of the DCN corresponding to the first function, and service delivery information indicating, for each face of the node, a service delivery distance for implementing the first function; and transmitting one or more second service request interest packets to other nodes of the DCN indicate the sequence of functions, in reverse order, without the first function.

19. The method of claim 18, further comprising:

receiving a third service request interest packet indicating a sequence of functions in reverse order;

forwarding the third service request interest packet to one or more other nodes of the DCN for execution of the first function based on the local backlog information corresponding to the first function and the backlog information of one or more other nodes of the DCN corresponding to the first function.

20. The method of claim 19, further comprising:

performing a service discovery procedure in the DCN, comprising:

transmitting a service discovery interest packet to one or more other nodes of the DCN, the service discovery interest packets indicating the sequence of functions, in reverse order, to be implemented to perform at least a portion of the service on source data; and receiving, from the one or more other nodes of the DCN, a discovery data packet indicating service delivery distance information for implementing the sequence of functions;

wherein the forwarding of the third service request interest packet comprises:

selecting a node of the DCN based on the service delivery distance information; and transmitting the third service request interest packet to the selected node.

21. The method of claim 20, further comprising:

computing local abstract backlog information corresponding to the first function for the node and computing abstract backlog information of one or more other nodes of the DCN corresponding to the first function based on the service delivery distance information;

wherein the node selection is based on the local abstract backlog information and the abstract backlog information of one or more other nodes of the DCN.

22. The method of claim 20, wherein the service delivery distance information indicates a shortest path segment in the DCN from the node to a data producer node of the DCN.

23. The method of claim 18, further comprising:

receiving a service data packet from another node of the DCN;

performing the first function on data of the service data packet; and transmitting output data of the first function to another node of the network in a service data packet.

* * * * *